US006944616B2

(12) United States Patent
Ferguson et al.

(10) Patent No.: US 6,944,616 B2
(45) Date of Patent: Sep. 13, 2005

(54) SYSTEM AND METHOD FOR HISTORICAL DATABASE TRAINING OF SUPPORT VECTOR MACHINES

(75) Inventors: Ralph Bruce Ferguson, Round Rock, TX (US); Eric J. Hartman, Austin, TX (US); William Douglas Johnson, Austin, TX (US); Eric S. Hurley, Austin, TX (US)

(73) Assignee: Pavilion Technologies, Inc., Austin, TX (US)

( * ) Notice: Subject to any disclaimer, the term of this patent is extended or adjusted under 35 U.S.C. 154(b) by 381 days.

(21) Appl. No.: 09/997,627

(22) Filed: Nov. 28, 2001

(65) Prior Publication Data

US 2003/0101161 A1 May 29, 2003

(51) Int. Cl.[7] ................................................ G06F 17/30

(52) U.S. Cl. ............................ 707/10; 707/3; 707/100; 706/16; 706/25; 706/45; 709/206

(58) Field of Search ................................ 707/10, 104.1, 707/2, 3, 5, 100; 706/16, 25, 7, 12, 20, 21, 23; 709/223, 206; 715/513, 514; 700/44; 716/5; 705/9

(56) References Cited

U.S. PATENT DOCUMENTS

| | | | | |
|---|---|---|---|---|
| 5,212,765 A | | 5/1993 | Skeirik | |
| 5,282,261 A | | 1/1994 | Skeirik | 706/23 |
| 5,408,586 A | | 4/1995 | Skeirik | |
| 5,640,493 A | | 6/1997 | Skeirik | |
| 5,649,068 A | | 7/1997 | Boser et al. | |
| 5,720,003 A | | 2/1998 | Chiang et al. | 706/21 |
| 5,826,249 A | | 10/1998 | Skeirik | |
| 5,950,146 A | | 9/1999 | Vapnik | |
| 6,026,397 A | | 2/2000 | Sheppard | 707/5 |
| 6,047,221 A | | 4/2000 | Piche et al. | 700/44 |
| 6,128,608 A | * | 10/2000 | Barnhill | 706/16 |
| 6,134,344 A | * | 10/2000 | Burges | 382/155 |
| 6,157,921 A | * | 12/2000 | Barnhill | 706/16 |
| 6,161,130 A | * | 12/2000 | Horvitz et al. | 709/206 |
| 6,192,360 B1 | | 2/2001 | Dumais et al. | |
| 6,405,248 B1 | | 6/2002 | Wood | 709/223 |
| 6,427,141 B1 | * | 7/2002 | Barnhill | 706/16 |
| 6,490,320 B1 | * | 12/2002 | Vetro et al. | 375/240.08 |
| 6,505,167 B1 | * | 1/2003 | Horvitz et al. | 705/9 |
| 6,519,580 B1 | * | 2/2003 | Johnson et al. | 706/47 |
| 6,519,601 B1 | | 2/2003 | Bosch | 707/100 |
| 6,553,358 B1 | * | 4/2003 | Horvitz | 706/45 |
| 6,581,050 B1 | * | 6/2003 | Horvitz et al. | 706/45 |
| 6,618,716 B1 | * | 9/2003 | Horvitz | 706/55 |

(Continued)

OTHER PUBLICATIONS

International Search Report, Application No. PCT/US02/38019, mailed Mar. 14, 2003.

*Primary Examiner*—Shahid Al Alam
(74) *Attorney, Agent, or Firm*—Meyertons Hood Kivlin Kowert & Goetzel, P.C.; Jeffrey C. Hood

(57) ABSTRACT

A system and method for historical database training of a support vector machine (SVM). The SVM is trained with training sets from a stream of process data. The system detects availability of new training data, and constructs a training set from the corresponding input data. Over time, many training sets are presented to the SVM. When multiple presentations are needed to effectively train the SVM, a buffer of training sets is filled and updated as new training data becomes available. Once the buffer is full, a new training set bumps the oldest training set from the buffer. The training sets are presented one or more times each time a new training set is constructed. A historical database of time-stamped data may be used to construct training sets for the SVM. The SVM may be trained retrospectively by searching the historical database and constructing training sets based on the time-stamped data.

35 Claims, 34 Drawing Sheets

U.S. PATENT DOCUMENTS

| | | | | | |
|---|---|---|---|---|---|
| 6,622,160 | B1 | * | 9/2003 | Horvitz | 709/206 |
| 6,633,857 | B1 | * | 10/2003 | Tipping | 706/16 |
| 6,658,395 | B1 | * | 12/2003 | Barnhill | 706/16 |
| 6,662,170 | B1 | * | 12/2003 | Dom et al. | 706/45 |
| 6,687,887 | B1 | * | 2/2004 | Teig et al. | 716/5 |
| 6,714,925 | B1 | * | 3/2004 | Barnhill et al. | 706/48 |
| 6,760,715 | B1 | * | 7/2004 | Barnhill et al. | 706/16 |
| 6,789,069 | B1 | * | 9/2004 | Barnhill et al. | 706/12 |
| 2002/0016786 | A1 | * | 2/2002 | Pitkow et al. | 707/3 |
| 2002/0078091 | A1 | | 6/2002 | Vu et al. | 715/513 |
| 2002/0128989 | A1 | | 9/2002 | Thess et al. | 706/16 |

* cited by examiner

Computer System
82

SYSTEM AND METHOD FOR HISTORICAL DATABASE TRAINING OF SUPPORT VECTOR MACHINES

BACKGROUND OF THE INVENTION

1. Field of the Invention

The present invention relates generally to the field of non-linear models. More particularly, the present invention relates to historical database training of a support vector machine.

2. Description of the Related Art

Many predictive systems may be characterized by the use of an internal model which represents a process or system for which predictions are made. Predictive model types may be linear, non-linear, stochastic, or analytical, among others. However, for complex phenomena non-linear models may generally be preferred due to their ability to capture non-linear dependencies among various attributes of the phenomena. Examples of non-linear models may include neural networks and support vector machines (SVMs).

Generally, a model is trained with training data, e.g., historical data, in order to reflect salient attributes and behaviors of the phenomena being modeled. In the training process, sets of training data may be provided as inputs to the model, and the model output may be compared to corresponding sets of desired outputs. The resulting error is often used to adjust weights or coefficients in the model until the model generates the correct output (within some error margin) for each set of training data. The model is considered to be in "training mode" during this process. After training, the model may receive real-world data as inputs, and provide predictive output information which may be used to control or make decisions regarding the modeled phenomena.

Predictive models may be used for analysis, control, and decision making in many areas, including manufacturing, process control, plant management, quality control, optimized decision making, e-commerce, financial markets and systems, or any other field where predictive modeling may be useful. For example, quality control in a manufacturing plant is increasingly important. The control of quality and the reproducibility of quality may be the focus of many efforts. For example, in Europe, quality is the focus of the ISO (International Standards Organization, Geneva, Switzerland) 9000 standards. These rigorous standards provide for quality assurance in production, installation, final inspection, and testing. They also provide guidelines for quality assurance between a supplier and customer.

The quality of a manufactured product is a combination of all of the properties of the product which affect its usefulness to its user. Process control is the collection of methods used to produce the best possible product properties in a manufacturing process, and is very important in the manufacture of products. Improper process control may result in a product which is totally useless to the user, or in a product which has a lower value to the user. When either of these situations occur, the manufacturer suffers (1) by paying the cost of manufacturing useless products, (2) by losing the opportunity to profitably make a product during that time, and (3) by lost revenue from reduced selling price of poor products. In the final analysis, the effectiveness of the process control used by a manufacturer may determine whether the manufacturer's business survives or fails. For purposes of illustration, quality and process control are described below as related to a manufacturing process, although process control may also be used to ensure quality in processes other than manufacturing, such as e-commerce, portfolio management, and financial systems, among others.

A. Quality and Process Conditions

FIG. 22 shows, in block diagram form, key concepts concerning products made in a manufacturing process. Referring now to FIG. 22, raw materials 1222 may be processed under (controlled) process conditions 1906 in a process 1212 to produce a product 1216 having product properties 1904. Examples of raw materials 1222, process conditions 1906, and product properties 1904 may be shown in FIG. 22. It should be understood that these are merely examples for purposes of illustration, and that a product may refer to an abstract product, such as information, analysis, decision-making, transactions, or any other type of usable object, result, or service.

FIG. 23 shows a more detailed block diagram of the various aspects of the manufacturing of products 1216 using process 1212. Referring now to FIGS. 22 and 23, product 1216 is defined by one or more product property aim value(s) 2006 of its product properties 1904. The product property aim values 2006 of the product properties 1904 may be those which the product 1216 needs to have in order for it to be ideal for its intended end use. The objective in running process 1212 is to manufacture products 1216 having product properties 1904 which match the product property aim value(s) 2006.

The following simple example of a process 1212 is presented merely for purposes of illustration. The example process 1212 is the baking of a cake. Raw materials 1222 (such as flour, milk, baking powder, lemon flavoring, etc.) may be processed in a baking process 1212 under (controlled) process conditions 1906. Examples of the (controlled) process conditions 1906 may include: mix batter until uniform, bake batter in a pan at a preset oven temperature for a preset time, remove baked cake from pan, and allow removed cake to cool to room temperature.

The product 1216 produced in this example is a cake having desired properties 1904. For example, these desired product properties 1904 may be a cake that is fully cooked but not burned, brown on the outside, yellow on the inside, having a suitable lemon flavoring, etc.

Returning now to the general case, the actual product properties 1904 of product 1216 produced in a process 1212 may be determined by the combination of all of the process conditions 1906 of process 1212 and the raw materials 1222 that are utilized. Process conditions 1906 may be, for example, the properties of the raw materials 1222, the speed at which process 1212 runs (also called the production rate of the process 1212), the process conditions 1906 in each step or stage of the process 1212 (such as temperature, pressure, etc.), the duration of each step or stage, and so on.

B. Controlling Process Conditions

FIG. 23 shows a more detailed block diagram of the various aspects of the manufacturing of products 1216 using process 1212. FIGS. 22 and 23 should be referred to in connection with the following description.

To effectively operate process 1212, the process conditions 1906 may be maintained at one or more process condition setpoint(s) or aim value(s) (called a regulatory controller setpoint(s) in the example of FIG. 17, discussed below) 1404 so that the product 1216 produced has the product properties 1904 matching the desired product property aim value(s) 2006. This task may be divided into three parts or aspects for purposes of explanation.

In the first part or aspect, the manufacturer may set (step 2008) initial settings of the process condition setpoint(s) or aim value(s) 1404 in order for the process 1212 to produce a product 1216 having the desired product property aim values 2006. Referring back to the example set forth above, this would be analogous to deciding to set the temperature of the oven to a particular setting before beginning the baking of the cake batter.

The second step or aspect involves measurement and adjustment of the process 1212. Specifically, process conditions 1906 may be measured to produce process condition measurement(s) 1224. The process condition measurement(s) 1224 may be used to generate adjustment(s) 1208 (called controller output data in the example of FIG. 4, discussed below) to controllable process state(s) 2002 so as to hold the process conditions 1906 as close as possible to process condition setpoint 1404. Referring again to the example above, this is analogous to the way the oven measures the temperature and turns the heating element on or off so as to maintain the temperature of the oven at the desired temperature value.

The third stage or aspect involves holding product property measurement(s) of the product properties 1904 as close as possible to the product property aim value(s) 2006. This involves producing product property measurement(s) 1304 based on the product properties 1904 of the product 1216. From these measurements, adjustment to process condition setpoint 1402 may be made to the process condition setpoint(s) 1404 so as to maintain process condition(s) 1906. Referring again to the example above, this would be analogous to measuring how well the cake is baked. This could be done, for example, by sticking a toothpick into the cake and adjusting the temperature during the baking step so that the toothpick eventually comes out clean.

It should be understood that the previous description is intended only to show the general conditions of process control and the problems associated with it in terms of producing products of predetermined quality and properties. It may be readily understood that there may be many variations and combinations of tasks that are encountered in a given process situation. Often, process control problems may be very complex.

One aspect of a process being controlled is the speed with which the process responds. Although processes may be very complex in their response patterns, it is often helpful to define a time constant for control of a process. The time constant is simply an estimate of how quickly control actions may be carried out in order to effectively control the process.

In recent years, there has been a great push towards the automation of process control. One motivation for this is that such automation results in the manufacture of products of desired product properties where the manufacturing process that is used is too complex, too time-consuming, or both, for people to deal with manually.

Thus, the process control task may be generalized as being made up of five basic steps or stages as follows:

(1) the initial setting of process condition setpoint(s) 2008;

(2) producing process condition measurement(s) 1224 of the process condition(s) 1906;

(3) adjusting 1208 controllable process state(s) 2002 in response to the process condition measurement(s) 1224;

(4) producing product property measurement(s) 1304 based on product properties 1904 of the manufactured product 1216; and (5) adjusting 1402 process condition setpoint(s) 1404 in response to the product property measurements 1304.

The explanation which follows explains the problems associated with meeting and optimizing these five steps.

C. The Measurement Problem

As shown above, the second and fourth steps or aspects of process control involve measurement 1224 of process conditions 1906 and measurement 1304 of product properties 1904, respectively. Such measurements may be sometimes very difficult, if not impossible, to effectively perform for process control.

For many products, the important product properties 1904 relate to the end use of the product and not to the process conditions 1906 of the process 1212. One illustration of this involves the manufacture of carpet fiber. An important product property 1904 of carpet fiber is how uniformly the fiber accepts the dye applied by the carpet maker. Another example involves the cake example set forth above. An important product property 1904 of a baked cake is how well the cake resists breaking apart when the frosting is applied. Typically, the measurement of such product properties 1904 is difficult and/or time consuming and/or expensive to make.

An example of this problem may be shown in connection with the carpet fiber example. The ability of the fiber to uniformly accept dye may be measured by a laboratory (lab) in which dye samples of the carpet fiber are used. However, such measurements may be unreliable. For example, it may take a number of tests before a reliable result may be obtained. Furthermore, such measurements may also be slow. In this example, it may take so long to conduct the dye test that the manufacturing process may significantly change and be producing different product properties 1904 before the lab test results are available for use in controlling the process 1212.

It should be noted, however, that some process condition measurements 1224 may be inexpensive, take little time, and may be quite reliable. Temperature typically may be measured easily, inexpensively, quickly, and reliably. For example, the temperature of the water in a tank may often be easily measured. But oftentimes process conditions 1906 make such easy measurements much more difficult to achieve. For example, it may be difficult to determine the level of a foaming liquid in a vessel. Moreover, a corrosive process may destroy measurement sensors, such as those used to measure pressure.

Regardless of whether or not measurement of a particular process condition 1906 or product property 1904 is easy or difficult to obtain, such measurement may be vitally important to the effective and necessary control of the process 1212. It may thus be appreciated that it would be preferable if a direct measurement of a specific process condition 1906 and/or product property 1904 could be obtained in an inexpensive, reliable, timely and effective manner.

D. Conventional Computer Models as Predictors of Desired Measurements

As stated above, the direct measurement of the process conditions 1906 and the product properties 1904 is often difficult, if not impossible, to do effectively.

One response to this deficiency in process control has been the development of computer models (not shown) as predictors of desired measurements. These computer models may be used to create values used to control the process 1212 based on inputs that may not be identical to the particular process conditions 1906 and/or product properties 1904 that are critical to the control of the process 1212. In other words, these computer models may be used to develop predictions (estimates) of the particular process conditions 1906 or product properties 1904. These predictions may be used to adjust the controllable process state 2002 or the process condition setpoint 1404.

Such conventional computer models, as explained below, have limitations. To better understand these limitations and how the present invention overcomes them, a brief description of each of these conventional models is set forth.

1. Fundamental Models

A computer-based fundamental model (not shown) uses known information about the process 1212 to predict desired unknown information, such as product conditions 1906 and product properties 1904. A fundamental model may be based on scientific and engineering principles. Such principles may include the conservation of material and energy, the equality of forces, and so on. These basic scientific and engineering principles may be expressed as equations which are solved mathematically or numerically, usually using a computer program. Once solved, these equations may give the desired prediction of unknown information.

Conventional computer fundamental models have significant limitations, such as:

(1) They may be difficult to create since the process 1212 may be described at the level of scientific understanding, which is usually very detailed;

(2) Not all processes 1212 are understood in basic engineering and scientific principles in a way that may be computer modeled;

(3) Some product properties 1904 may not be adequately described by the results of the computer fundamental models; and (4) The number of skilled computer model builders is limited, and the cost associated with building such models is thus quite high.

These problems result in computer fundamental models being practical only in some cases where measurement is difficult or impossible to achieve.

2. Empirical Statistical Models

Another conventional approach to solving measurement problems is the use of a computer-based statistical model (not shown).

Such a computer-based statistical model may use known information about process 1212 to determine desired information that may not be effectively measured. A statistical model may be based on the correlation of measurable process conditions 1906 or product properties 1904 of the process 1212.

To use an example of a computer-based statistical model, assume that it is desired to be able to predict the color of a plastic product 1216. This is very difficult to measure directly, and takes considerable time to perform. In order to build a computer-based statistical model which will produce this desired product property 1904 information, the model builder would need to have a base of experience, including known information and actual measurements of desired unknown information. For example, known information may include the temperature at which the plastic is processed. Actual measurements of desired unknown information may be the actual measurements of the color of the plastic.

A mathematical relationship (i.e., an equation) between the known information and the desired unknown information may be created by the developer of the empirical statistical model. The relationship may contain one or more constants (which may be assigned numerical values) which affect the value of the predicted information from any given known information. A computer program may use many different measurements of known information, with their corresponding actual measurements of desired unknown information, to adjust these constants so that the best possible prediction results may be achieved by the empirical statistical model. Such a computer program, for example, may use non-linear regression.

Computer-based statistical models may sometimes predict product properties 1904 which may not be well described by computer fundamental models. However, there may be significant problems associated with computer statistical models, which include the following:

(1) Computer statistical models require a good design of the model relationships (i.e., the equations) or the predictions will be poor;

(2) Statistical methods used to adjust the constants typically may be difficult to use;

(3) Good adjustment of the constants may not always be achieved in such statistical models; and (4) As is the case with fundamental models, the number of skilled statistical model builders is limited, and thus the cost of creating and maintaining such statistical models is high.

The result of these deficiencies is that computer-based empirical statistical models may be practical in only some cases where the process conditions 1906 and/or product properties may not be effectively measured.

E. Deficiencies in the Related Art

As set forth above, there are considerable deficiencies in conventional approaches to obtaining desired measurements for the process conditions 1906 and product properties 1904 using conventional direct measurement, computer fundamental models, and computer statistical models. Some of these deficiencies are as follows:

(1) Product properties 1904 may often be difficult to measure;

(2) Process conditions 1906 may often be difficult to measure;

(3) Determining the initial value or settings of the process conditions 1906 when making a new product 1216 is often difficult; and (4) Conventional computer models work only in a small percentage of cases when used as substitutes for measurements.

Although the above limitations have been described with respect to process control, it should be noted that these arguments apply to other application domains as well, such as plant management, quality control, optimized decision making, e-commerce, financial markets and systems, or any other field where predictive modeling may be used.

Therefore, improved systems and methods for historical database training of a support vector machine are desired.

SUMMARY OF THE INVENTION

A system and method are presented for historical database training of a support vector machine. The support vector machine may train by retrieving training sets from a stream of process data. The support vector machine may detect the availability of new training data, and may construct a training set by retrieving the corresponding input data. The support vector machine may be trained using the training set. Over time, many training sets may be presented to the support vector machine.

The support vector machine may detect training input data in several ways. In one approach, the support vector machine may monitor for changes in data values of training input data. A change may indicate that new data is available. In a second approach, the support vector machine may compute changes in raw training input data from one cycle to the next. The changes may be indicative of the action of human operators or other actions in the process. In a third mode, a historical database may be used and the support vector machine may monitor for changes in a timestamp of the training input data. Often laboratory data may be used as training input data in this approach.

When new training input data is detected, the support vector machine may construct a training set by retrieving input data corresponding to the new training input data. Often, the current or most recent values of the input data may be used. When a historical database provides both the training input data and the input data, the input data is retrieved from the historical database for a time period selected using the timestamps of the training input data.

For some support vector machines or training situations, multiple presentations of each training set may be needed to effectively train the support vector machine. In this case, a buffer of training sets (e.g., a FIFO—first in, first out—buffer) is filled and updated as new training data becomes available. The size of the buffer may be selected in accordance with the training needs of the support vector machine. Once the buffer is full, a new training set may bump the oldest training set from the buffer. The training sets in the buffer may be presented one or more times each time a new training set is constructed. It is noted that the use of a buffer to store training sets is but one example of storage means for the training sets, and that other storage means are also contemplated, including lists (such as queues and stacks), databases, and arrays, among others.

If a historical database is used, the support vector machine may be trained retrospectively. Training sets may be constructed by searching the historical database over a time span of interest for training input data. When training input data are found, an input data time is selected using the training input data timestamps, and the training set is constructed by retrieving the input data corresponding to the input data time. Multiple presentations may also be used in the retrospective training approach.

In one embodiment, the method may include building a first training set using training data, where the training data includes one or more timestamps indicating a chronology of the training data and one or more process parameter values corresponding to each timestamp. The first training set may include process parameter values corresponding to a first time period in the chronology. In one embodiment, building the first training set may include retrieving the training data from a historical database, selecting a training data time period based on the one or more timestamps, and retrieving the process parameter values from the training data indicated by the training data time period. Thus, the first training set includes retrieved process parameter values in chronological order over the selected training data time period. The support vector machine may then be trained using the first training set.

Then, a second training set may be generated by removing at least a subset of the parameter values of the first training set, preferably the oldest parameter values of the training set, and adding new parameter values from the training data based on the timestamps to generate a second training set. Thus, the second training set corresponds to a second time period in the chronology. The support vector machine may then be trained using the second training set. The process may then be repeated, successively updating the training set to generate new training sets by removing old data and adding new data based on the timestamps and training the support vector machine with each training set.

The historical database trained support vector machine may be used for process measurement, manufacturing, supervisory control, regulatory control functions, optimization, real-time optimization, decision-making systems, e-marketplaces, e-commerce, data analysis, data mining, financial analysis, stock and/or bond analysis/management, as well as any other field or domain where predictive or classification models may be useful. Using data pointers, easy access to many process data systems may be achieved. A modular approach with natural language configuration of the support vector machine may be used to implement the support vector machine. Expert system functions may be provided in the modular support vector machine to provide decision-making functions for use in control, analysis, management, or other areas of application.

BRIEF DESCRIPTION OF THE DRAWINGS

Other objects and advantages of the invention will become apparent upon reading the following detailed description and upon reference to the accompanying drawings in which.

Figure 1:
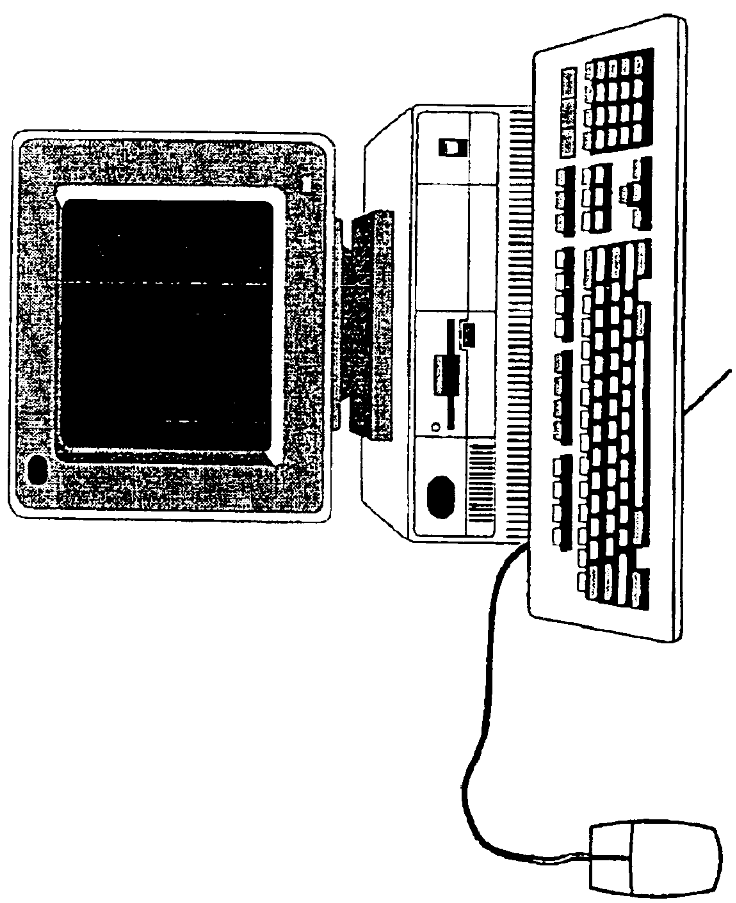
FIG. 1 illustrates an exemplary computer system according one embodiment of the present invention.

While the invention is susceptible to various modifications and alternative forms, specific embodiments thereof may be shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

U.S. Pat. No. 5,950,146, titled "Support Vector Method For Function Estimation", whose inventor is Vladimir Vapnik, and which issued on Sep. 7, 1999, is hereby incorporated by reference in its entirety as though fully and completely set forth herein.

U.S. Pat. No. 5,649,068, titled "Pattern Recognition System Using Support Vectors", whose inventors are Bernard Boser, Isabelle Guyon, and Vladimir Vapnik, and which issued on Jul. 15, 1997, is hereby incorporated by reference in its entirety as though fully and completely set forth herein.

U.S. Pat. No. 5,058,043, titled "Batch Process Control Using Expert Systems", whose inventor is Richard D. Skeirik, and which issued on Oct. 15, 1991, is hereby incorporated by reference in its entirety as though fully and completely set forth herein.

U.S. Pat. No. 5,006,992, titled "Process Control System With Reconfigurable Expert Rules and Control Modules", whose inventor is Richard D. Skeirik, and which issued on Apr. 9, 1991, is hereby incorporated by reference in its entirety as though fully and completely set forth herein.

U.S. Pat. No. 4,965,742, titled "Process Control System With On-Line Reconfigurable Modules", whose inventor is Richard D. Skeirik, and which issued on Oct. 23, 1990, is hereby incorporated by reference in its entirety as though fully and completely set forth herein.

U.S. Pat. No. 4,920,499, titled "Expert System With Natural-Language Rule Updating", whose inventor is Richard D. Skeirik, and which issued on Apr. 24, 1990, is hereby incorporated by reference in its entirety as though fully and completely set forth herein.

U.S. Pat. No. 4,910,691, titled "Process Control System with Multiple Module Sequence Options", whose inventor is Richard D. Skeirik, and which issued on Mar. 20, 1990, is hereby incorporated by reference in its entirety as though fully and completely set forth herein.

U.S. Pat. No. 4,907,167, titled "Process Control System with Action Logging", whose inventor is Richard D. Skeirik, and which issued on Mar. 6, 1990, is hereby incorporated by reference in its entirety as though fully and completely set forth herein.

U.S. Pat. No. 4,884,217, titled "Expert System with Three Classes of Rules", whose inventors are Richard D. Skeirik and Frank O. DeCaria, and which issued on Nov. 28, 1989, is hereby incorporated by reference in its entirety as though fully and completely set forth herein.

U.S. Pat. No. 5,212,765, titled "On-Line Training Neural Network System for Process Control", whose inventor is Richard D. Skeirik, and which issued on May 18, 1993, is hereby incorporated by reference in its entirety as though fully and completely set forth herein.

U.S. Pat. No. 5,408,586, titled "Historical Database Training Method for Neural Networks", whose inventor is Richard D. Skeirik, and which issued on Apr. 18, 1995, is hereby incorporated by reference in its entirety as though fully and completely set forth herein.

U.S. Pat. No. 5,640,493, titled "Historical Database Training Method for Neural Networks", whose inventor is Richard D. Skeirik, and which issued on Jun. 17, 1997, is hereby incorporated by reference in its entirety as though fully and completely set forth herein.

U.S. Pat. No. 5,826,249, titled "Historical Database Training Method for Neural Networks", whose inventor is Richard D. Skeirik, and which issued on Oct. 20, 1998, is hereby incorporated by reference in its entirety as though fully and completely set forth herein.

Table of Contents

Computer System Diagram
Computer System Block Diagram
I. Overview of Support Vector Machines
A. Introduction
B. How Support Vector Machines Work
1. Optimal Hyperplanes
2. Canonical Hyperplanes
C. An SVM Learning Rule
D. Classification of Linearly Separable Data
E. Classification of Nonlinearly Separable Data
F. Nonlinear Support Vector Machines
G. Kernel Functions
1. Polynomial
2. Radial basis function
3. Multilayer networks
H. Construction of Support Vector Machines
I. Support Vector Machine Training
J. Advantages of Support Vector Machines
II. Brief Overview
III. Use in Combination with Expert Systems
IV. One Method of Operation
A. Store Input Data and Training Input Data Step or Module 102
B. Configure and Train Support Vector Machine Step or Module 104
1. Configure Support Vector Machine Step or Module 302
2. Wait Training Input Data Interval Step or Module 304
3. New Training Input Data Step or Module 306
4. Train Support Vector Machine Step or Module 308
5. Error Acceptable Step or Module 310
C. Predict Output Data Using Support Vector Machine Step or Module 106
D. Retrain Support Vector Machine Step or Module 108
E. Enable/Disable Control Module or Step 110
F. Control Process Using Output Data Step or Module 112
V. One Structure (Architecture)
VI. User Interface FIG. 1—Computer System FIG. 1 illustrates a computer system 82 operable to execute a support vector machine for performing modeling and/or control operations. One embodiment of a method for creating and/or using a support vector machine is described below. The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 82 may include a display device operable to display operations associated with the support vector machine. The display device may also be operable to display a graphical user interface of process or control operations. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more support vector machine software programs (support vector machines) which are executable to perform the methods described herein. Also, the memory medium may store a programming development environment application used to create and/or execute support vector machine software programs. The memory medium may also store operating system software, as well as other software for operation of the computer system.

The term "memory medium" is intended to include an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

As used herein, the term "support vector machine" refers to at least one software program, or other executable implementation (e.g., an FPGA), that implements a support vector machine as described herein. The support vector machine software program may be executed by a processor, such as in a computer system. Thus the various support vector machine embodiments described below are preferably implemented as a software program executing on a computer system.

Figure 2:
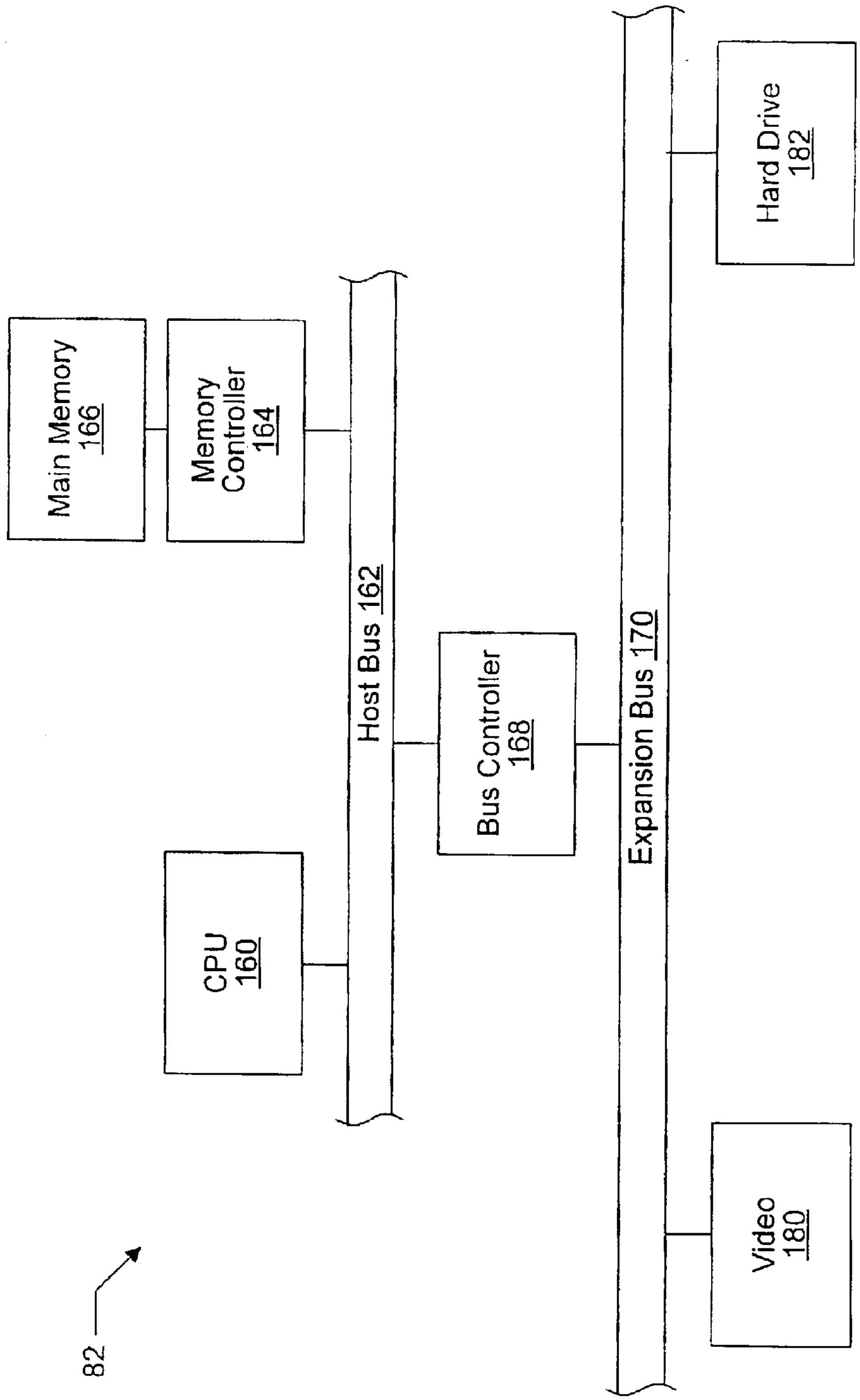
FIG. 2 is an exemplary block diagram of the computer system illustrated in FIG. 1, according to one embodiment of the present invention.

FIG. 2—Computer System Block Diagram

FIG. 2 is an embodiment of an exemplary block diagram of the computer system illustrated in FIG. 1. It is noted that any type of computer system configuration or architecture may be used in conjunction with the system and method described herein, as desired, and FIG. 2 illustrates a representative PC embodiment. It is also noted that the computer system may be a general purpose computer system such as illustrated in FIG. 1, or other types of embodiments. The elements of a computer not necessary to understand the present invention have been omitted for simplicity.

The computer system 82 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store one or more computer programs or libraries according to the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices such as a video display subsystem 180 and hard drive 182 coupled to the expansion bus 170, among others (not shown).

I. Overview of Support Vector Machines

Figure 3:
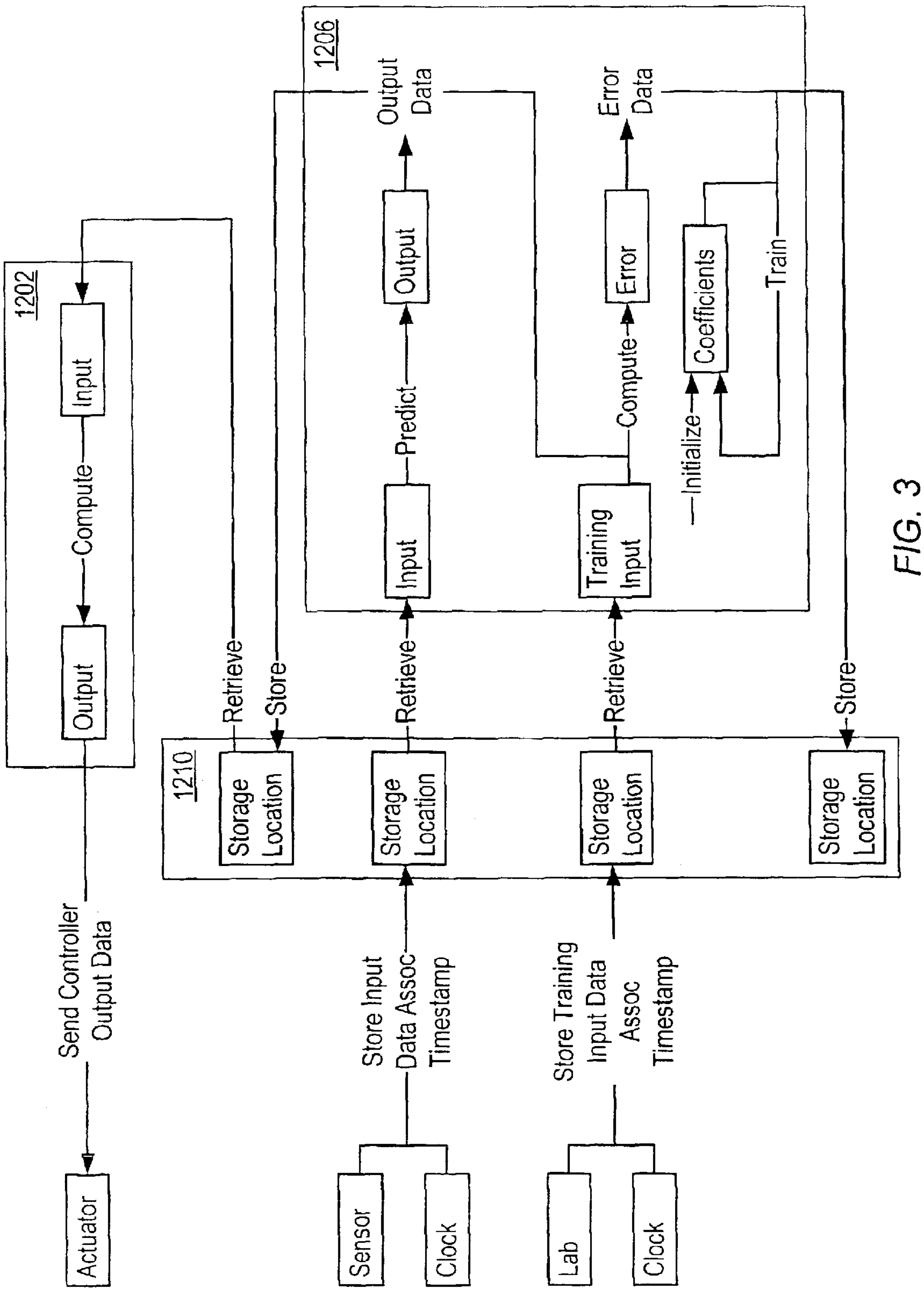
FIG. 3 is a nomenclature diagram illustrating one embodiment of the present invention at a high level.

FIG. 3 may provide a reference of consistent terms for describing an embodiment of the present invention. FIG. 3 is a nomenclature diagram which shows the various names for elements and actions used in describing various embodiments of the present invention. In referring to FIG. 3, the boxes may indicate elements in the architecture and the labeled arrows may indicate actions.

As discussed below in greater detail, one embodiment of the present invention essentially utilizes support vector machines to provide predicted values of important and not readily obtainable process conditions 1906 and/or product properties 1904 to be used by a controller 1202 to produce controller output data 1208 used to control the process 1212.

Figure 4:
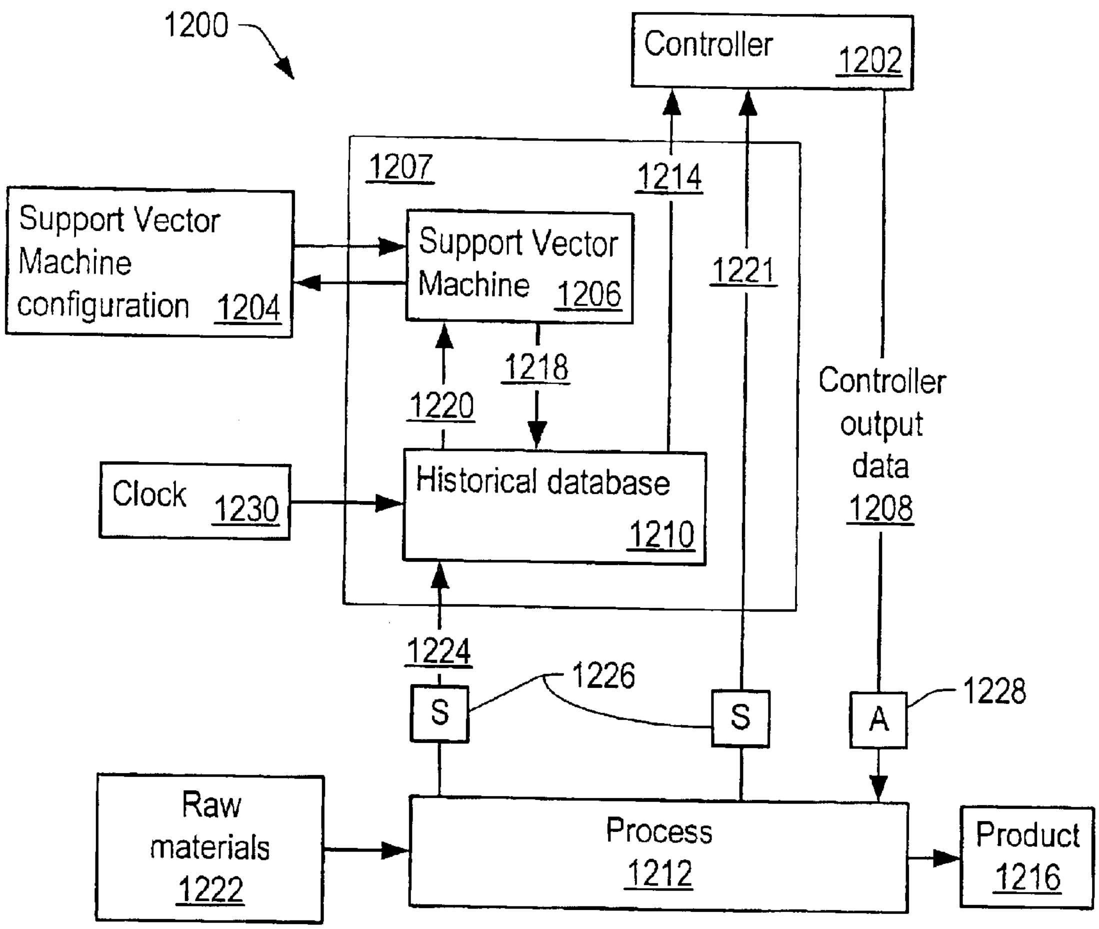
FIG. 4 is a representation of the architecture of an embodiment of the present invention.

As shown in FIG. 4, a support vector machine 1206 may operate in conjunction with a historical database 1210 which provides input sensor(s) data 1220. It should be noted that the embodiment described herein relates to process control, such as of a manufacturing plant. It should be understood, however, that the drawings and detailed description thereto are not intended to limit the invention to process control, but on the contrary, various embodiments of the invention may be contemplated to be applicable in many other areas as well, such as process measurement, manufacturing, supervisory control, regulatory control functions, optimization, real-time optimization, decision-making systems, data analysis, data mining, e-marketplaces, e-commerce, financial analysis, stock and/or bond analysis/management, as well as any other field or domain where predictive or classification models may be useful. Thus, specific steps or modules described herein which apply only to process control embodiments may be different, or omitted as appropriate or desired. It should also be noted that in various embodiments of the present invention, components described herein as sensors or actuators may comprise software constructs or operations which provide or control information or information processes, rather than physical phenomena or processes.

Figure 5:
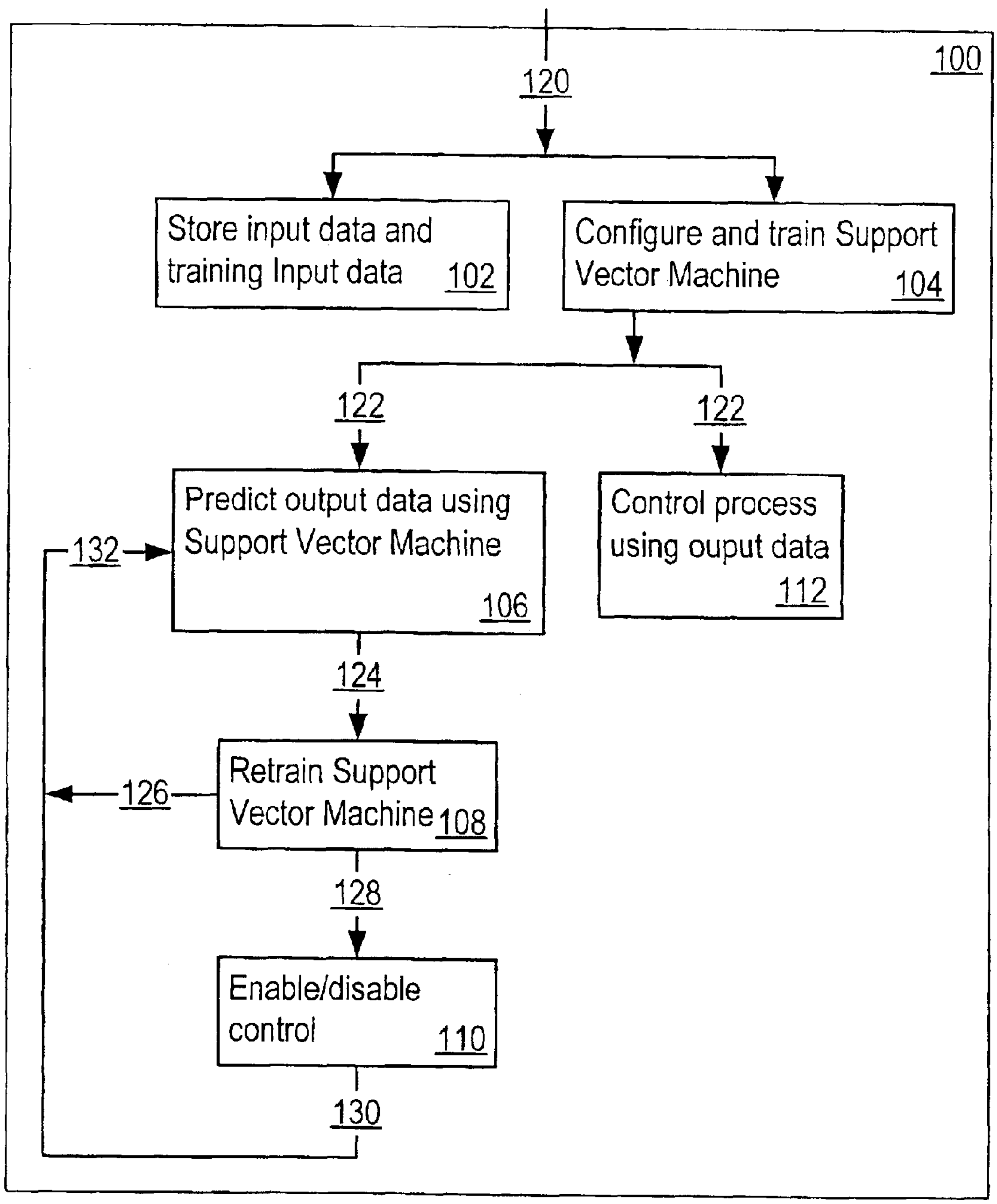
FIG. 5 is a high level block diagram of the six broad steps included in one embodiment of a support vector machine process control system and method according to the present invention.

Referring now to FIGS. 4 and 5, input data and training input data may be stored in a historical database with associated timestamps as indicated by a step or module 102. In parallel, the support vector machine 1206 may be configured and trained in a step or module 104. The support vector machine 1206 may be used to predict output data 1218 using input data 1220, as indicated by a step or module 106. The support vector machine 1206 may then be retrained in a step or module 108, and control using the output data may be enabled or disabled in a step or module 110. In parallel, control of the process using the output data may be performed in a step or module 112. Thus, the system may collect and store the appropriate data, may configure and may train the support vector machine, may use the support vector machine to predict output data, and may enable control of the process using the predicted output data.

Various embodiments of the present invention utilize a support vector machine 1206, and are described in detail below.

In order to fully appreciate the various aspects and benefits produced by the various embodiments of the present invention, an understanding of support vector machine technology is useful. For this reason, the following section discusses support vector machine technology as applicable to the support vector machine 1206 of various embodiments of the system and method of the present invention.

A. Introduction

Historically, classifiers have been determined by choosing a structure, and then selecting a parameter estimation algorithm used to optimize some cost function. The structure chosen may fix the best achievable generalization error, while the parameter estimation algorithm may optimize the cost function with respect to the empirical risk.

There are a number of problems with this approach, however. These problems may include:

1. The model structure needs to be selected in some manner. If this is not done correctly, then even with zero empirical risk, it is still possible to have a large generalization error.

2. If it is desired to avoid the problem of over-fitting, as indicated by the above problem, by choosing a smaller model size or order, then it may be difficult to fit the training data (and hence minimize the empirical risk).

3. Determining a suitable learning algorithm for minimizing the empirical risk may still be quite difficult. It may be very hard or impossible to guarantee that the correct set of parameters is chosen.

The support vector method is a recently developed technique which is designed for efficient multidimensional function approximation. The basic idea of support vector machines (SVMs) is to determine a classifier or regression machine which minimizes the empirical risk (i.e., the training set error) and the confidence interval (which corresponds to the generalization or test set error), that is, to fix the empirical risk associated with an architecture and then to use a method to minimize the generalization error. One advantage of SVMs as adaptive models for binary classification and regression is that they provide a classifier with minimal VC (Vapnik-Chervonenkis) dimension which implies low expected probability of generalization errors. SVMs may be used to classify linearly separable data and nonlinearly separable data. SVMs may also be used as nonlinear classifiers and regression machines by mapping the input space to a high dimensional feature space. In this high dimensional feature space, linear classification may be performed.

In the last few years, a significant amount of research has been performed in SVMs, including the areas of learning algorithms and training methods, methods for determining the data to use in support vector methods, and decision rules, as well as applications of support vector machines to speaker identification, and time series prediction applications of support vector machines.

Support vector machines have been shown to have a relationship with other recent nonlinear classification and modeling techniques such as: radial basis function networks, sparse approximation, PCA (principle components analysis), and regularization. Support vector machines have also been used to choose radial basis function centers.

A key to understanding SVMs is to see how they introduce optimal hyperplanes to separate classes of data in the classifiers. The main concepts of SVMs are reviewed in the next section.

B. How Support Vector Machines Work

The following describes support vector machines in the context of classification, but the general ideas presented may also apply to regression, or curve and surface fitting.

1. Optimal Hyperplanes

Consider an m-dimensional input vector $x=[x_1, \ldots, x_m]^T \in X \subset R^m$ and a one-dimensional output $y \in$ {−1,1}. Let there exist n training vectors $(x_i,y_i)$ i=1, . . . , n. Hence we may write $X=[x_1 x_2 \ldots x_n]$ or $$X = \begin{bmatrix} X_{11} & \ldots & X_{1n} \\ & \ddots & \\ \vdots & & \vdots \\ & . & \\ X_{m1} & \ldots & X_{mn} \end{bmatrix} \tag{1}$$

A hyperplane capable of performing a linear separation of the training data is described by $$w^T x + b = 0 \tag{2}$$

where $w=[w_1 w_2 \ldots w_m]^T$, $w \in W \subset R^m$.

The concept of an optimal hyperplane was proposed by Vladimir Vapnik. For the case where the training data is linearly separable, an optimal hyperplane separates the data without error and the distance between the hyperplane and the closest training points is maximal.

2. Canonical Hyperplanes

A canonical hyperplane is a hyperplane (in this case we consider the optimal hyperplane) in which the parameters are normalized in a particular manner.

Consider (2) which defines the general hyperplane. It is evident that there is some redundancy in this equation as far as separating sets of points. Suppose we have the following classes $$y_i[w^T x_i + b] \geqq 1 \quad i=1, \ldots, n \tag{3}$$

where $y \in [-1,1]$.

One way in which we may constrain the hyperplane is to observe that on either side of the hyperplane, we may have $w^T x+b>0$ or $w^T x+b<0$. Thus, if we place the hyperplane midway between the two closest points to the hyperplane, then we may scale w,b such that $$\min_{\substack{i \\ 1 \ldots n}} = |w^T x_i + b| = 0 \tag{4}$$

Now, the distance d from a point $x_i$ to the hyperplane denoted by (w,b) is given by $$d(w, b; x_i) = \frac{|w^T x_i + b|}{\|w\|} \tag{5}$$

where $\|w\| = w^T w$. By considering two points on opposite sides of the hyperplane, the canonical hyperplane is found by maximizing the margin $$\begin{aligned} p(w, b) &= \min_{i;y_i=1} d(w, b; x_i) + \min_{j;yj=1} d(w, b; x_j) \\ &= \frac{2}{\|w\|} \end{aligned} \tag{6}$$

This implies that the minimum distance between two classes i and j is at least $[2/(\|w\|)]$.

Hence an optimization function which we seek to minimize to obtain canonical hyperplanes, is $$J(w) = \frac{1}{2}\|w\|^2 \tag{7}$$

Normally, to find the parameters, we would minimize the training error and there are no constraints on w,b. However, in this case, we seek to satisfy the inequality in (3). Thus, we need to solve the constrained optimization problem in which we seek a set of weights which separates the classes in the usually desired manner and also minimizing J(w), so that the margin between the classes is also maximized. Thus, we obtain a classifier with optimally separating hyperplanes.

C. An SVM Learning Rule

For any given data set, one possible method to determine $w_0,b_0$ such that (8) is minimized would be to use a constrained form of gradient descent. In this case, a gradient descent algorithm is used to minimize the cost function J(w), while constraining the changes in the parameters according to (3). A better approach to this problem however, is to use Lagrange multipliers which is well suited to the nonlinear constraints of (3). Thus, we introduce the Lagrangian equation:

$$L(w, b, \alpha) = \frac{1}{2}\|w\|^2 - \sum_{i=1}^{n} \alpha_i (y_i [w^T x_i + b] - 1) \tag{8}$$

where $\alpha_i$ are the Lagrange multipliers and $\alpha_i>0$.

The solution is found by maximizing L with respect to $\alpha_i$ and minimizing it with respect to the primal variables w and b. This problem may be transformed from the primal case into its dual and hence we need to solve $$\max_{\alpha} \min_{w,b} L(w, b, \alpha) \tag{9}$$

At the solution point, we have the following conditions $$\begin{aligned} \frac{\partial L(w_0, b_0, \alpha_0)}{\partial w} &= 0 \\ \frac{\partial L(w_0, b_0, \alpha_0)}{\partial b} &= 0 \end{aligned} \tag{10}$$

where solution variables $w_0,b_0,\alpha_0$ are found. Performing the differentiations, we obtain respectively, $$\begin{aligned} \sum_{i=1}^{n} \alpha_{0i} y_i &= 0 \\ w_0 &= \sum_{i=1}^{n} \alpha_{0i} x_i y_i \end{aligned} \tag{11}$$

and in each case $\alpha_{0i}>0$, i=1, . . . ,n.

These are properties of the optimal hyperplane specified by $(w_0,b_0)$. From (14) we note that given the Lagrange multipliers, the desired weight vector solution may be found directly in terms of the training vectors.

To determine the specific coefficients of the optimal hyperplane specified by $(w_0,b_0)$ we proceed as follows. Substitute (13) and (14) into (9) to obtain $$L_D(w,b,\alpha)=\sum_{i=1}^{n}\alpha_i-\frac{1}{2}\sum_{i=1}^{n}\sum_{j=1}^{n}\alpha_i\alpha_j y_i y_j(x_i^T x_j) \tag{12}$$

It is necessary to maximize the dual form of the Lagrangian equation in (15) to obtain the required Lagrange multipliers. Before doing so however, consider (3) once again. We observe that for this inequality, there will only be some training vectors for which the equality holds true. That is, only for some $(x_i,y_i)$ will the following equation hold:

$$y_i[w^T x_i+b]=1 \quad i=1,\ldots,n \tag{13}$$

The training vectors for which this is the case, are called support vectors.

Since we have the Karush-Kühn-Tucker (KKT) conditions that $\alpha_{0i}>0$, i=1, . . . , n and that given by (3), from the resulting Lagrangian equation in (9), we may write a further KKT condition $$\alpha_{0i}(y_i[w_0^T x_i+b_0]-1)=0 \quad i=1,\ldots,n \tag{14}$$

This means, that since the Lagrange multipliers $\alpha_{0i}$ are nonzero with only the support vectors as defined in (16), the expansion of $w_0$ in (14) is with regard to the support vectors only.

Hence we have $$w_0=\sum_{i\subset S}\alpha_{0i}x_i y_i \tag{15}$$

where S is the set of all support vectors in the training set. To obtain the Lagrange multipliers $\alpha_{0i}$, we need to maximize (15) only over the support vectors, subject to the constraints $\alpha_{0i}>0$, i=1, . . . ,n and that given in (13). This is a quadratic programming problem and may be readily solved. Having obtained the Lagrange multipliers, the weights $w_0$ may be found from (18).

D. Classification of Linearly Separable Data

A support vector machine which performs the task of classifying linearly separable data is defined as $$f(\dot{x})=sgn\{w^T x+b\} \tag{16}$$

where w,b are found from the training set. Hence may be written as $$f(x)=sgn\left\{\sum_{i\subset S}\alpha_{0i}y_i(x_i^T x)+b_0\right\} \tag{17}$$

where $\alpha_{0i}$ are determined from the solution of the quadratic programming problem in (15) and $b_0$ is found as $$b_0=\frac{1}{2}(w_0^T x_i^+ + w_0^T x_i^-) \tag{18}$$

where $x_i^+$ and $x_i^-$ are any input training vector examples from the positive and negative classes respectively. For greater numerical accuracy, we may also use $$b_0=\frac{1}{2n}\sum_{i=1}^{n}(w_0^T x_i^+ + w_0^T x_i^-) \tag{19}$$

E. Classification of Nonlinearly Separable Data

For the case where the data is nonlinearly separable, the above approach can be extended to find a hyperplane which minimizes the number of errors on the training set. This approach is also referred to as soft margin hyperplanes. In this case, the aim is to $$y_i[w^T x_i+b]\geqq 1-\xi_i \quad i=1,\ldots,n \tag{20}$$

where $\xi_i>0$, i=1, . . . ,n. In this case, we seek to minimize to optimize $$J(w,\xi)=\frac{1}{2}\|w\|^2+C\sum_{i=1}^{n}\xi_i \tag{21}$$

F. Nonlinear Support Vector Machines

For some problems, improved classification results may be obtained using a nonlinear classifier. Consider (20) which is a linear classifier. A nonlinear classifier may be obtained using support vector machines as follows.

The classifier is obtained by the inner product $x_i^T x$ where $i\subset S$, the set of support vectors. However, it is not necessary to use the explicit input data to form the classifier. Instead, all that is needed is to use the inner products between the support vectors and the vectors of the feature space.

That is, by defining a kernel $$K(x_i,x)=x^{iT}x \tag{22}$$

a nonlinear classifier can be obtained as $$f(x)=sgn\left\{\sum_{i\subset S}\alpha_{0i}y_i K(x_i,x)+b_0\right\} \tag{23}$$

G. Kernel Functions

A kernel function may operate as a basis function for the support vector machine. In other words, the kernel function may be used to define a space within which the desired classification or prediction may be greatly simplified. Based on Mercer's theorem, as is well known in the art, it is possible to introduce a variety of kernel functions, including:

1. Polynomial

The $p^{th}$ order polynomial kernel function is given by $$K(x_i,x)= \tag{24}$$

2. Radial Basis Function $$K(x_i,x)=e \tag{25}$$

where $\gamma>0$.

3. Multilayer Networks

A multilayer network may be employed as a kernel function as follows. We have $$K(x_i,x)=\sigma(\theta(x_i^T x)+\phi) \tag{26}$$

where $\sigma$ is a sigmoid function.

Note that the use of a nonlinear kernel permits a linear decision function to be used in a high dimensional feature space. We find the parameters following the same procedure as before. The Lagrange multipliers may be found by maximizing the functional $$L_D(w, b, \alpha) = \sum_{i=1}^{n} \alpha_i - \frac{1}{2}\sum_{i=1}^{n}\sum_{j=1}^{n} \alpha_i \alpha_j y_i y_j K(x_i, x) \quad (27)$$

When support vector methods are applied to regression or curve-fitting, a high-dimensional "tube" with a radius of acceptable error is constructed which minimizes the error of the data set while also maximizing the flatness of the associated curve or function. In other words, the tube is an envelope around the fit curve, defined by a collection of data points nearest the curve or surface, i.e., the support vectors.

Thus, support vector machines offer an extremely powerful method of obtaining models for classification and regression. They provide a mechanism for choosing the model structure in a natural manner which gives low generalization error and empirical risk.

H. Construction of Support Vector Machines

Support vector machine 1206 may be built by specifying a kernel function, a number of inputs, and a number of outputs. Of course, as is well known in the art, regardless of the particular configuration of the support vector machine, some type of training process may be used to capture the behaviors and/or attributes of the system or process to be modeled.

Figure 19:
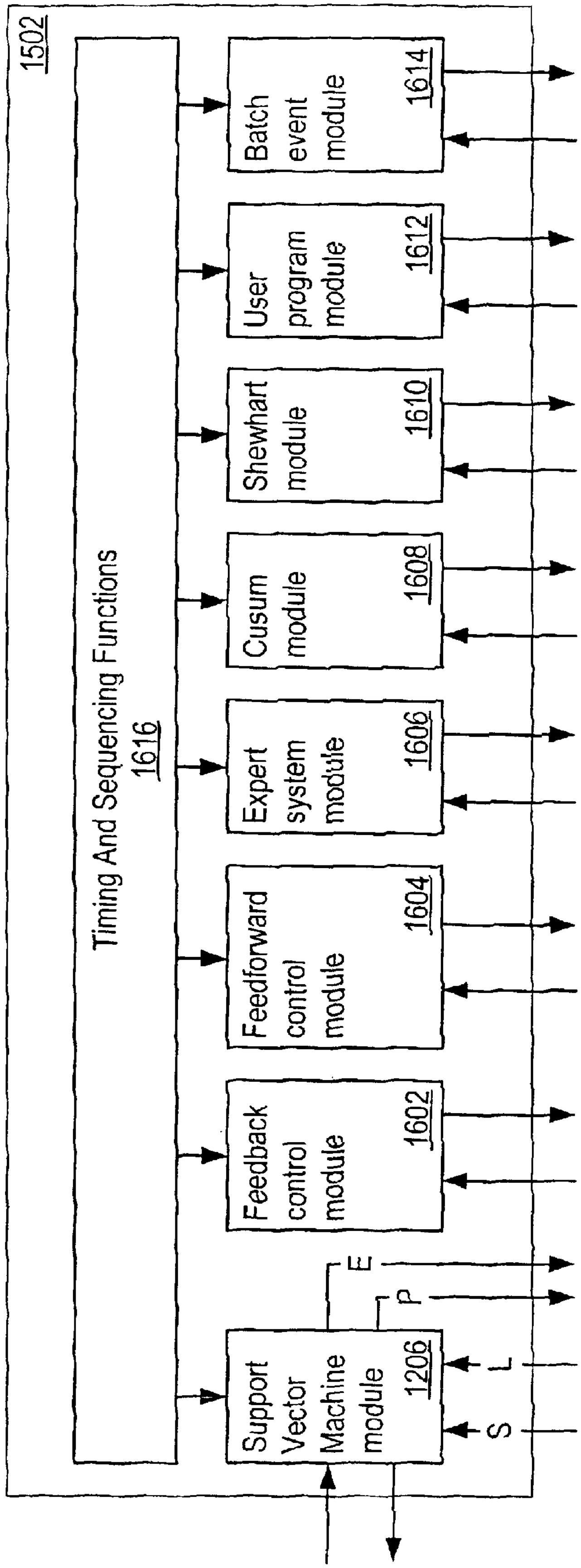
FIG. 19 is a modular version of block 1502 of FIG. 18 illustrating the various different types of modules that may be utilized with a modular support vector machine 1206, according to one embodiment.

The modular aspect of one embodiment of the present invention as shown in FIG. 19 may take advantage of this way of simplifying the specification of a support vector machine. Note that more complex support vector machines may require more configuration information, and therefore more storage.

Various embodiments of the present invention contemplate other types of support vector machine configurations for use with support vector machine 1206. In one embodiment, all that is required for support vector machine 1206 is that the support vector machine be able to be trained and retrained so as to provide the needed predicted values utilized in the process control.

I. Support Vector Machine Training

The coefficients used in support vector machine 1206 may be adjustable constants which determine the values of the predicted output data for given input data for any given support vector machine configuration. Support vector machines may be superior to conventional statistical models because support vector machines may adjust these coefficients automatically. Thus, support vector machines may be capable of building the structure of the relationship (or model) between the input data 1220 and the output data 1218 by adjusting the coefficients. While a conventional statistical model typically requires the developer to define the equation(s) in which adjustable constant(s) are used, the support vector machine 1206 may build the equivalent of the equation(s) automatically.

The support vector machine 1206 may be trained by presenting it with one or more training set(s). The one or more training set(s) are the actual history of known input data values and the associated correct output data values. As described below, one embodiment of the present invention may use the historical database with its associated timestamps to automatically create one or more training set(s).

To train the support vector machine, the newly configured support vector machine is usually initialized by assigning random values to all of its coefficients. During training, the support vector machine 1206 may use its input data 1220 to produce predicted output data 1218.

These predicted output data values 1218 may be used in combination with training input data 1306 to produce error data. These error data values may then be used to adjust the coefficients of the support vector machine.

It may thus be seen that the error between the output data 1218 and the training input data 1306 may be used to adjust the coefficients so that the error is reduced.

J. Advantages of Support Vector Machines

Support vector machines may be superior to computer statistical models because support vector machines do not require the developer of the support vector machine model to create the equations which relate the known input data and training values to the desired predicted values (i.e., output data). In other words, support vector machine 1206 may learn the relationships automatically in the training step or module 104.

However, it should be noted that support vector machine 1206 may require the collection of training input data with its associated input data, also called a training set. The training set may need to be collected and properly formatted. The conventional approach for doing this is to create a file on a computer on which the support vector machine is executed.

In one embodiment of the present invention, in contrast, creation of the training set is done automatically using a historical database 1210 (FIG. 4). This automatic step may eliminate errors and may save time, as compared to the conventional approach. Another benefit may be significant improvement in the effectiveness of the training function, since automatic creation of the training set(s) may be performed much more frequently.

II. Brief Overview

Figure 22:
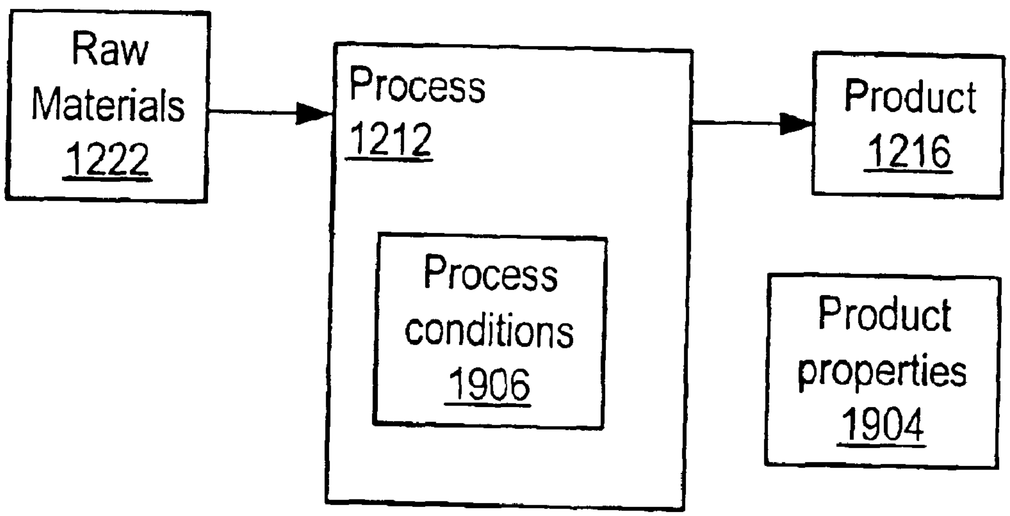
FIG. 22 is a high level block diagram illustrating the key aspects of a process 1212 having process conditions 1906 used to produce a product 1216 having product properties 1904 from raw materials 1222, according to one embodiment.
Figure 23:
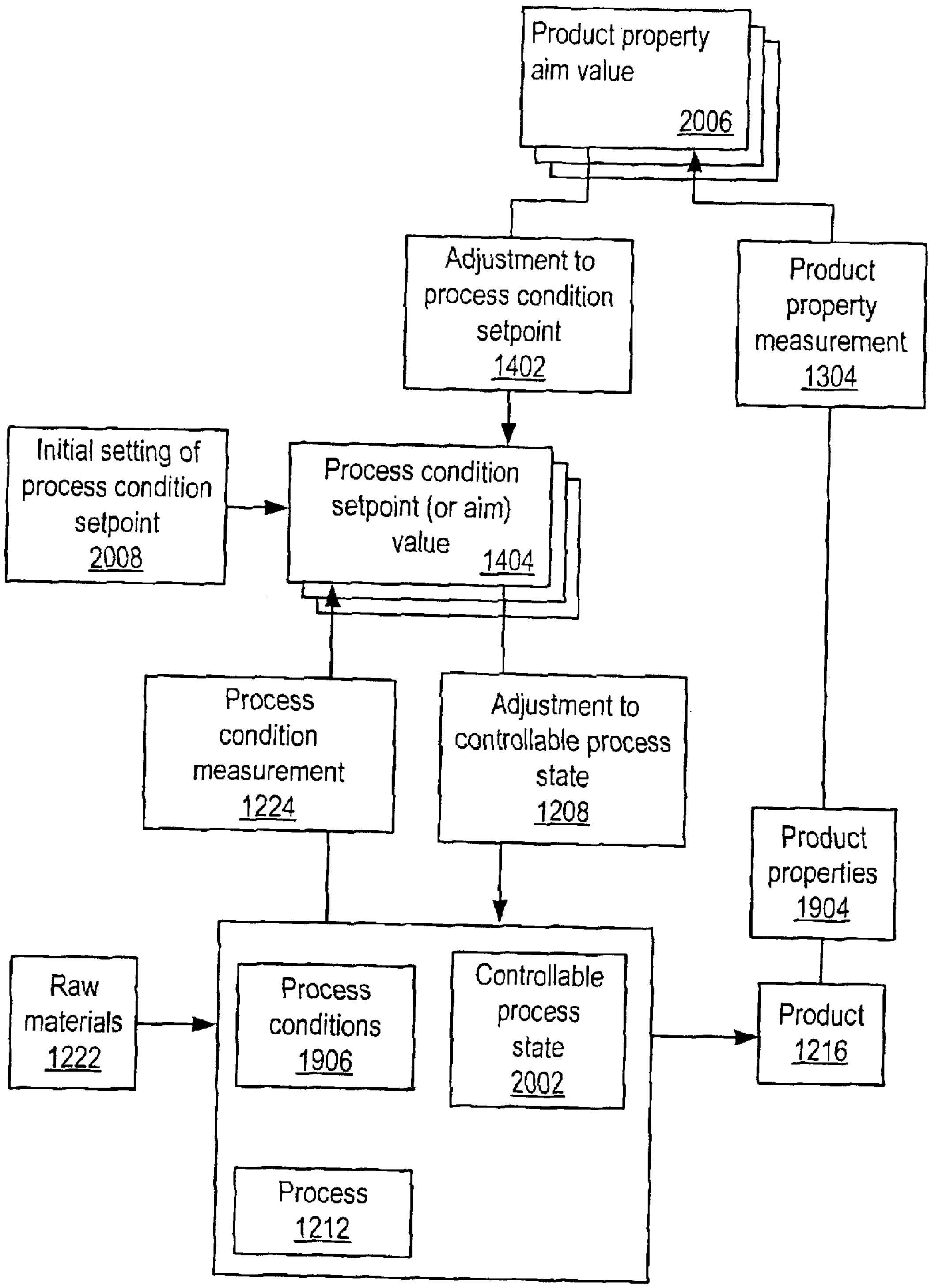
FIG. 23 illustrates the various steps and parameters which may be used to perform the control of process 1212 to produce products 1216 from raw materials 1222, according to one embodiment.

Referring to FIGS. 4 and 5, one embodiment of the present invention may include a computer implemented support vector machine which produces predicted output data values 1218 using a trained support vector machine supplied with input data 1220 at a specified interval. The predicted data 1218 may be supplied via a historical database 1210 to a controller 1202, which may control a process 1212 which may produce a product 1216. In this way, the process conditions 1906 and product properties 1904 (as shown in FIGS. 22 and 23) may be maintained at a desired quality level, even though important process conditions and/or product properties may not be effectively measured directly, or modeled using conventional, fundamental or conventional statistical approaches.

One embodiment of the present invention may be configured by a developer using a support vector machine configuration and step or module 104. Various parameters of the support vector machine may be specified by the developer by using natural language without knowledge of specialized computer syntax and training. For example, parameters specified by the user may include the type of kernel function, the number of inputs, the number of outputs, as well as algorithm parameters such as cost of constraint violations, and convergence tolerance (epsilon). Other possible parameters specified by the user may depend on which kernel is chosen (e.g., for gaussian kernels, one may specify the standard deviation, for polynomial kernels, one may specify the order of the polynomial). In one embodiment, there may be default values (estimates) for these parameters which may be overridden by user input.

In this way, the system may allow an expert in the process being measured to configure the system without the use of a support vector machine expert.

The support vector machine may be automatically trained on-line using input data 1220 and associated training input data 1306 having timestamps (for example, from clock 1230). The input data and associated training input data may be stored in a historical database 1210, which may supply this data (i.e., input data 1220 and associated training input data 1306) to the support vector machine 1206 for training at specified intervals.

The (predicted) output data value 1218 produced by the support vector machine may be stored in the historical database. The stored output data value 1218 may be supplied to the controller 1202 for controlling the process as long as the error data 1504 between the output data 1218 and the training input data 1306 is below an acceptable metric.

The error data 1504 may also be used for automatically retraining the support vector machine. This retraining may typically occur while the support vector machine is providing the controller with the output data, via the historical database. The retraining of the support vector machine may result in the output data approaching the training input data as much as possible over the operation of the process. In this way, an embodiment of the present invention may effectively adapt to changes in the process, which may occur in a commercial application.

A modular approach for the support vector machine, as shown in FIG. 19, may be utilized to simplify configuration and to produce greater robustness. In essence, the modularity may be broken out into specifying data and calling subroutines using pointers.

Figure 24:
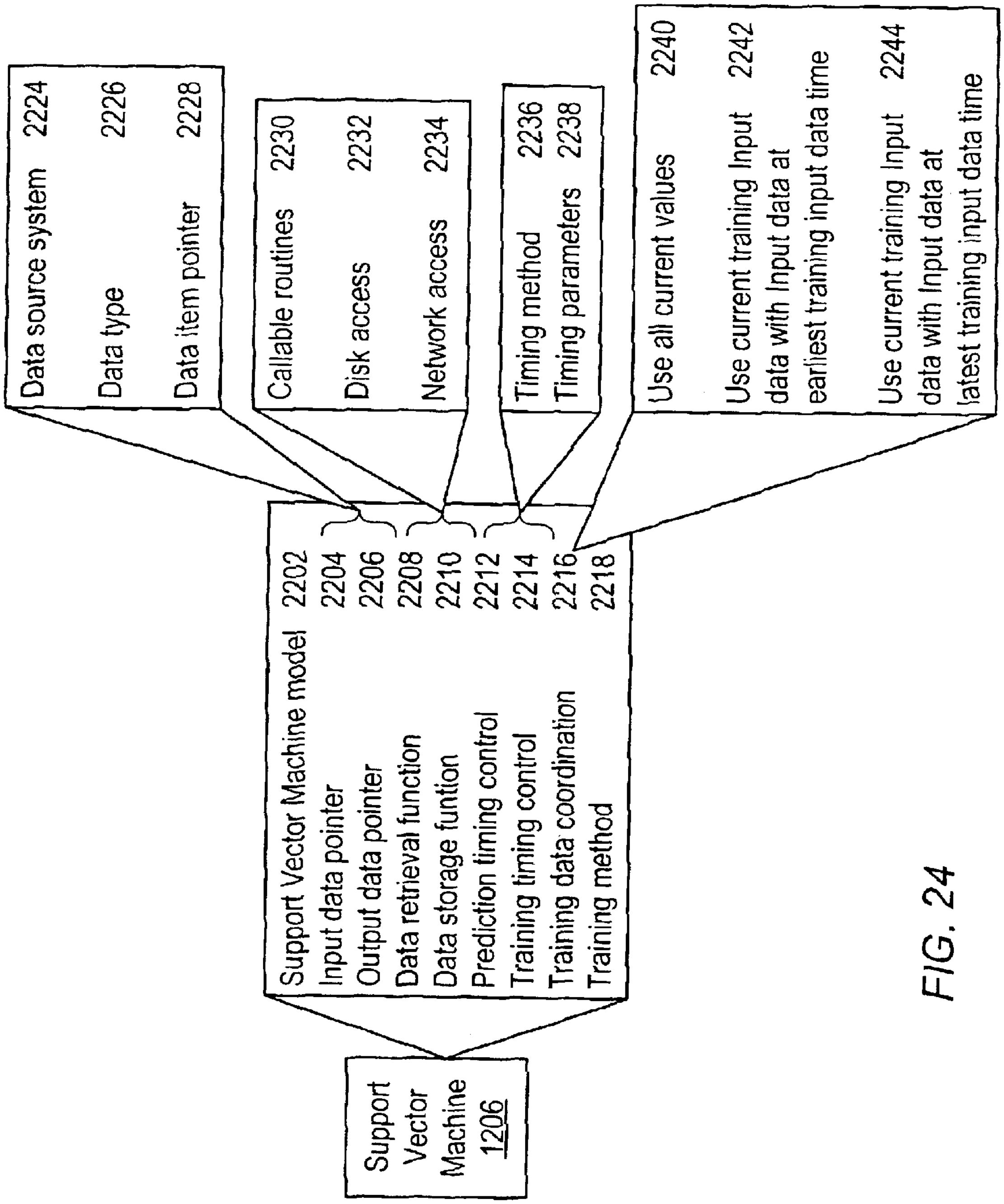
FIG. 24 is an exploded block diagram illustrating the various parameters and aspects that may make up the support vector machine 1206, according to one embodiment.
Figure 29:
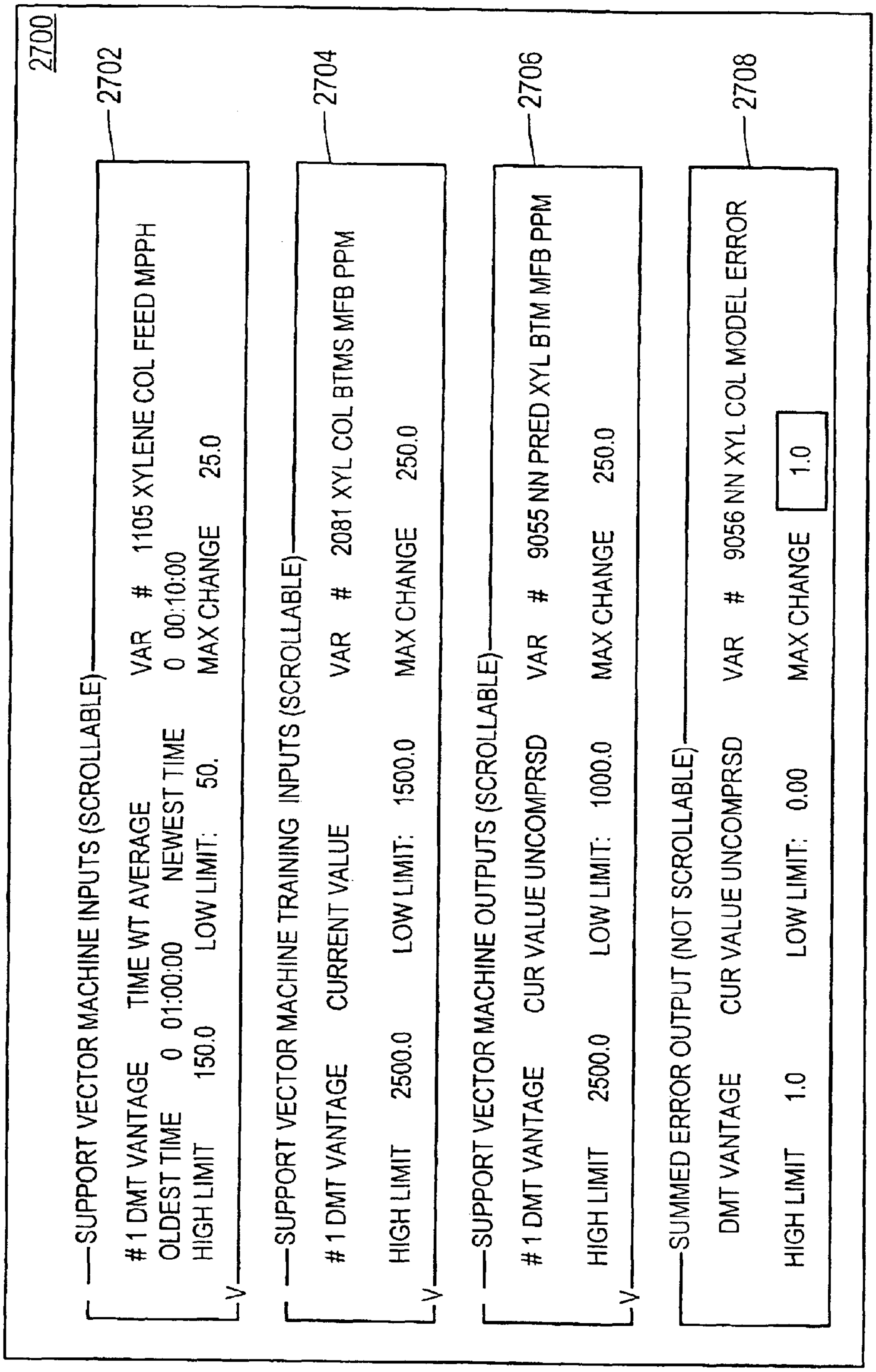
FIG. 29 is a representative computer display of one embodiment of the present invention illustrating part of the data specification of the support vector machine block 1206, according to one embodiment.
Figure 30:
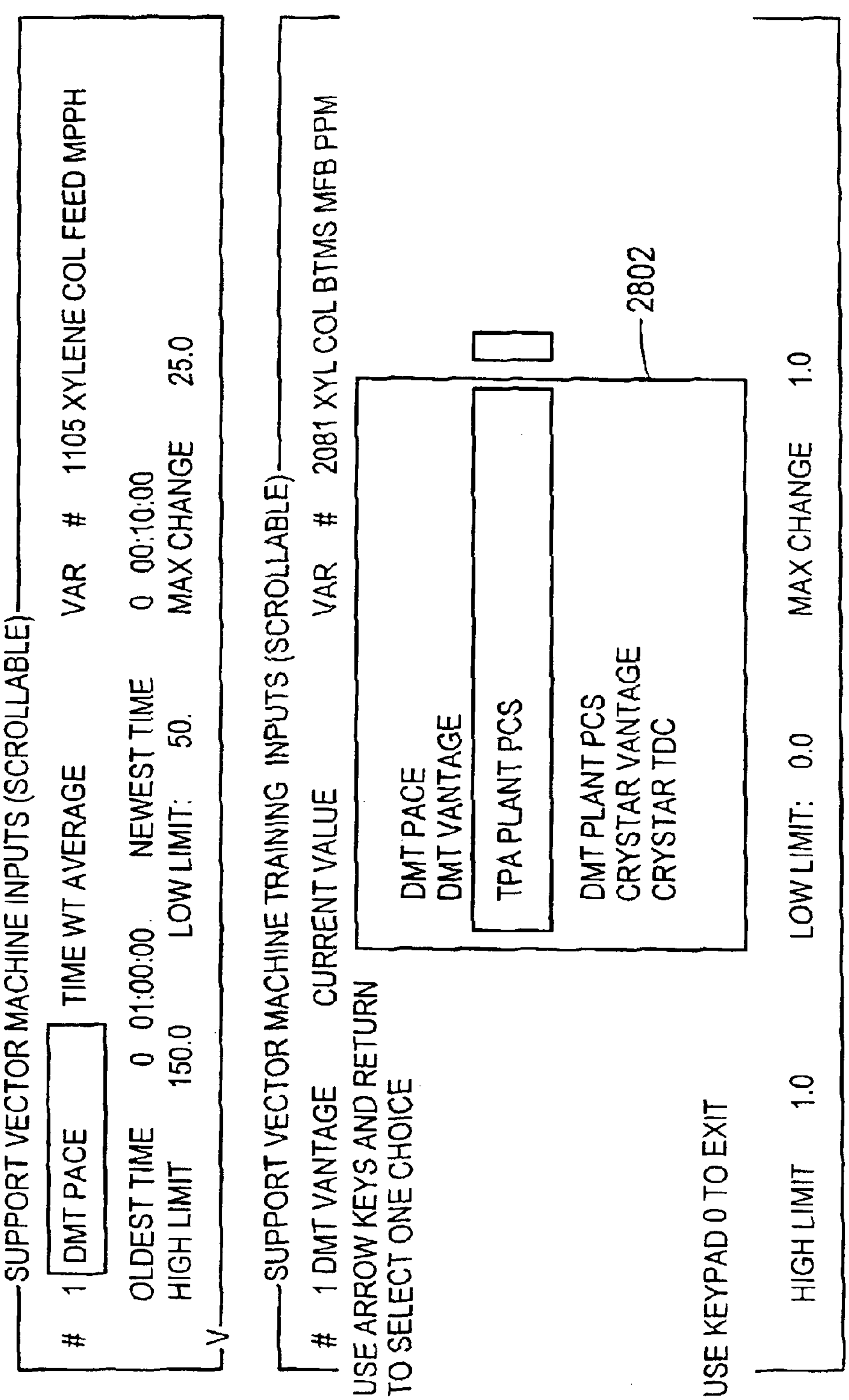
FIG. 30 illustrates a computer screen with a pop-up menu for specifying the data system element of the data specification, according to one embodiment.

In configuring the support vector machine, as shown in FIG. 24, data pointers 2204 and/or 2206 may be specified. A template approach, as shown in FIGS. 29 and 30, may be used to assist the developer in configuring the support vector machine without having to perform any actual programming.

The present invention in various embodiments is an on-line process control system and method. The term "on-line" indicates that the data used in various embodiments of the present invention is collected directly from the data acquisition systems which generate this data. An on-line system may have several characteristics. One characteristic may be the processing of data as the data is generated. This characteristic may also be referred to as real-time operation. Real-time operation in general demands that data be detected, processed, and acted upon fast enough to effectively respond to the situation. In a process control context, real-time may mean that the data may be responded to fast enough to keep the process in the desired control state.

In contrast, off-line methods may also be used. In off-line methods, the data being used may be generated at some point in the past and there typically is no attempt to respond in a way that may effect the situation. It should be understood that while one embodiment of the present invention may use an on-line approach, alternate embodiments may substitute off-line approaches in various steps or modules.

As noted above, the embodiment described herein relates to process control, such as of a manufacturing plant, but is not intended to limit the application of the present invention to that domain, but rather, various embodiments of the invention are contemplated to be applicable in many other areas, as well, such as e-commerce, data analysis, stocks and bonds management and analysis, business decision-making, optimization, e-marketplaces, financial analysis, or any other field of endeavor where predictive or classification models may be useful. Thus, specific steps or modules described herein which apply only to process control embodiments may be different, or omitted as appropriate or as desired.

III. Use in Combination with Expert Systems

The above description of support vector machines and support vector machines as used in various embodiments of the present invention, combined with the description of the problem of making measurements in a process control environment given in the background section, illustrate that support vector machines add a unique and powerful capability to process control systems. SVMs may allow the inexpensive creation of predictions of measurements that may be difficult or impossible to obtain. This capability may open up a new realm of possibilities for improving quality control in manufacturing processes. As used in various embodiments of the present invention, support vector machines serve as a source of input data to be used by controllers of various types in controlling a process. Of course, as noted above, the applications of the present invention in the fields of manufacturing and process control may be illustrative, and are not intended to limit the use of the invention to any particular domain. For example, the "process" being controlled may be a financial analysis process, an e-commerce process, or any other process which may benefit from the use of predictive models.

Expert systems may provide a completely separate and completely complimentary capability for predictive model based systems. Expert systems may be essentially decision-making programs which base their decisions on process knowledge which is typically represented in the form of if-then rules. Each rule in an expert system makes a small statement of truth, relating something that is known or could be known about the process to something that may be inferred from that knowledge. By combining the applicable rules, an expert system may reach conclusions or make decisions which mimic the decision-making of human experts.

The systems and methods described in several of the United States patents and patent applications incorporated by reference above use expert systems in a control system architecture and method to add this decision-making capability to process control systems. As described in these patents and patent applications, expert systems provide a very advantageous function in the implementation of process control systems.

The present system adds a different capability of substituting support vector machines for measurements which may be difficult to obtain. The advantages of the present system may be both consistent with and complimentary to the capabilities provided in the above-noted patents and patent applications using expert systems. The combination of support vector machine capability with expert system capability in a control system may provide even greater benefits than either capability provided alone. For example, a process control problem may have a difficult measurement and also require the use of decision-making techniques in structuring or implementing the control response. By combining support vector machine and expert system capabilities in a single control application, greater results may be achieved than using either technique alone.

It should thus be understood that while the system described herein relates primarily to the use of support vector machines for process control, it may very advantageously be combined with the expert system inventions described in the above-noted patents and patent applications to give even greater process control problem solving capability. As described below, when implemented in the modular process control system architecture, support vector machine functions may be easily combined with expert system functions and other control functions to build such integrated process control applications. Thus, while various embodiments of the present invention may be used alone, these various embodiments of the present invention may provide even greater value when used in combination with the expert system inventions in the above-noted patents and patent applications.

IV. One Method of Operation

One method of operation of one embodiment of the present invention may store input data and training data, may configure and may train a support vector machine, may predict output data using the support vector machine, may retrain the support vector machine, may enable or may disable control using the output data, and may control the process using output data. As shown in FIG. 5, more than one step or module may be carried out in parallel. As indicated by the divergent order pointer 120, the first two steps or modules in one embodiment of the present invention may be carried out in parallel. First, in step or module 102, input data and training input data may be stored in the historical database with associated timestamps. In parallel, the support vector machine may be configured and trained in step or module 104. Next, two series of steps or modules may be carried out in parallel as indicated by the order pointer 122. First, in step or module 106, the support vector machine may be used to predict output data using input data stored in the historical database. Next, in step or module 108, the support vector machine may be retrained using training input data stored in the historical database. Next, in step or module 110, control using the output data may be enabled or disabled in parallel. In step or module 112, control of the process using the output data may be carried out when enabled by step or module 110.

A. Store Input Data and Training Input Data Step or Module 102

Figure 6:
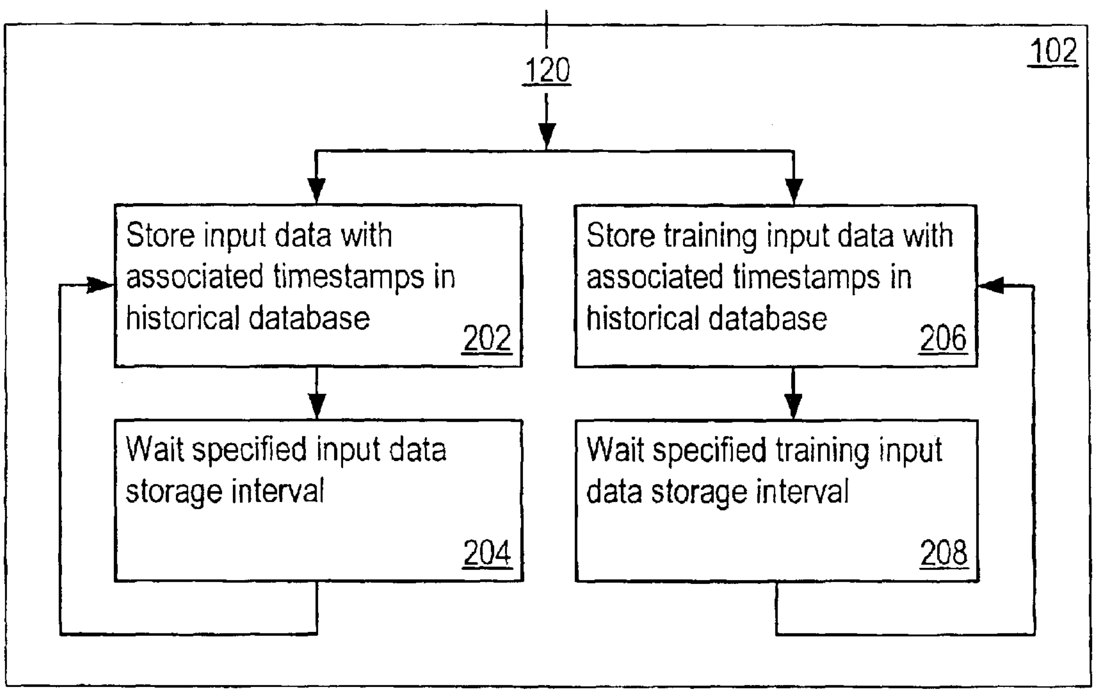
FIG. 6 is an intermediate block diagram of steps and modules included in the store input data and training input data step or module 102 of FIG. 5, according to one embodiment.

As shown in FIG. 5, an order pointer 120 indicates that step or module 102 and step or module 104 may be performed in parallel. Referring now to step or module 102, it is denoted as "store input data and training input data". FIG. 6 may show step or module 102 in more detail.

Referring now to FIGS. 5 and 6, step or module 102 may have the function of storing input data 1220 and storing training input data 1306. Both types of data may be stored in a historical database 1210 (see FIG. 4 and related structure diagrams), for example. Each stored input data and training input data entry in historical database 1210 may utilize an associated timestamp. The associated timestamp may allow the system and method of one embodiment of the present invention to determine the relative time that the particular measurement or predicted value or measured value was taken, produced or derived.

A representative example of step or module 102 is shown in FIG. 6, which is described as follows. The order pointer 120, as shown in FIG. 6, indicates that input data 1220 and training input data 1306 may be stored in parallel in the historical database 1210. Specifically, input data from sensors 1226 (see FIGS. 4 and 16) may be produced by sampling at specific time intervals the sensor signal 1224 provided at the output of the sensor 1226. This sampling may produce an input data value or number or signal. Each of data points may be called an input data 1220 as used in this application. The input data may be stored with an associated timestamp in the historical database 1210, as indicated by step or module 202. The associated timestamp that is stored in the historical database with the input data may indicate the time at which the input data was produced, derived, calculated, etc.

Step or module 204 shows that the next input data value may be stored by step or module 202 after a specified input data storage interval has lapsed or timed out. This input data storage interval realized by step or module 204 may be set at any specific value (e.g., by the user). Typically, the input data storage interval is selected based on the characteristics of the process being controlled.

As shown in FIG. 6, in addition to the sampling and storing of input data at specified input data storage intervals, training input data 1306 may also be stored. Specifically, as shown by step or module 206, training input data may be stored with associated timestamps in the historical database 1210. Again, the associated timestamps utilized with the stored training input data may indicate the relative time at which the training input data was derived, produced or obtained. It should be understood that this usually is the time when the process condition or product property actually existed in the process or product. In other words, since it typically takes a relatively long period of time to produce the training input data (because lab analysis and the like usually has to be performed), it is more accurate to use a timestamp which indicates the actual time when the measured state existed in the process rather than to indicate when the actual training input data was entered into the historical database. This produces a much closer correlation between the training input data 1306 and the associated input data 1220. This close correlation is needed, as is discussed in detail below, in order to more effectively train and control the system and method of various embodiments of the present invention.

The training input data may be stored in the historical database 1210 in accordance with a specified training input data storage interval, as indicated by step or module 208. While this may be a fixed time period, it typically is not. More typically, it is a time interval which is dictated by when the training data is actually produced by the laboratory or other mechanism utilized to produce the training input data 1306. As is discussed in detail herein, this often times takes a variable amount of time to accomplish depending upon the process, the mechanisms being used to produce the training data, and other variables associated both with the process and with the measurement/analysis process utilized to produce the training input data.

What is important to understand here is that the specified input data storage interval is usually considerably shorter than the specified training input data storage interval of step or module 204.

As may be seen, step or module 102 thus results in the historical database 1210 receiving values of input data and training input data with associated timestamps. These values may be stored for use by the system and method of one embodiment of the present invention in accordance with the steps and modules discussed in detail below.

B. Configure and Train Support Vector Machine Step or Module 104

As shown in FIG. 5, the order pointer 120 shows that a configure and train support vector machine step or module 104 may be performed in parallel with the store input data and training input data step or module 102. The purpose of step or module 104 may be to configure and train the support vector machine 1206 (see FIG. 4).

Specifically, the order pointer 120 may indicate that the step or module 104 plus all of its subsequent steps and/or modules may be performed in parallel with the step or module 102.

Figure 7:
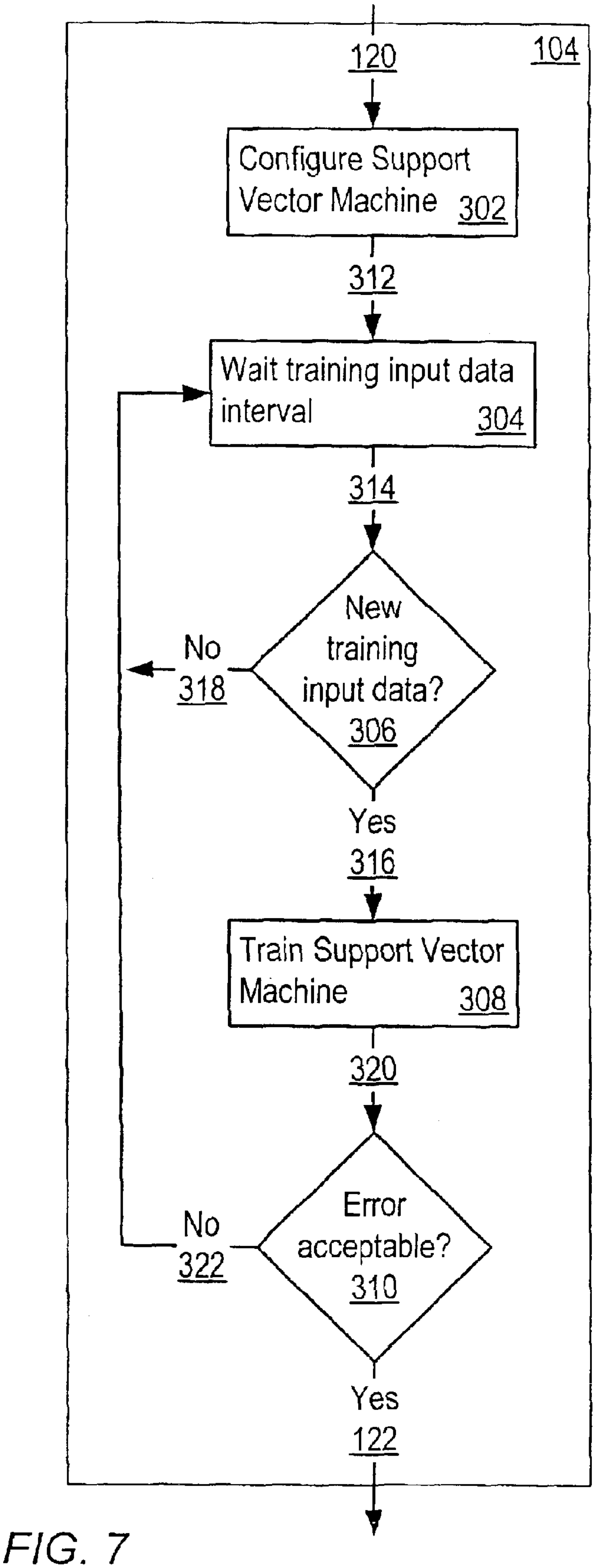
FIG. 7 is an intermediate block diagram of steps and modules included in the configure and train support vector machine step or module 104 of FIG. 5, according to one embodiment.

FIG. 7 shows a representative example of the step or module 104. As shown in FIG. 7, this representative embodiment is made up of five steps and/or modules 302, 304, 306, 308 and 310.

Referring now to FIG. 7, an order pointer 120 shows that the first step or module of this representative embodiment is a configure support vector machine step or module 302.

Configure support vector machine step or module 302 may be used to set up the structure and parameters of the support vector machine 1206 that is utilized by the system and method of one embodiment of the present invention. As discussed below in detail, the actual steps and/or modules utilized to set up the structure and parameters of support vector machine 1206 may be shown in FIG. 12.

After the support vector machine 1206 has been configured in step or module 302, an order pointer 312 indicates that a wait training data interval step or module 304 may occur or may be utilized. The wait training data interval step or module 304 may specify how frequently the historical database 1210 is to be looked at to determine if any new training data to be utilized for training of the support vector machine 1206 exists. It should be noted that the training data interval of step or module 304 may not be the same as the specified training input data storage interval of step or module 206 of FIG. 6. Any desired value for the training data interval may be utilized for step or module 304.

Figure 13:
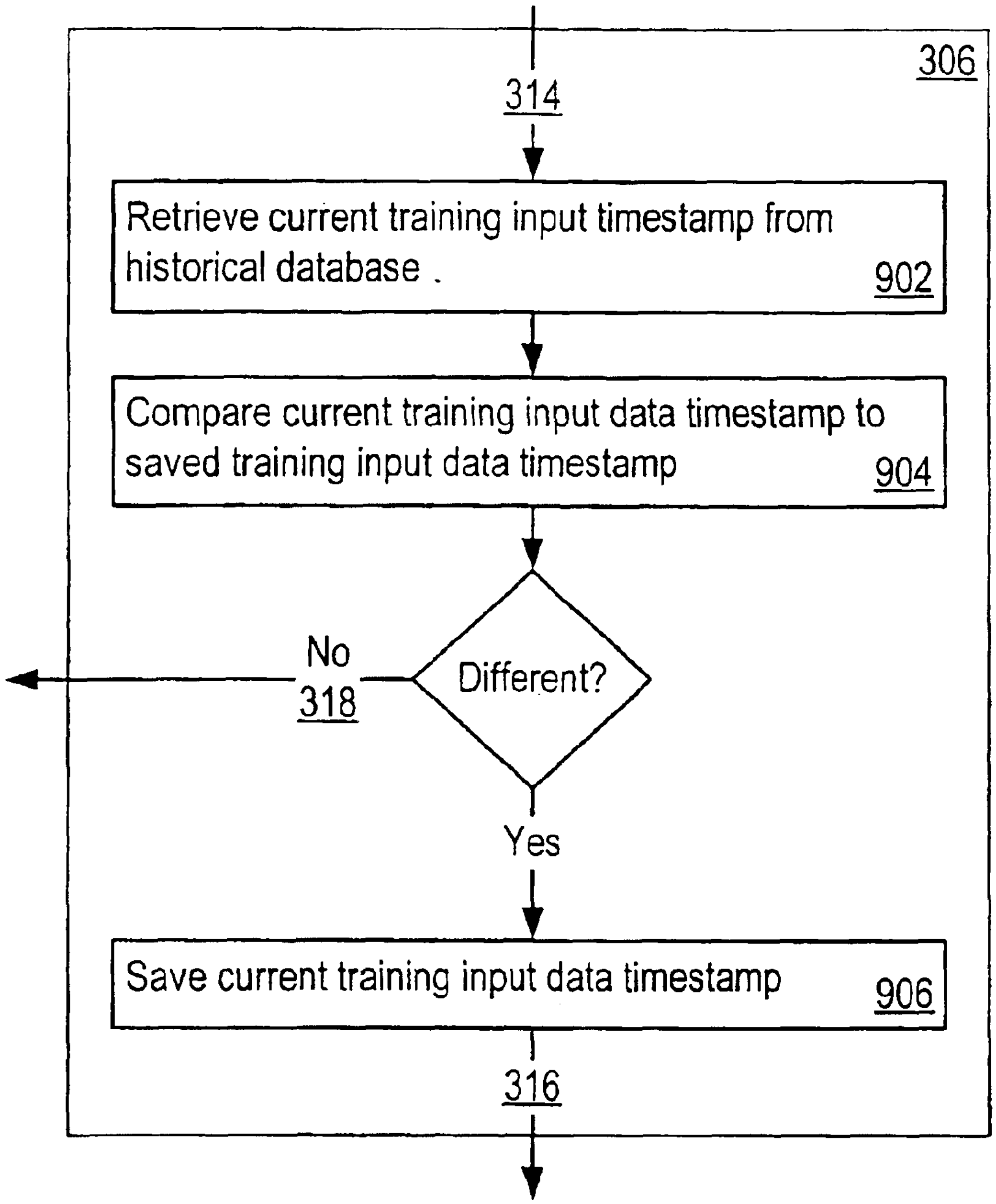
FIG. 13 is a detailed block diagram of the new training input data step or module 306 of FIG. 7, according to one embodiment.

An order pointer 314 indicates that the next step or module may be a new training input data step or module 306. This new training input data step or module 306 may be utilized after the lapse of the training data interval specified by step or module 304. The purpose of step or module 306 may be to examine the historical database 1210 to determine if new training data has been stored in the historical database since the last time the historical database 1210 was examined for new training data. The presence of new training data may permit the system and method of one embodiment of the present invention to train the support vector machine 1206 if other parameters/conditions are met. FIG. 13 discussed below shows a specific embodiment for the step or module 306.

An order pointer 318 indicates that if step or module 306 indicates that new training data is not present in the historical database 1210, the step or module 306 returns operation to the step or module 304.

Figure 14:
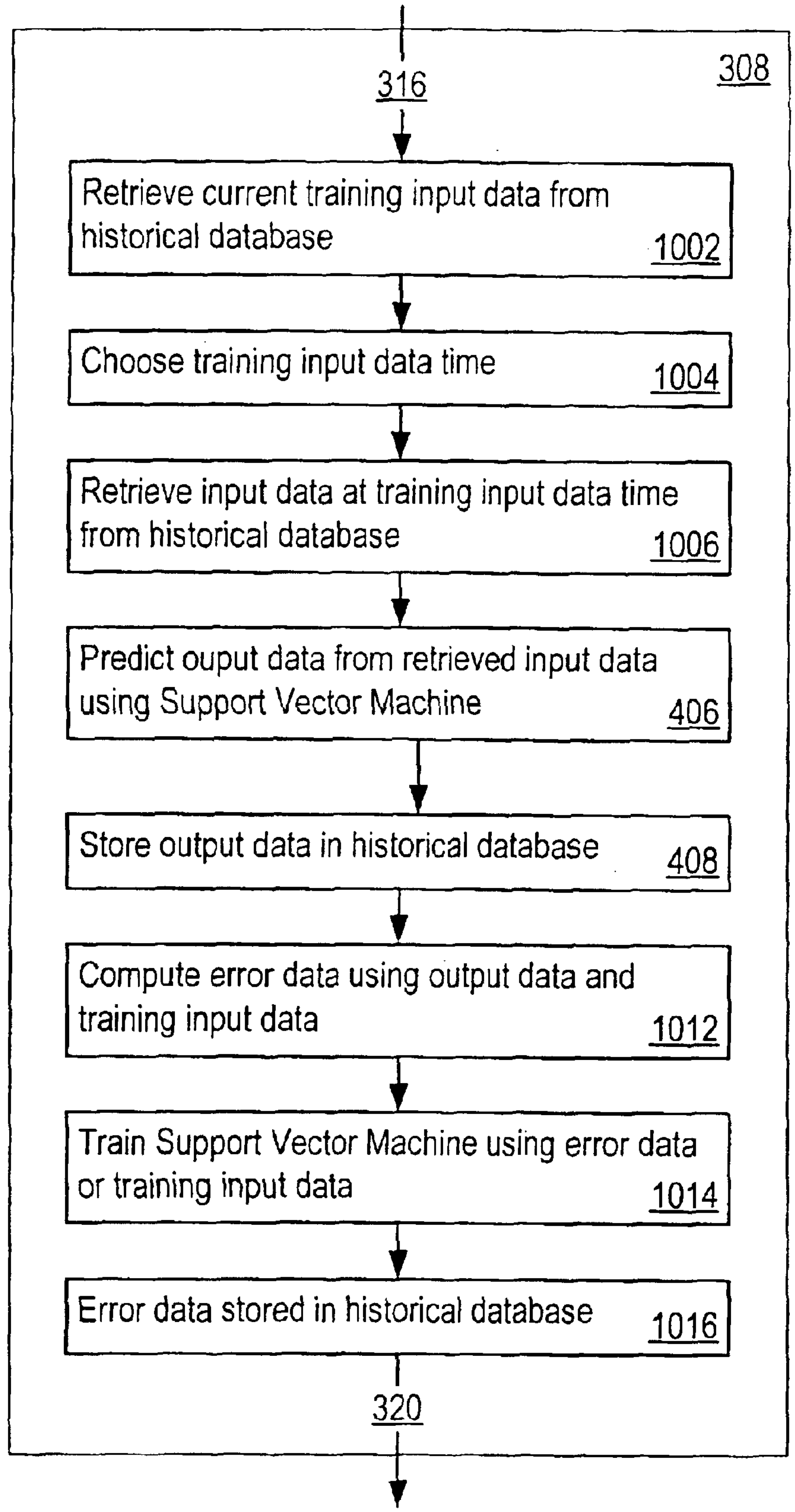
FIG. 14 is a detailed block diagram of the train support vector machine step or module 308 of FIG. 7, according to one embodiment.

In contrast, if new training data is present in the historical database 1210, the step or module 306, as indicated by an order pointer 316, continues processing with a train support vector machine step or module 308. Train support vector machine step or module 308 may be the actual training of the support vector machine 1206 using the new training data retrieved from the historical database 1210. FIG. 14, discussed below in detail, shows a representative embodiment of the train support vector machine step or module 308.

Figure 15:
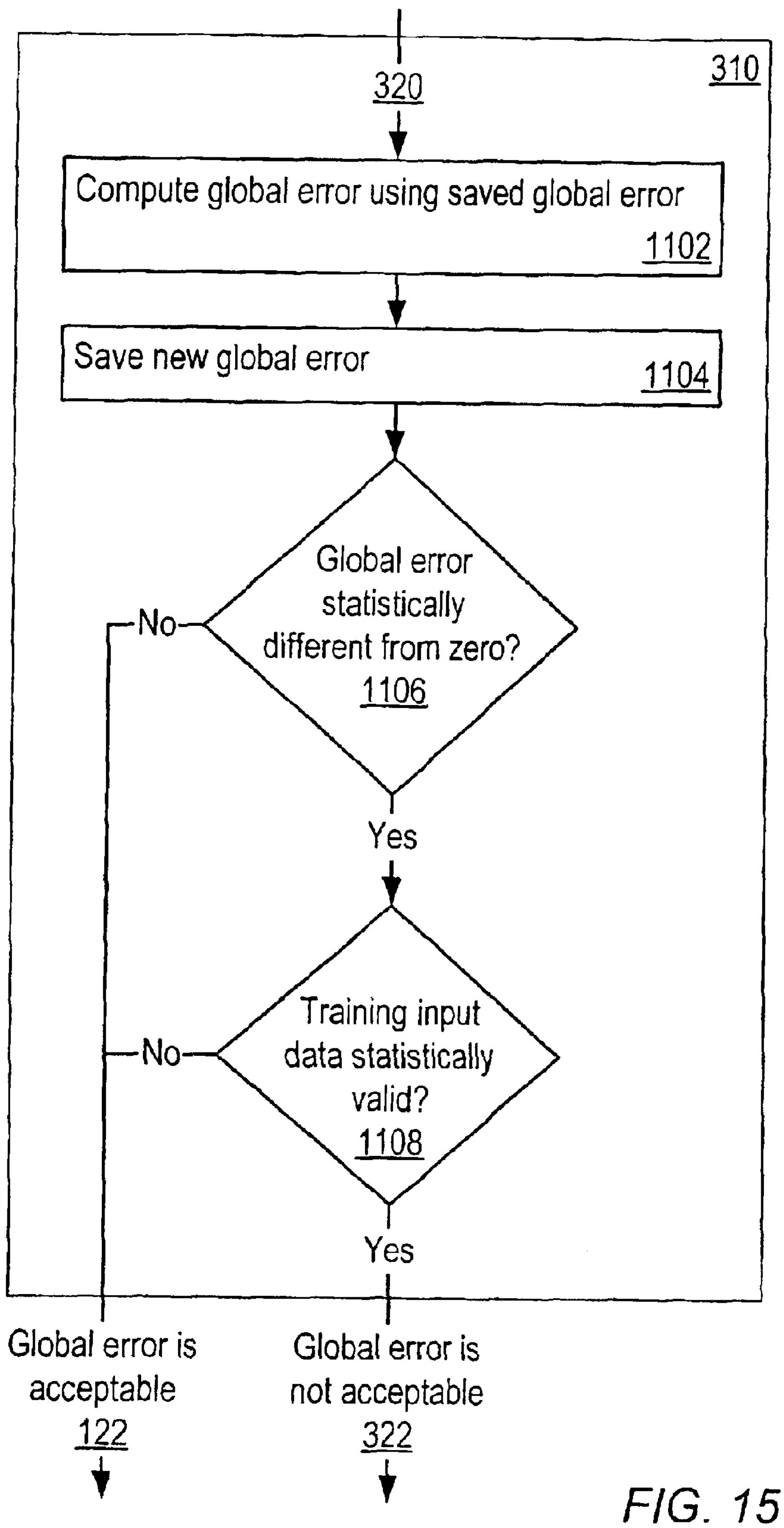
FIG. 15 is a detailed block diagram of the error acceptable step or module 310 of FIG. 7, according to one embodiment.

After the support vector machine has been trained, in step or module 308, the step or module 104 as indicated by an order pointer 320 may move to an error acceptable step or module 310. Error acceptable step or module 310 may determine whether the error data 1504 produced by the support vector machine 1206 is within an acceptable metric, indicating error that the support vector machine 1206 is providing output data 1218 that is close enough to the training input data 1306 to permit the use of the output data 1218 from the support vector machine 1206. In other words, an acceptable error may indicate that the support vector machine 1206 has been "trained" as training is specified by the user of the system and method of one embodiment of the present invention. A representative example of the error acceptable step or module 310 is shown in FIG. 15, which is discussed in detail below.

If an unacceptable error is determined by error acceptable step or module 310, an order pointer 322 indicates that the step or module 104 returns to the wait training data interval step or module 304. In other words, when an unacceptable error exists, the step or module 104 has not completed training the support vector machine 1206. Because the support vector machine 1206 has not completed being trained, training may continue before the system and method of one embodiment of the present invention may move to a step or module 106 discussed below.

In contrast, if the error acceptable step or module 310 determines that an acceptable error from the support vector machine 1206 has been obtained, then the step or module 104 has trained support vector machine 1206. Since the support vector machine 1206 has now been trained, step or module 104 may allow the system and method of one embodiment of the present invention to move to the steps or modules 106 and 112 discussed below.

The specific embodiments for step or module 104 are now discussed.

1. Configure Support Vector Machine Step or Module 302

Figure 12:
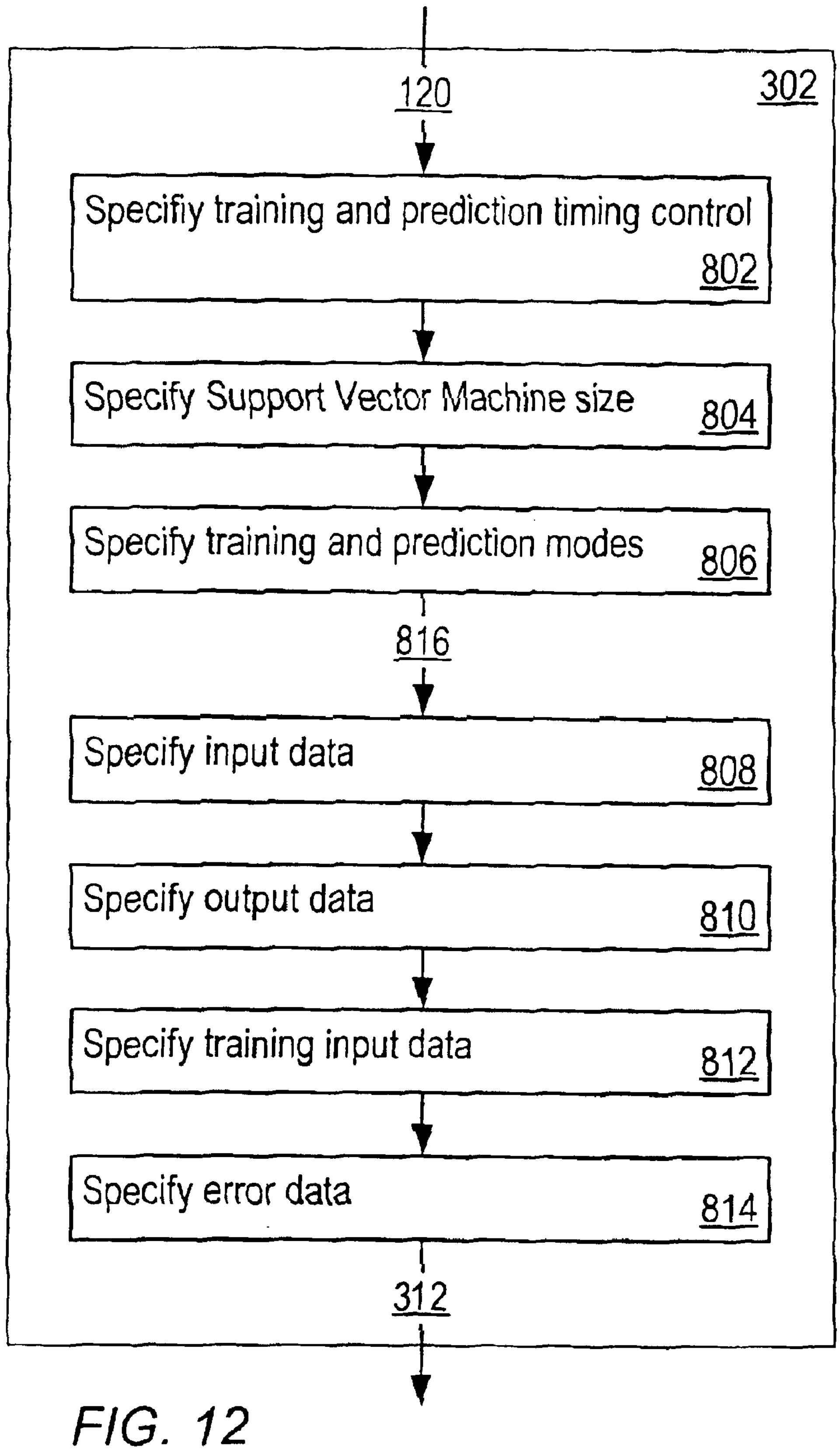
FIG. 12 is a detailed block diagram of the configure support vector machine step or module 302 of the relationship of FIG. 7, according to one embodiment.

Referring now to FIG. 12, a representative embodiment of the configure support vector machine step or module 302 is shown. This step or module 302 may allow the uses of one embodiment of the present invention to both configure and re-configure the support vector machine. Referring now to FIG. 12, the order pointer 120 indicates that the first step or module may be a specify training and prediction timing control step or module 802. Step or module 802 may allow the person configuring the system and method of one embodiment of the present invention to specify the training interval(s) and the prediction timing interval(s) of the support vector machine 1206.

Figure 33:
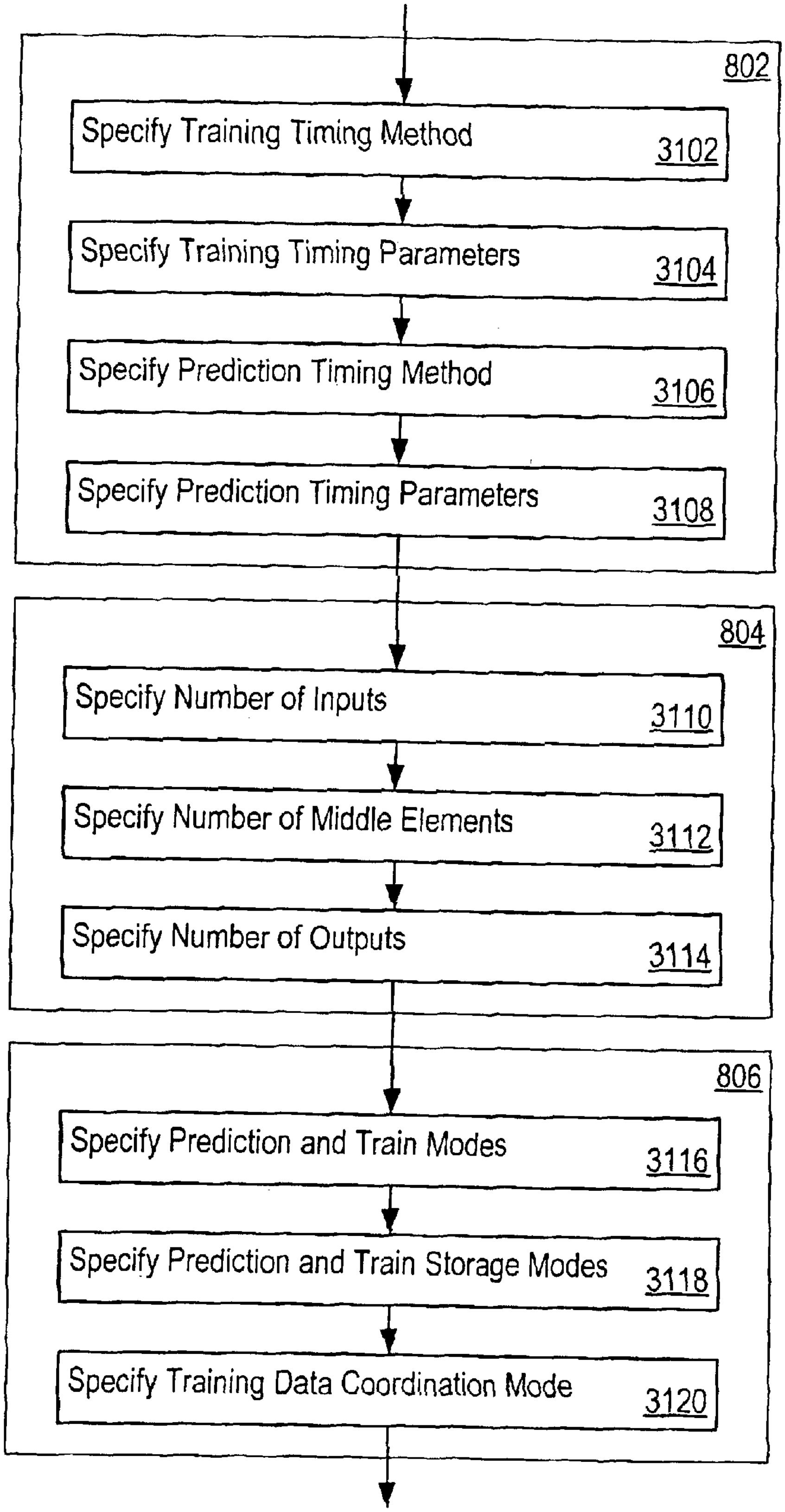
FIG. 33 is a detailed block diagram of embodiments of steps and modules 802, 804 and 806 of FIG. 12.

FIG. 33 shows a representative embodiment of the step or module 802. Referring now to FIG. 33, step or module 802 may be made up of four steps and/or modules 3102, 3104, 3106, and 3108. Step or module 3102 may be a specify training timing method step or module. The specify training timing method step or module 3102 may allow the user configuring one embodiment of the present invention to specify the method or procedure to be followed to determine when the support vector machine 1206 is being trained. A representative example of this may be when all of the training data has been updated. Another example may be the lapse of a fixed time interval. Other methods and procedures may be utilized.

An order pointer indicates that a specify training timing parameters step or module 3104 may then be carried out by the user of one embodiment of the present invention. This step or module 3104 may allow for any needed training timing parameters to be specified. It should be realized that the method or procedure of step or module 3102 may result in zero or more training timing parameters, each of which may have a value. This value may be a time value, a module number (e.g., in the modular embodiment of the present invention of FIG. 19), or a data pointer. In other words, the user may configure one embodiment of the present invention so that considerable flexibility may be obtained in how training of the support vector machine 1206 may occur, based on the method or procedure of step or module 3102.

An order pointer indicates that once the training timing parameters 3104 have been specified, a specify prediction timing method step or module 3106 may be configured by the user of one embodiment of the present invention. This step or module 3106 may specify the method or procedure that may be used by the support vector machine 1206 to determine when to predict output data values 1218 after the SVM has been trained. This is in contrast to the actual training of the support vector machine 1206. Representative examples of methods or procedures for step or module 3106 may include: execute at a fixed time interval, execute after the execution of a specific module, and execute after a specific data value is updated. Other methods and procedures may also be used.

An order indicator in FIG. 33 shows that a specify prediction timing parameters step or module 3108 may then be carried out by the user of one embodiment of the present invention. Any needed prediction timing parameters for the method or procedure of step or module 3106 may be specified. For example, the time interval may be specified as a parameter for the execute at a specific time interval method or procedure. Another example may be the specification of a module identifier when the execute after the execution of a particular module method or procedure is specified. Another example may be a data pointer when the updating of a data value method or procedure is used. Other operation timing parameters may be used.

Referring again to FIG. 12, after the specify training and prediction timing control step or module 802 has been specified, a specify support vector machine size step or module 804 may be carried out. This step or module 804 may allow the user to specify the size and structure of the support vector machine 1206 that is used by one embodiment of the present invention.

Specifically, referring to FIG. 33 again, a representative example of how the support vector machine size may be specified by step or module 804 is shown. An order pointer indicates that a specific number of inputs step or module 3110 may allow the user to indicate the number of inputs that the support vector machine 1206 may have. Note that the source of the input data for the specific number of inputs in the step or module 3110 is not specified. Only the actual number of inputs is specified in the step or module 3110.

In step or module 3112, a kernel function may be determined for the support vector machine. The specific kernel function chosen may determine the kind of support vector machine (e.g., radial basis function, polynomial, multi-layer network, etc.). Depending upon the specific kernel function chosen, additional parameters may be specified. For example, as mentioned above, for gaussian kernels, one may specify the standard deviation, for polynomial kernels, one may specify the order of the polynomial. In one embodiment, there may be default values (estimates) for these parameters which may be overridden by user input.

It should be noted that in other embodiments, various other training or execution parameters of the SVM not shown in FIG. 33 may be specified by the user (e.g., algorithm parameters such as cost of constraint violations, and convergence tolerance (epsilon)).

An order pointer indicates that once the kernel function has been specified in step or module 3112, a specific number of outputs step or module 3114 may allow the user to indicate the number of outputs that the support vector machine 1206 may have. Note that the storage location for the outputs of the support vector machine 1206 is not specified in step or module 3114. Instead, only the actual number of outputs is specified in the step or module 3114.

As discussed herein, one embodiment of the present invention may contemplate any form of presently known or future developed configuration for the structure of the support vector machine 1206. Thus, steps or modules 3110, 3112, and 3114 may be modified so as to allow the user to specify these different configurations for the support vector machine 1206.

Referring again to FIG. 12, once the support vector machine size has been specified in step or module 804, the user may specify the training and prediction modes in a step or module 806. Step or module 806 may allow both the training and prediction modes to be specified. Step or module 806 may also allow for controlling the storage of the data produced in the training and prediction modes. Step or module 806 may also allow for data coordination to be used in training mode.

A representative example of the specific training and prediction modes step or module 806 is shown in FIG. 33. It is made up of step or modules 3116, 3118, and 3120.

As shown, an order pointer indicates that the user may specify prediction and train modes in step or module 3116. These prediction and train modes may be yes/no or on/off settings, in one embodiment. Since the system and method of one embodiment of the present invention is in the train mode at this stage in its operation, step or module 3116 typically goes to its default setting of train mode only. However, it should be understood that various embodiments of the present invention may contemplate allowing the user to independently control the prediction or train modes.

When prediction mode is enabled or "on," the support vector machine 1206 may predict output data values 1218 using retrieved input data values 1220, as described below. When training mode is enabled or "on," the support vector machine 1206 may monitor the historical database 1210 for new training data and may train using the training data, as described below.

An order pointer indicates that once the prediction and train modes have been specified in step or module 3116, the user may specify prediction and train storage modes in step or module 3118. These prediction and train storage modes may be on/off, yes/no values, similar to the modes of step or module 3116. The prediction and train storage modes may allow the user to specify whether the output data produced in the prediction and/or training may be stored for possible later use. In some situations, the user may specify that the output data is not to be stored, and in such a situation the output data will be discarded after the prediction or train mode has occurred. Examples of situations where storage may not be needed include: (1) if the error acceptable metric value in the train mode indicates that the output data is poor and retraining is necessary; (2) in the prediction mode, where the output data is not stored but is only used. Other situations may arise where no storage is warranted.

An order pointer indicates that a specify training data coordination mode step or module 3120 may then be specified by the user. Oftentimes, training input data 1306 may be correlated in some manner with input data 1220. Step or module 3120 may allow the user to deal with the relatively long time period required to produce training input data 1306 from when the measured state(s) existed in the process. First, the user may specify whether the most recent input data is to be used with the training data, or whether prior input data is to be used with the training data. If the user specifies that prior input data is to be used, the method of determining the time of the prior input data may be specified in step or module 3120.

Referring again to FIG. 12, once the specified training and prediction modes step or module 806 has been completed by the user, steps and modules 808, 810, 812 and 814 may be carried out. Specifically, the user may follow specify input data step or module 808, specify output data step or module 810, specify training input data step or module 812, and specify error data step or module 814. Essentially, these four steps and/or modules 808–814 may allow the user to specify the source and destination of input and output data for both the (run) prediction and training modes, and the storage location of the error data determined in the training mode.

Figure 34:
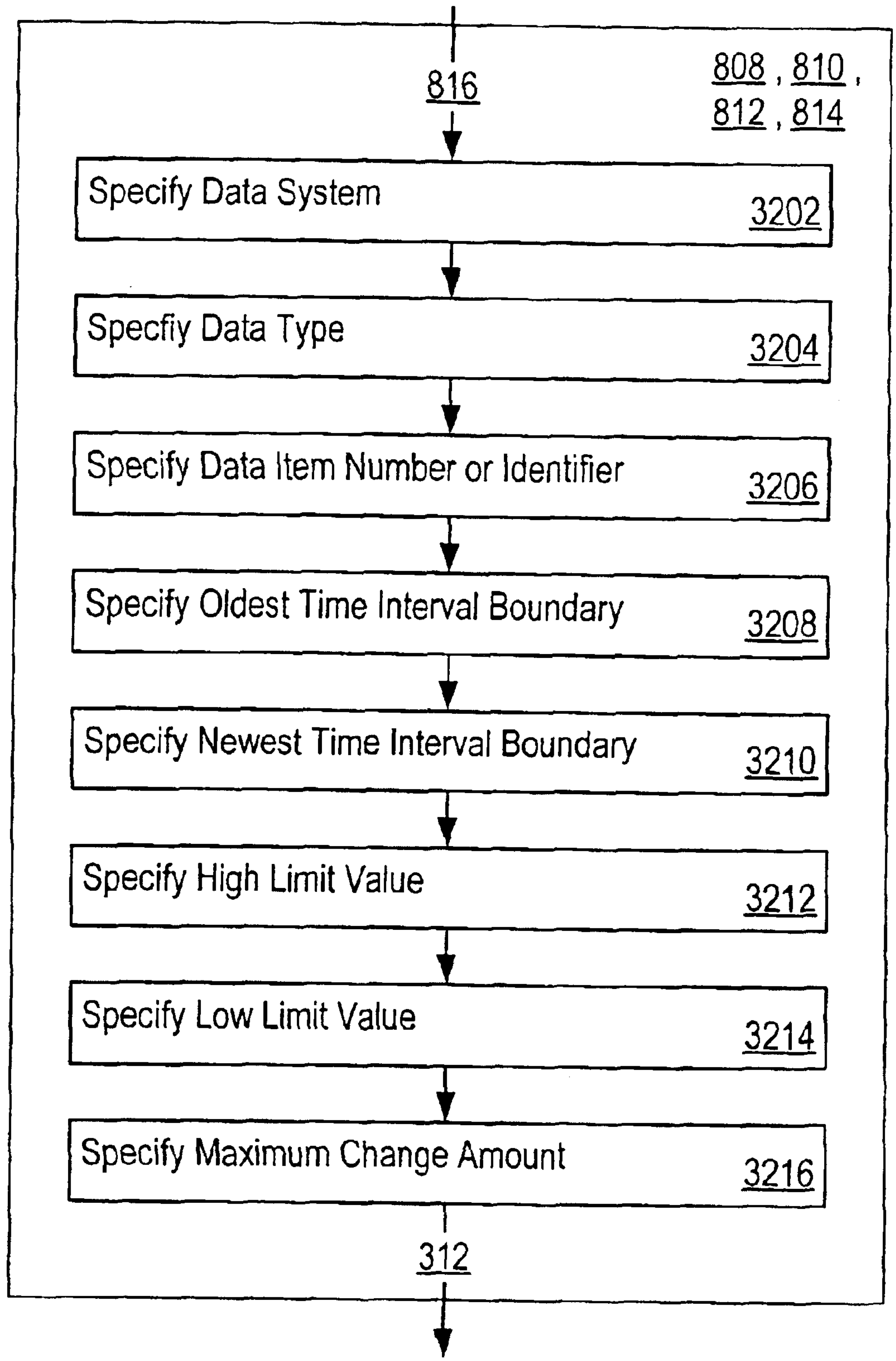
FIG. 34 is a detailed block diagram of embodiments of steps and modules 808, 810, 812 and 814 of FIG. 12.

FIG. 34 shows a representative embodiment used for all of the steps and/or modules 808-814 as follows.

Steps and/or modules 3202, 3204, and 3206 essentially may be directed to specifying the data location for the data being specified by the user. In contrast, steps and/or modules 3208–3216 may be optional in that they allow the user to specify certain options or sanity checks that may be performed on the data as discussed below in more detail.

Turning first to specifying the storage location of the data being specified, step or module 3202 is called specify data system. For example, typically, in a chemical plant, there is more than one computer system utilized with a process being controlled. Step or module 3202 may allow for the user to specify which computer system(s) contains the data or storage location that is being specified.

Once the data system has been specified, the user may specify the data type using step or module 3204: specify data type. The data type may indicate which of the many types of data and/or storage modes is desired. Examples may include current (most recent) values of measurements, historical values, time averaged values, setpoint values, limits, etc. After the data type has been specified, the user may specify a data item number or identifier using step or module 3206. The data item number or identifier may indicate which of the many instances of the specify data type in the specified data system is desired. Examples may include the measurement number, the control loop number, the control tag name, etc. These three steps and/or modules 3202–3206 may thus allow the user to specify the source or destination of the data (used/produced by the support vector machine) being specified.

Once this information has been specified, the user may specify the following additional parameters. The user may specify the oldest time interval boundary using step or module 3208, and may specify the newest time interval boundary using step or module 3210. For example, these boundaries may be utilized where a time weighted average of a specified data value is needed. Alternatively, the user may specify one particular time when the data value being specified is a historical data point value.

Sanity checks on the data being specified may be specified by the user using steps and/or modules 3212, 3214 and 3216 as follows. The user may specify a high limit value using step or module 3212, and may specify a low limit value using step or module 3214. Since sensors sometimes fail, for example, this sanity check may allow the user to prevent the system and method of one embodiment of the present invention from using false data from a failed sensor. Other examples of faulty data may also be detected by setting these limits.

The high and low limit values may be used for scaling the input data. Support vector machines may be typically trained and operated using input, output and training input data scaled within a fixed range. Using the high and low limit values may allow this scaling to be accomplished so that the scaled values use most of the range.

In addition, the user may know that certain values will normally change a certain amount over a specific time interval. Thus, changes which exceed these limits may be used as an additional sanity check. This may be accomplished by the user specifying a maximum change amount in step or module 3216.

Sanity checks may be used in the method of one embodiment of the present invention to prevent erroneous training, prediction, and control. Whenever any data value fails to pass the sanity checks, the data may be clamped at the limit(s), or the operation/control may be disabled. These tests may significantly increase the robustness of various embodiments of the present invention.

It should be noted that these steps and/or modules in FIG. 34 apply to the input, output, training input, and error data steps and/or modules 808, 810, 812 and 814.

When the support vector machine is fully configured, the coefficients may be normally set to random values in their allowed ranges. This may be done automatically, or it may be performed on demand by the user (for example, using softkey 2616 in FIG. 28).

2. Wait Training Input Data Interval Step or Module 304

Referring again to FIG. 7, the wait training data interval step or module 304 is now described in greater detail.

Typically, the wait training input data interval is much shorter than the time period (interval) when training input data becomes available. This wait training input data interval may determine how often the training input data will be checked to determine whether new training input data has been received. Obviously, the more frequently the training input data is checked, the shorter the time interval will be from when new training input data becomes available to when retraining has occurred.

It should be noted that the configuration for the support vector machine 1206 and specifying its wait training input data interval may be done by the user. This interval may be inherent in the software system and method which contains the support vector machine of one embodiment of the present invention. Preferably, it is specifically defined by the entire software system and method of one embodiment of the present invention. Next, the support vector machine 1206 is trained.

3. New Training Input Data Step or Module 306

An order pointer 314 indicates that once the wait training input data interval 304 has elapsed, the new training input data step or module 306 may occur.

FIG. 13 shows a representative embodiment of the new training input data step or module 306. Referring now to FIG. 13, a representative example of determining whether new training input data has been received is shown. A retrieve current training input timestamp from historical database step or module 902 may first retrieve from the historical database 1210 the current training input data timestamp(s). As indicated by an order pointer, a compare current training input data timestamp to stored training input data timestamp step or module 904 may compare the current training input data timestamp(s) with saved training input data timestamp(s). Note that when the system and method of one embodiment of the present invention is first started, an initialization value may be used for the saved training input data timestamp. If the current training input data timestamp is the same as the saved training input data timestamp, this may indicate that new training input data does not exist. This situation on no new training input data may be indicated by order pointer 318.

Step or module 904 may function to determine whether any new training input data is available for use in training the support vector machine. It should be understood that, in various embodiments of the present invention, the presence of new training input data may be detected or determined in various ways. One specific example is where only one storage location is available for training input data and the associated timestamp. In this case, detecting or determining the presence of new training input data may be carried out by saving internally in the support vector machine the associated timestamp of the training input data from the last time the training input data was checked, and periodically retrieving the timestamp from the storage location for the training input data and comparing it to the internally saved value of the timestamp. Other distributions and combinations of storage locations for timestamps and/or data values may be used in detecting or determining the presence of new training input data.

However, if the comparison of step or module 904 indicates that the current training input data timestamp is different from the saved training input data timestamp, this may indicate that new training input data has been received or detected. This new training input data timestamp may be saved by a save current training input data timestamp step or module 906. After this current timestamp of training input data has been saved, the new training data step or module 306 is completed, and one embodiment of the present invention may move to the train support vector machine step or module 308 of FIG. 7 as indicated by the order pointer.

4. Train Support Vector Machine Step or Module 308

Referring again to FIG. 7, the train support vector machine step or module 308 may be the step or module where the support vector machine 1206 is trained. FIG. 14 shows a representative embodiment of the train support vector machine step or module 308.

Referring now to step or module 308 shown in FIG. 14, an order pointer 316 indicates that a retrieve current training input data from historical database step or module 1002 may occur. In step or module 1002, one or more current training input data values may be retrieved from the historical database 1210. The number of current training input data values that is retrieved may be equal to the number of outputs of the support vector machine 1206 that is being trained. The training input data is normally scaled. This scaling may use the high and low limit values specified in the configure and train support vector machine step or module 104.

An order pointer shows that a choose training input data time step or module 1004 may be carried out next. Typically, when there are two or more current training input data values that are retrieved, the data time (as indicated by their associated timestamps) for them is different. The reason for this is that typically the sampling schedule used to produce the training input data is different for the various training input data. Thus, current training input data often has varying associated timestamps. In order to resolve these differences, certain assumptions have to be made. In certain situations, the average between the timestamps may be used. Alternately, the timestamp of one of the current training input data may be used. Other approaches also may be employed.

Once the training input data time has been chosen in step or module 1004, the input data at the training input data time may be retrieved from the historical database 1210 as indicated by step or module 1006. The input data is normally scaled. This scaling may use the high and low limit values specified in the configure and train support vector machine step or module 104. Thereafter, the support vector machine 1206 may predict output data from the retrieved input data, as indicated by step or module 406.

The predicted output data from the support vector machine 1206 may then be stored in the historical database 1210, as indicated by step or module 408. The output data is normally produced in a scaled form, since all the input and training input data is scaled. In this case, the output data may be de-scaled. This de-scaling may use the high and low limit values specified in the configure and train support vector machine step or module 104. Thereafter, error data may be computed using the output data from the support vector machine 1206 and the training input data, as indicated by step or module 1012. It should be noted that the term error data 1504 as used in step or module 1012 may be a set of error data value for all of the predicted outputs from the support vector machine 1206. However, one embodiment of the present invention may also contemplate using a global or cumulative error data for evaluating whether the predicted output data values are acceptable.

After the error data 1504 has been computed or calculated in step or module 1012, the support vector machine 1206 may be retrained using the error data 1504 and/or the training input data 1306. One embodiment of the present invention may contemplate any method of training the support vector machine 1306.

After the training step or module 1014 is completed, the error data 1504 may be stored in the historical database 1210 in step or module 1016. It should be noted that the error data 1504 shown here may be the individual data for each output. These stored error data 1504 may provide a historical record of the error performance for each output of the support vector machine 1206.

The sequence of steps described above may be used when the support vector machine 1206 is effectively trained using a single presentation of the training set created for each new training input data 1306.

However, in using certain training methods or for certain applications, the support vector machine 1206 may require many presentations of training sets to be adequately trained (i.e., to produce an acceptable metric). In this case, two alternate approaches may be used to train the support vector machine 1206, among other approaches.

In the first approach, the support vector machine 1206 may save the training sets (i.e., the training input data and the associated input data which is retrieved in step or module 308) in a database of training sets, which may then be repeatedly presented to the support vector machine 1206 to train the support vector machine. The user may be able to configure the number of training sets to be saved. As new training data becomes available, new training sets may be constructed and saved. When the specified number of training sets has been accumulated (e.g., in a list or buffer), the next training set created based on new data may “bump” the oldest training set from the list or buffer. This oldest training set may then be discarded. Conventional support vector machine training creates training sets all at once, off-line, and would continue using all the training sets created. It is noted that the use of a buffer to store training sets is but one example of storage means for the training sets, and that other storage means are also contemplated, including lists (such as queues and stacks), databases, and arrays, among others.

A second approach which may be used is to maintain a time history of input data and training input data in the historical database 1210 (e.g., in a list or buffer), and to search the historical database 1210, locating training input data and constructing the corresponding training set by retrieving the associated input data.

It should be understood that the combination of the support vector machine 1206 and the historical database 1210 containing both the input data and the training input data with their associated timestamps may provide a very powerful platform for building, training and using the support vector machine 1206. One embodiment of the present invention may contemplate various other modes of using the data in the historical database 1210 and the support vector machine 1206 to prepare training sets for training the support vector machine 1206.

5. Error Acceptable Step or Module 310

Referring again to FIG. 7, once the support vector machine 1206 has been trained in step or module 308, a determination of whether an acceptable error exists may occur in step or module 310. FIG. 15 shows a representative embodiment of the error acceptable step or module 310.

Referring now to FIG. 15, an order pointer 320 indicates that a compute global error using saved global error step or module 1102 may occur. The term global error as used herein means the error over all the outputs and/or over two or more training sets (cycles) of the support vector machine 1206. The global error may reduce the effects of variation in the error from one training set (cycle) to the next. One cause for the variation is the inherent variation in tests used to generate the training input data.

Once the global error has been computed or estimated in step or module 1102, the global error may be saved in step or module 1104. The global error may be saved internally in the support vector machine 1206, or it may be stored in the historical database 1210. Storing the global error in the historical database 1210 may provide a historical record of the overall performance of the support vector machine 1206.

Thereafter, if an appropriate history of global error is available (as would be the case in retraining), step or module 1106 may be used to determine if the global error is statistically different from zero. Step or module 1106 may determine whether a sequence of global error values falls within the expected range of variation around the expected (desired) value of zero, or whether the global error is statistically significantly different from zero. Step or module 1106 may be important when the training input data used to compute the global error has significant random variability. If the support vector machine 1206 is making accurate predictions, the random variability in the training input data (for example, caused by lab variation) may cause random variation of the global error around zero. Step or module 1106 may reduce the tendency to incorrectly classify as not acceptable the predicted outputs of the support vector machine 1206.

If the global error is not statistically different from zero, then the global error is acceptable, and one embodiment of the present invention may move to order pointer 122. An acceptable error indicated by order pointer 122 means that the support vector machine 1206 is trained. This completes step or module 104.

However, if the global error is statistically different from zero, one embodiment of the present invention in the retrain mode may move to step or module 1108, which is called training input data statistically valid. (Note that step or module 1108 is not needed in the training mode of step or module 104. In the training mode, a global error statistically different from zero moves directly to order pointer 322.)

If the training input data in the retraining mode is not statistically valid, this may indicate that the acceptability of the global error may not be determined, and one embodiment of the present invention may move to order pointer 122. However, if the training input data is statistically valid, this may indicate that the error is not acceptable, and one embodiment of the present invention may move back to the wait training input data interval step or module 304, as indicated in FIG. 7.

The steps and/or modules described here for determining whether the global error is acceptable constitute one example of implementing a global error acceptable metric. It should be understood that different process characteristics, different sampling frequencies, and/or different measurement techniques (for process conditions and product properties) may indicate alternate methods of determining whether the error is acceptable. One embodiment of the present invention may contemplate any method of creating an error acceptable metric.

Thus, step or module 104 may configure and train the support vector machine 1206 for use in one embodiment of the present invention.

C. Predict Output Data Using Support Vector Machine Step or Module 106

Referring again to FIG. 5, the order pointer 122 indicates that there are two parallel paths that one embodiment of the present invention may use after the configure and train support vector machine step or module 104. One of the paths, which the predict output data using support vector machine step or module 106 described below is part of, may be used for: predicting output data using the support vector machine 1206; retraining the support vector machine 1206 using these predicted output data; and disabling control of the controlled process when the (global) error from the support vector machine 1206 exceeds a specified error acceptable metric (criterion). The other path may be the actual control of the process using the predicted output data from the support vector machine 1206.

Figure 8:
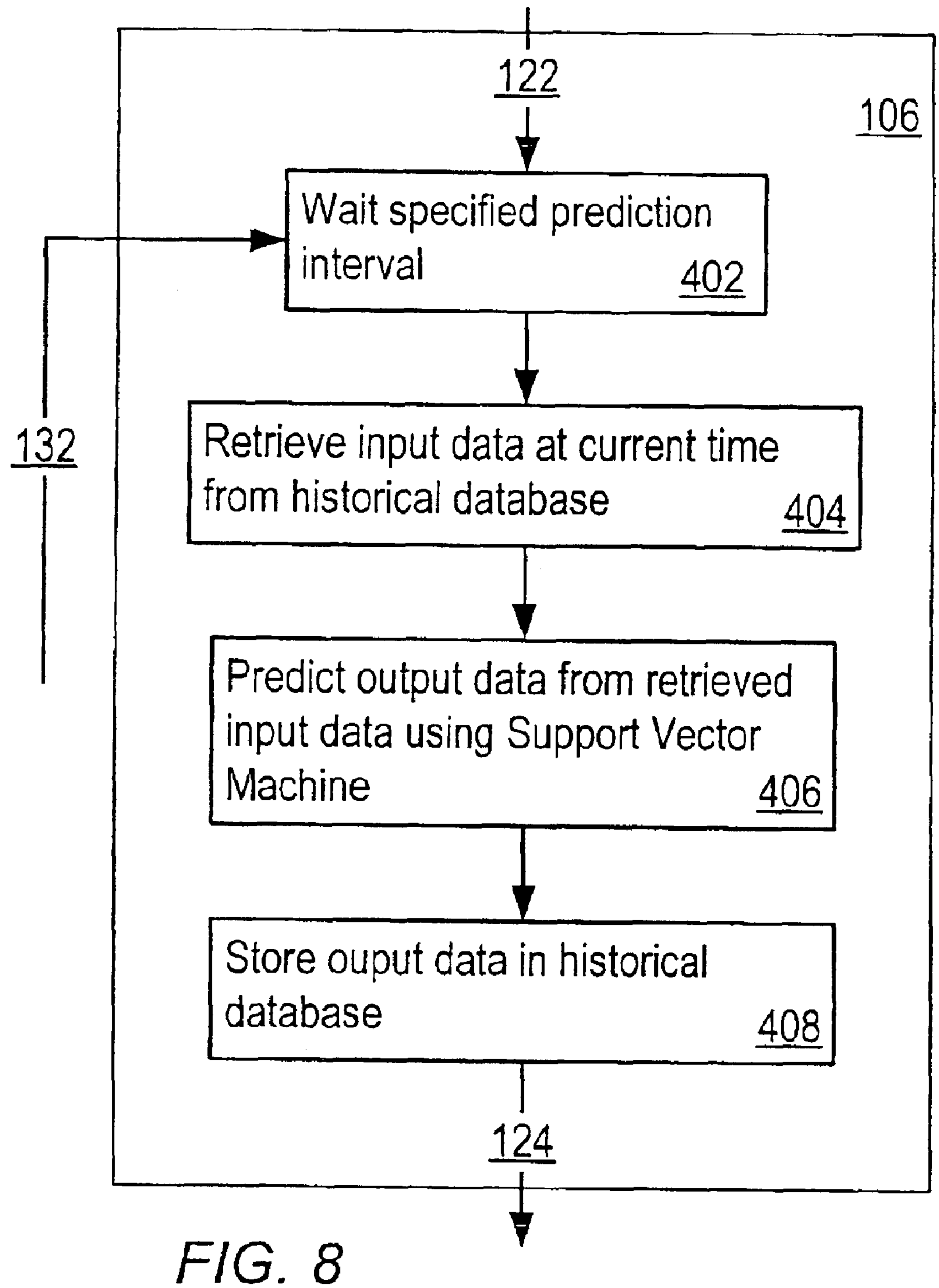
FIG. 8 is an intermediate block diagram of input steps and modules included in the predict output data using support vector machine step or module 106 of FIG. 5, according to one embodiment.

Turning now to the predict output data using support vector machine step or module 106, this step or module 106 may use the support vector machine 1206 to produce output data for use in control of the process and for retraining the support vector machine 1206. FIG. 8 shows a representative embodiment of step or module 106.

Turning now to FIG. 8, a wait specified prediction interval step or module 402 may utilize the method or procedure specified by the user in steps and/or modules 3106 and 3108 for determining when to retrieve input data. Once the specified prediction interval has elapsed, one embodiment of the present invention may move to a retrieve input data at current time from historical database step or module 404. The input data may be retrieved at the current time. That is, the most recent value available for each input data value may be retrieved from the historical database 1210.

The support vector machine 1206 may then predict output data from the retrieved input data, as indicated by step or module 406. This output data may be used for process control, retraining, and/or control purposes as discussed below in subsequent sections. Prediction may be done using any presently known or future developed approach.

D. Retrain Support Vector Machine Step or Module 108

Referring again to FIG. 5, once the predicted output data has been produced by the support vector machine 1206, a retrain support vector machine step or module 108 may be used.

Figure 9:
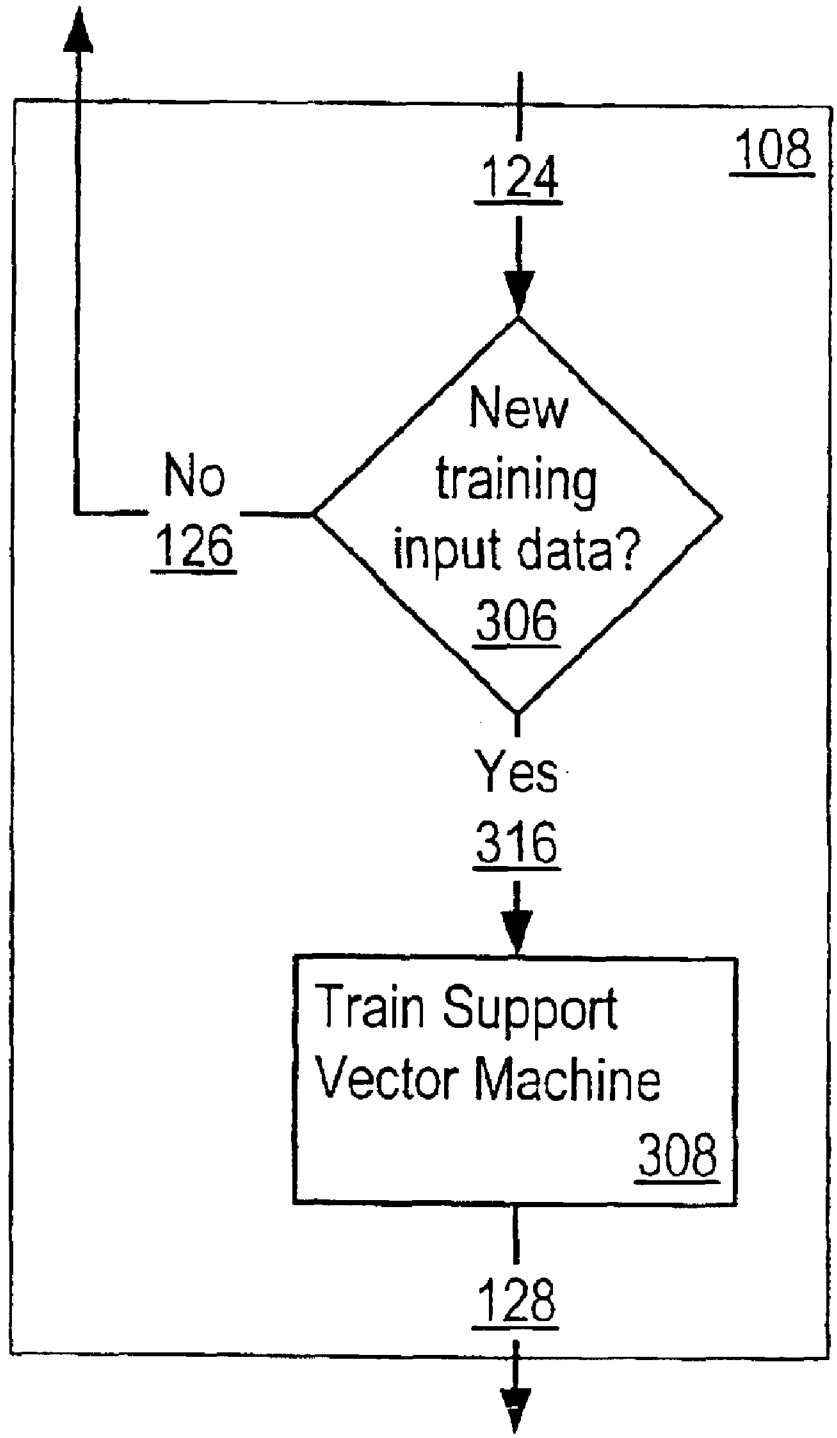
FIG. 9 is an intermediate block diagram of steps and modules included in the retrain support vector machine step or module 108 of FIG. 5, according to one embodiment.

Retraining of the support vector machine 1206 may occur when new training input data becomes available. FIG. 9 shows a representative embodiment of the retrain support vector machine step or module 108.

Referring now to FIG. 9, an order pointer 124 shows that a new training input data step or module 306 may determine if new training input data has become available. FIG. 13 shows a representative embodiment of the new training input data step or module 306. Step or module 306 is described above in connection with FIG. 7.

As indicated by an order pointer 126, if new training data is not present, one embodiment of the present invention may return to the predict output data using support vector machine step or module 106, as shown in FIG. 5.

If new training input data is present, the support vector machine 1206 may be retrained, as indicated by step or module 308. A representative example of step or module 308 is shown in FIG. 14. It is noted that training of the support vector machine is the same as retraining, and retraining is described in connection with FIG. 7, above.

Once the support vector machine 1206 has been retrained, an order pointer 128 may cause one embodiment of the present invention to move to an enable/disable control step or module 110 discussed below.

E. Enable/Disable Control Module or Step 110

Referring again to FIG. 5, once the support vector machine 1206 has been retrained, as indicated by step or module 108, one embodiment of the present invention may move to an enable/disable control step or module 110. The purpose of the enable/disable control step or module 110 may be to prevent the control of the process using output data (predicted values) produced by the support vector machine 1206 when the error is not unacceptable (i.e. when the error is "poor").

Figure 10:
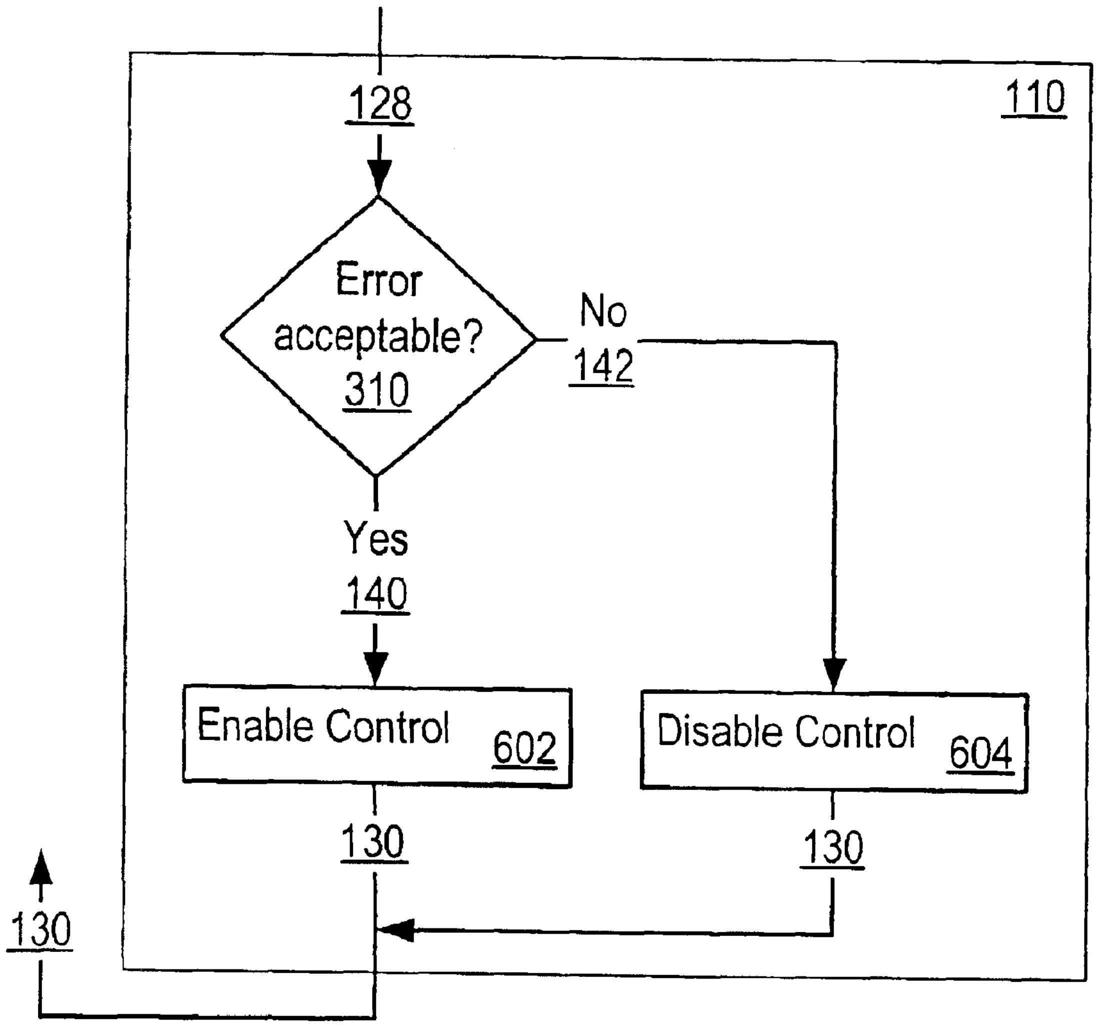
FIG. 10 is an intermediate block diagram of steps and modules included in the enable/disable control step or module 110 of FIG. 5, according to one embodiment.

A representative example of the enable/disable control step or module 110 is shown in FIG. 10. Referring now to FIG. 10, the function of module 110 may be to enable control of the controlled process if the error is acceptable, and to disable control if the error is unacceptable. As shown in FIG. 10, an order pointer 128 may move one embodiment of the present invention to an error acceptable step or module 310. If the error between the training input data and the predicted output data is unacceptable, control of the controlled process is disabled by a disable control step or module 604. The disable control step or module 604 may set a flag or indicator which may be examined by the control process using output data step or module 112. The flag may indicate that the output data should not be used for control.

Figure 32:
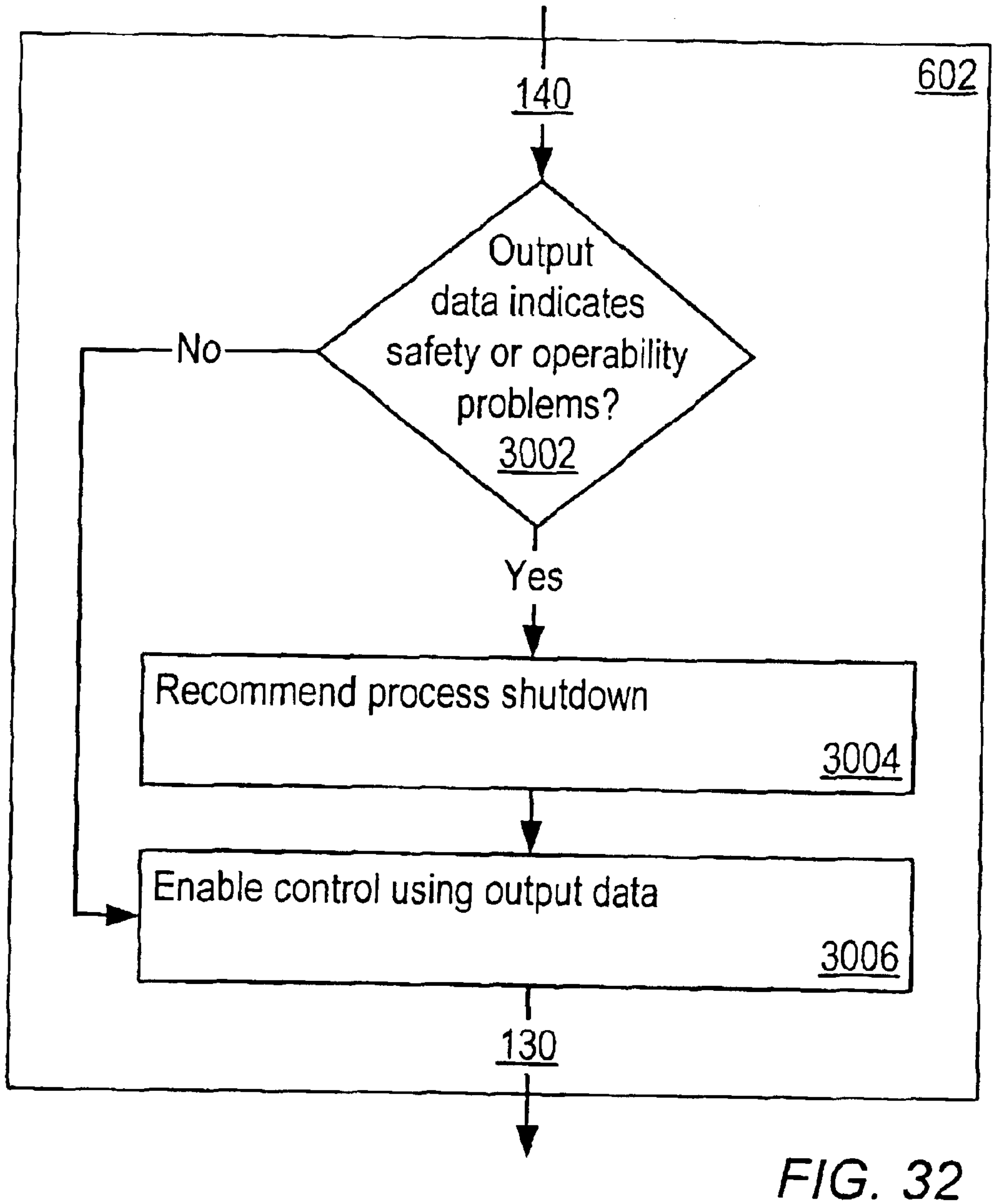
FIG. 32 is a detailed block diagram of an embodiment of the enable control step or module 602 of FIG. 10.

FIG. 32 shows a representative embodiment of the enable control step or module 602. Referring now to FIG. 32, an order pointer 142 may cause one embodiment of the present invention first to move to an output data indicates safety or operability problems step or module 3002. If the output data does not indicate a safety or operability problem, this may indicate that the process 1212 may continue to operate safely. Thus, processing may move to the enable control using output data step or module 3006.

In contrast, if the output data does indicate a safety or operability problem, one embodiment of the present invention may recommend that the process being controlled be shut down, as indicated by a recommend process shutdown step or module 3004. This recommendation to the operator of the process 1212 may be made using any suitable approach. One example of recommendation to the operator is a screen display or an alarm indicator. This safety feature may allow one embodiment of the present invention to prevent the controlled process 1212 from reaching a critical situation.

If the output data does not indicate safety or operability problems in step or module 3002, or after the recommendation to shut down the process has been made in step or module 3004, one embodiment of the present invention may move to the enable control using output data step or module 3006. Step or module 3006 may set a flag or indicator which may be examined by step or module 112, indicating that the output data should be used to control the process.

Thus, it may be appreciated that the enable/disable control step or module 110 may provide the function to one embodiment of the present invention of (1) allowing control of the process 1212 using the output data in step or module 112, (2) preventing the use of the output data in controlling the process 1212, but allowing the process 1212 to continue to operate, or (3) shutting down the process 1212 for safety reasons. As noted above, the embodiment described herein relates to process control, such as of a manufacturing plant, and is not intended to limit the application of various embodiments of the present invention to that domain, but rather, various embodiments of the invention may be contemplated to be applicable in many other areas, as well, such as e-commerce, data analysis, stocks and bonds management and analysis, business decision-making, optimization, e-marketplaces, financial analysis, or any other field of endeavor where predictive or classification models may be useful. Thus, specific steps or modules described herein which apply only to process control embodiments may be different, or omitted as appropriate or as desired.

F. Control Process Using Output Data Step or Module 112

Referring again to FIG. 5, the order pointer 122 indicates that the control of the process using the output data from the support vector machine 1206 may run in parallel with the prediction of output data using the support vector machine 1206, the retraining of the support vector machine 1206, and the enable/disable control of the process 1212.

Figure 11:
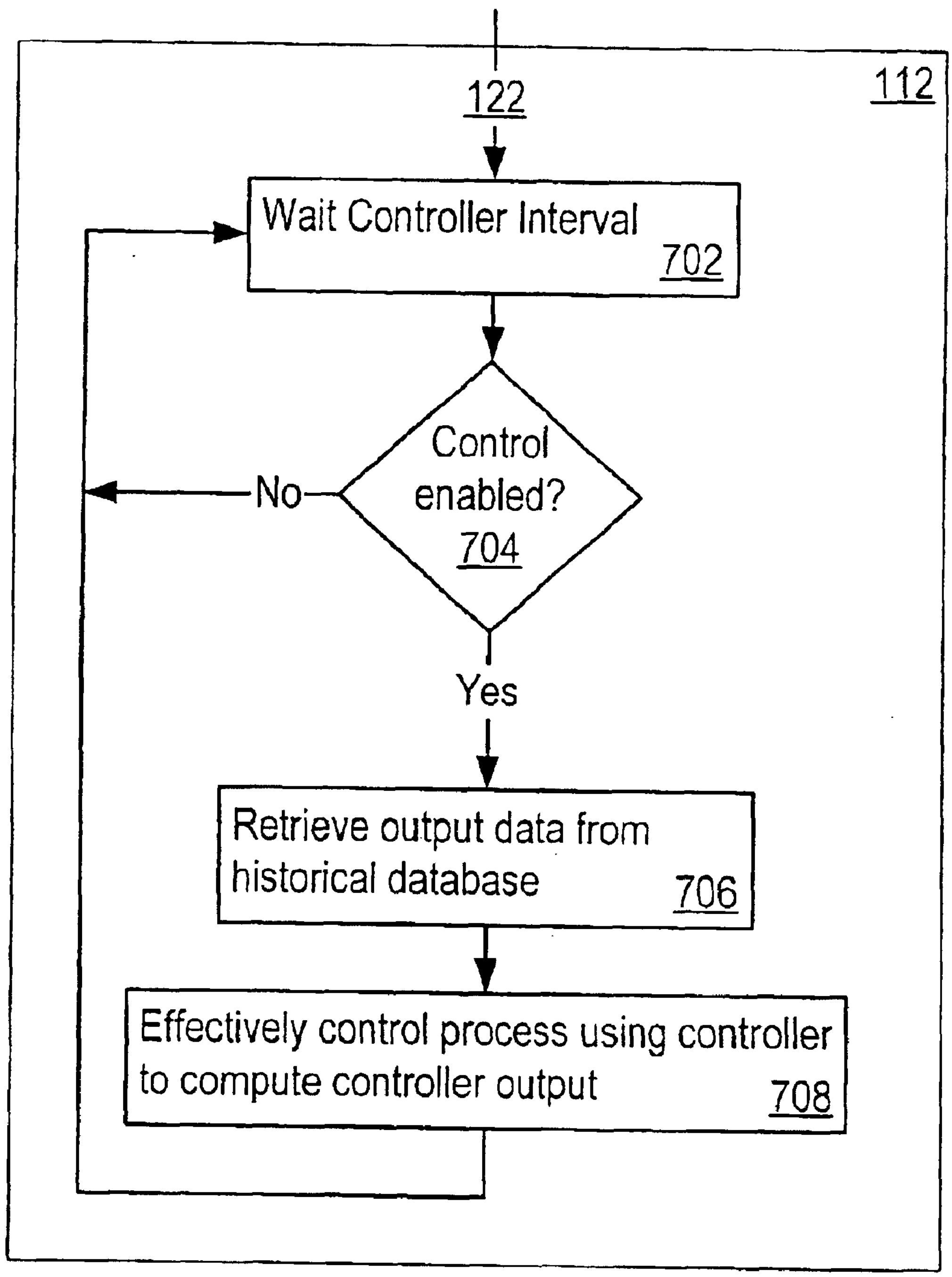
FIG. 11 is an intermediate block diagram of steps and modules included in the control process using output data step or module 112 of FIG. 5, according to one embodiment.

FIG. 11 shows a representative embodiment of the control process using output data step or module 112. Referring now to FIG. 11, the order pointer 122 may indicate that one embodiment of the present invention may first move to a wait controller interval step or module 702. The interval at which the controller may operate may be any pre-selected value. This interval may be a time value, an event, or the occurrence of a data value. Other interval control methods or procedures may be used.

Once the controller interval has occurred, as indicated by the order pointer, one embodiment of the present invention may move to a control enabled step or module 704. If control has been disabled by the enable/disable control step or module 110, one embodiment of the present invention may not control the process 1212 using the output data. This may be indicated by the order pointer marked "NO" from the control enabled step or module 704.

If control has been enabled, one embodiment of the present invention may move to the retrieve output data from historical database step or module 706. Step or module 706 may show that the output data 1218 (see FIG. 4) produced by the support vector machine 1206 and stored in the historical database 1210 is retrieved (1214) and used by the controller 1202 to compute controller output data 1208 for control of the process 1212.

This control by the controller 1202 of the process 1212 may be indicated by an effectively control process using controller to compute controller output step or module 708 of FIG. 11.

Thus, it may be appreciated that one embodiment of the present invention may effectively control the process using the output data from the support vector machine 1206. It should be understood that the control of the process 1212 may be any presently known or future developed approach, including the architecture shown in FIGS. 18 and 19. It should also be understood that the process 1212 may be any kind of process, including an analysis process, a business process, a scientific process, an e-commerce process, or any other process wherein predictive models may be useful.

Alternatively, when the output data from the support vector machine 1206 is determined to be unacceptable, the process 1212 may continue to be controlled by the controller 1202 without the use of the output data.

V. One Structure (Architecture)

Discussed above in Section III (Use in Combination with Expert Systems) is one method of operation of one embodiment of the present invention. Discussed in this Section is one structure (architecture) of one embodiment of the present invention. However, it should be understood that in the description set forth above, the modular structure (architecture) of the embodiment of the present invention is also discussed in connection with the operation. Thus, certain portions of the structure of the embodiment of the present invention have inherently been described in connection with the description set forth above in Section III.

One embodiment of the present invention may comprise one or more software systems. In this context, software system refers to a collection of one or more executable software programs, and one or more storage areas, for example, RAM or disk. In general terms, a software system may be understood to comprise a fully functional software embodiment of a function, which may be added to an existing computer system to provide new function to that computer system.

Software systems generally are constructed in a layered fashion. In a layered system, a lowest level software system is usually the computer operating system which enables the hardware to execute software instructions. Additional layers of software systems may provide, for example, historical database capability. This historical database system may provide a foundation layer on which additional software systems may be built. For example, a support vector machine software system may be layered on top of the historical database. Also, a supervisory control software system may be layered on top of the historical database system.

A software system may thus be understood to be a software implementation of a function which may be assembled in a layered fashion to produce a computer system providing new functionality. Also, in general, the interface provided by one software system to another software system is well-defined. It should be understood in the context of one embodiment of the present invention that delineations between software systems may be representative of one implementation. However, one embodiment of the present invention may be implemented using any combination or separation of software systems. Similarly, in some embodiments of the present invention, there may be no need for some of the described components, such as sensors, raw materials, etc., while in other embodiments, the raw materials may comprise data rather than physical materials, and the sensors may comprise data sensing components, such as for use in data mining or other information technologies.

FIG. 4 shows one embodiment of the structure of the present invention, as applied to a manufacturing process. Referring now to FIG. 4, the process 1212 being controlled may receive raw materials 1222 and may produce product 1216. Sensors 1226 (of any suitable type) may provide sensor signals 1221, 1224, which may be supplied to the historical database 1210 for storage with associated timestamps. It should be noted that any suitable type of sensor 1226 may be employed which provides sensor signals 1221, 1224.

The historical database 1210 may store the sensor signals 1224 that may be supplied to it with associated timestamps as provided by a clock 1230. In addition, as described below, the historical database 1210 may also store output data 1218 from the support vector machine 1206. This output data 1218 may also have associated timestamps provided by the support vector machine 1206.

Any suitable type of historical database 1210 may be employed. Historical databases are generally discussed in Hale and Sellars, "Historical Data Recording for Process Computers," 77 Chem. Eng'g Progress 38 AICLE, New York, (1981), which is hereby incorporated by reference.

The historical database 1210 that is used may be capable of storing the sensor input data 1224 with associated timestamps, and the predicted output data 1218 from the support vector machine 1206 with associated timestamps. Typically, the historical database 1210 may store the sensor data 1224 in a compressed fashion to reduce storage space requirements, and will store sampled (lab) data 1304 in uncompressed form.

Often, the historical database 1210 may be present in a chemical plant in the existing process control system. One embodiment of the present invention may utilize this historical database to achieve the improved process control obtained by the embodiment of the present invention.

A historical database is a special type of database in which at least some of the data is stored with associated time stamps. Usually the time stamps may be referenced in retrieving (obtaining) data from a historical database.

The historical database 1210 may be implemented as a stand alone software system which forms a foundation layer on which other software systems, such as the support vector machine 1206, may be layered. Such a foundation layer historical database system may support many functions in a process control environment. For example, the historical database may serve as a foundation for software which provides graphical displays of historical process data for use by a plant operator. A historical database may also provide data to data analysis and display software which may be used by engineers for analyzing the operation of the process 1212. Such a foundation layer historical database system may often contain a large number of sensor data inputs, possibly a large number of laboratory data inputs, and may also contain a fairly long time history for these inputs.

It should be understood, however, that one embodiment of the present invention may require a very limited subset of the functions of the historical database 1210. Specifically, an embodiment of the present invention may require the ability to store at least one training data value with the timestamp which indicates an associated input data value, and the ability to store at least one associated input data value. In certain circumstances where, for example, a historical database foundation layer system does not exist, it may be desirable to implement the essential historical database functions as part of the support vector machine software. By integrating the essential historical database capabilities into the support vector machine software, one embodiment of the present invention may be implemented in a single software system. It should be understood that the various divisions among software systems used to describe various embodiments of the present invention may only be illustrative in describing the best mode as currently practiced. Any division, combination, or subset of various software systems of the steps and elements of various embodiments of the present invention may be used.

The historical database 1210, as used in one embodiment of the present invention, may be implemented using a number of methods. For example, the historical database may be built as a random access memory (RAM) database. The historical database 1210 may also be implemented as a disk-based database, or as a combination of RAM and disk databases. If an analog support vector machine 1206 is used in one embodiment of the present invention, the historical database 1210 may be implemented using a physical storage device. One embodiment of the present invention may contemplate any computer or analog means of performing the functions of the historical database 1210.

The support vector machine 1206 may retrieve input data 1220 with associated timestamps. The support vector machine 1206 may use this retrieved input data 1220 to predict output data 1218. The output data 1218 with associated timestamps may be supplied to the historical database 1210 for storage.

A representative embodiment of the support vector machine 1206 is described above in Section I (Overview of Support Vector Machines). It should be understood that support vector machines, as used in one embodiment of the present invention, may be implemented in any way. For example, one embodiment may use a software implementation of a support vector machine 1206. It should be understood, however, that any form of implementing a support vector machine 1206 may be used in one embodiment of the present invention, including physical analog forms. Specifically, as described below, the support vector machine may be implemented as a software module in a modular support vector machine control system.

It should also be understood with regard to various embodiments of the present invention that software and computer embodiments are only one possible way of implementing the various elements in the systems and methods. As mentioned above, the support vector machine 1206 may be implemented in analog or digital form and also, for example, the controller 1202 may also be implemented in analog or digital form. It should be understood, with respect to the method steps or modules as described above for the functioning of the systems as described in this section, that operations such as computing (which imply the operation of a digital computer) may also be carried out in analog equivalents or by other methods.

Returning again to FIG. 4, the output data 1214 with associated timestamps stored in the historical database 1210 may be supplied by a path 1214 to the controller 1202. This output data 1214 may be used by the controller 1202 to generate controller output data 1208 which, in turn, may be sent to actuator(s) 1228 used to control a controllable process state 2002 of the process 1212. Representative examples of controller 1202 are discussed below.

The box labeled 1207 in FIG. 4 indicates that the support vector machine 1206 and the historical database 1210 may, in a variant embodiment of the present invention, be implemented as a single software system. This single software system may be delivered to a computer installation in which no historical database previously existed, to provide the functions of one embodiment of the present invention. Alternatively, a support vector machine configuration module (or program) 1204 may also be included in this software system.

Two additional aspects of the architecture and structure shown in FIG. 4 include: (1) the controller 1202 may also be provided with input data 1221 from sensors 1226. This input data may be provided directly to controller 1202 from these sensor(s); (2) the support vector machine configuration module 1204 may be connected in a bi-directional path configuration with the support vector machine 1206. The support vector machine configuration module 1204 may be used by the user (developer) to configure and control the support vector machine 1206 in a fashion as discussed above in connection with the step or module 104 (FIG. 5), or in connection with the user interface discussion contained below.

Figure 16:
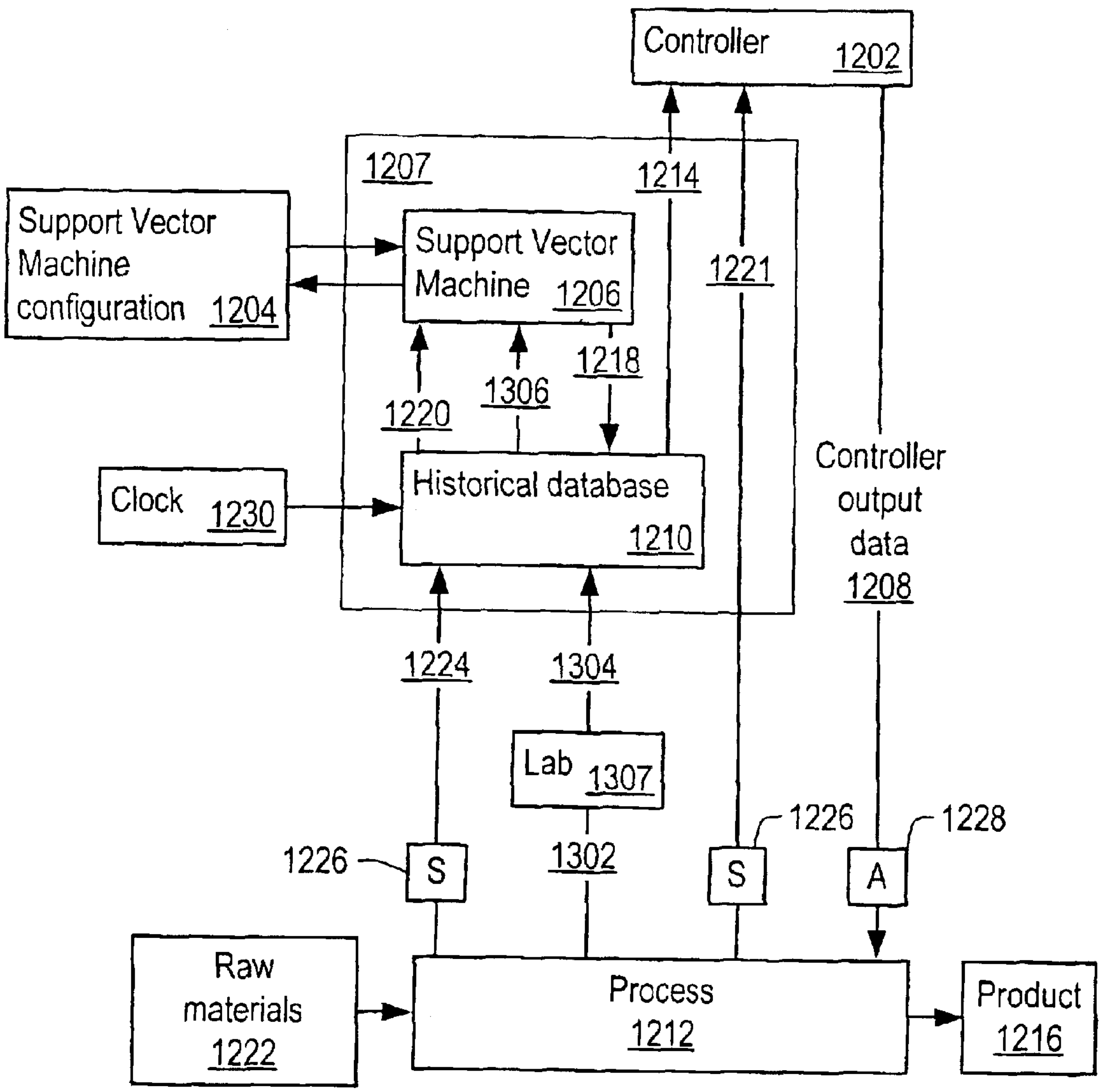
FIG. 16 is a representation of the architecture of an embodiment of the present invention having the additional capability of using laboratory values from a historical database 1210.

Turning now to FIG. 16, an alternate embodiment of the structure and architecture of the present invention is shown. Differences between the embodiment of FIG. 4 and that of FIG. 16 are discussed below.

A laboratory ("lab") 1307 may be supplied with samples 1302. These samples 1302 may be physical specimens or some type of data from an analytical test or reading. Regardless of the form, the lab 1307 may take the samples 1302 and may utilize the samples 1302 to produce actual measurements 1304, which may be supplied to the historical database 1210 with associated timestamps. The actual measurements 1304 may be stored in the historical database 1210 with their associated timestamps.

Thus, the historical database 1210 may also contain actual test results or actual lab results in addition to sensor input data. It should be understood that a laboratory is illustrative of a source of actual measurements 1304 which may be useful as training input data. Other sources may be encompassed by one embodiment of the present invention. Laboratory data may be electronic data, printed data, or data exchanged over any communications link.

The second difference shown in the embodiment of FIG. 16 is that the support vector machine 1206 may be supplied with the actual measurements 1304 and associated timestamps stored in the historical database 1210.

Thus, it may be appreciated that the embodiment of FIG. 16 may allow one embodiment of the present invention to utilize lab data in the form of actual measurements 1304 as training input data 1306 to train the support vector machine.

Figure 17:
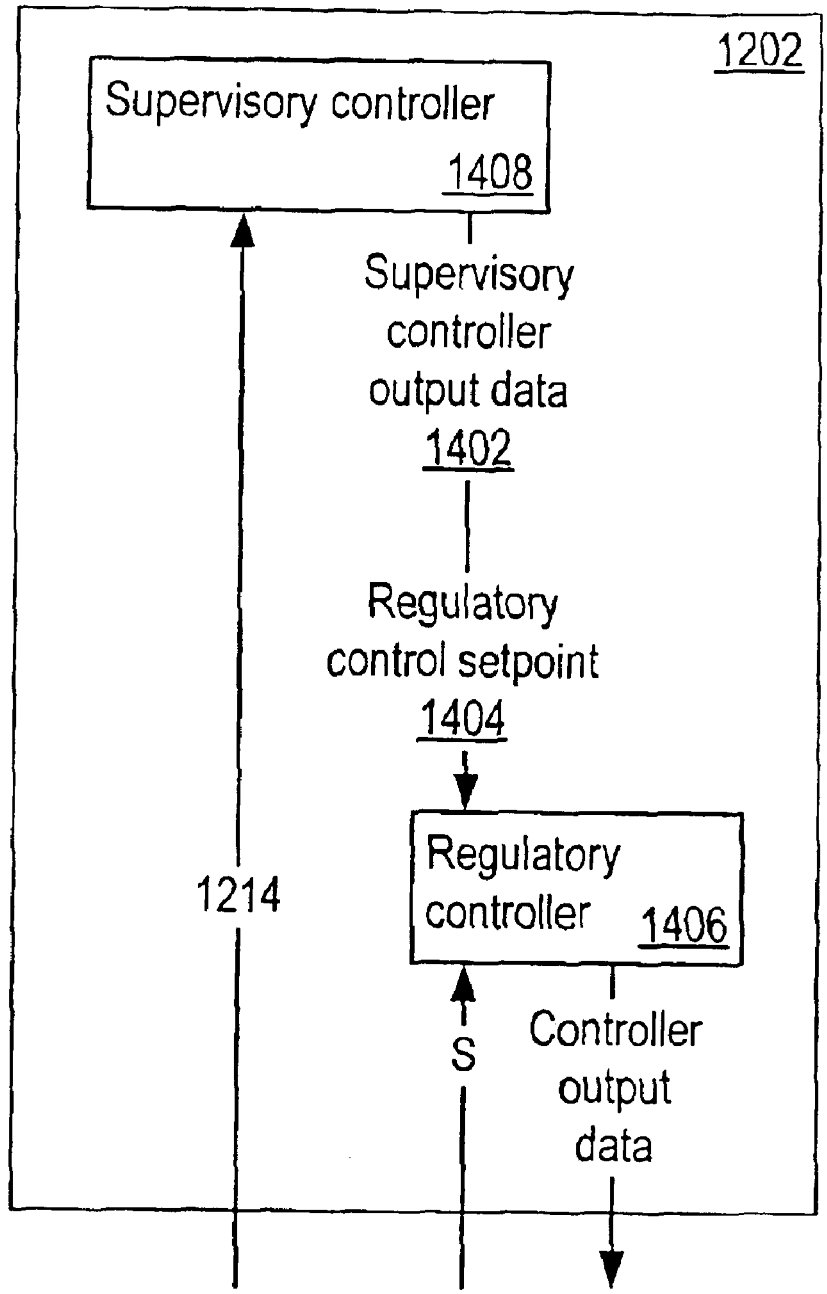
FIG. 17 is an embodiment of controller 1202 of FIGS. 4 and 16 having a supervisory controller 1408 and a regulatory controller 1406.

Turning now to FIG. 17, a representative embodiment of the controller 1202 is shown. The embodiment may utilize a regulatory controller 1406 for regulatory control of the process 1212. Any type of regulatory controller may be contemplated which provides such regulatory control. There may be many commercially available embodiments for such a regulatory controller. Typically, various embodiments of the present invention may be implemented using regulatory controllers already in place. In other words, various embodiments of the present invention may be integrated into existing process control systems, management systems, analysis systems, or other existing systems.

In addition to the regulatory controller 1406, the embodiment shown in FIG. 17 may also include a supervisory controller 1408. The supervisory controller 1408 may compute supervisory controller output data, computed in accordance with the predicted output data 1214. In other words, the supervisory controller 1408 may utilize the predicted output data 1214 from the support vector machine 1206 to produce supervisory controller output data 1402.

The supervisory controller output data 1402 may be supplied to the regulatory controller 1406 for changing the regulatory controller setpoint 1404 (or other parameter of regulatory controller 1406). In other words, the supervisory controller output data 1402 may be used for changing the regulatory controller setpoint 1404 so as to change the regulatory control provided by the regulatory controller 1406. It should be noted that the setpoint 1404 may refer not only to a plant operation setpoint, but to any parameter of a system or process using an embodiment of the present invention.

Any suitable type of supervisory controller 1408 may be employed by one embodiment of the present invention, including commercially available embodiments. The only limitation is that the supervisory controller 1408 be able to use the output data 1408 to compute the supervisory controller output data 1402 used for changing the regulatory controller setpoint (parameter) 1404.

This embodiment of the present invention may contemplate the supervisory controller 1408 being in a software and hardware system which is physically separate from the regulatory controller 1406. For example, in many chemical processes, the regulatory controller 1406 may be implemented as a digital distributed control system (DCS). These digital distributed control systems may provide a very high level of robustness and reliability for regulating the process 1212. The supervisory controller 1408, in contrast, may be implemented on a host-based computer, such as a VAX (VAX is a trademark of DIGITAL EQUIPMENT CORPORATION, Maynard, Mass.), a personal computer, a workstation, or any other type of computer.

Figure 18:
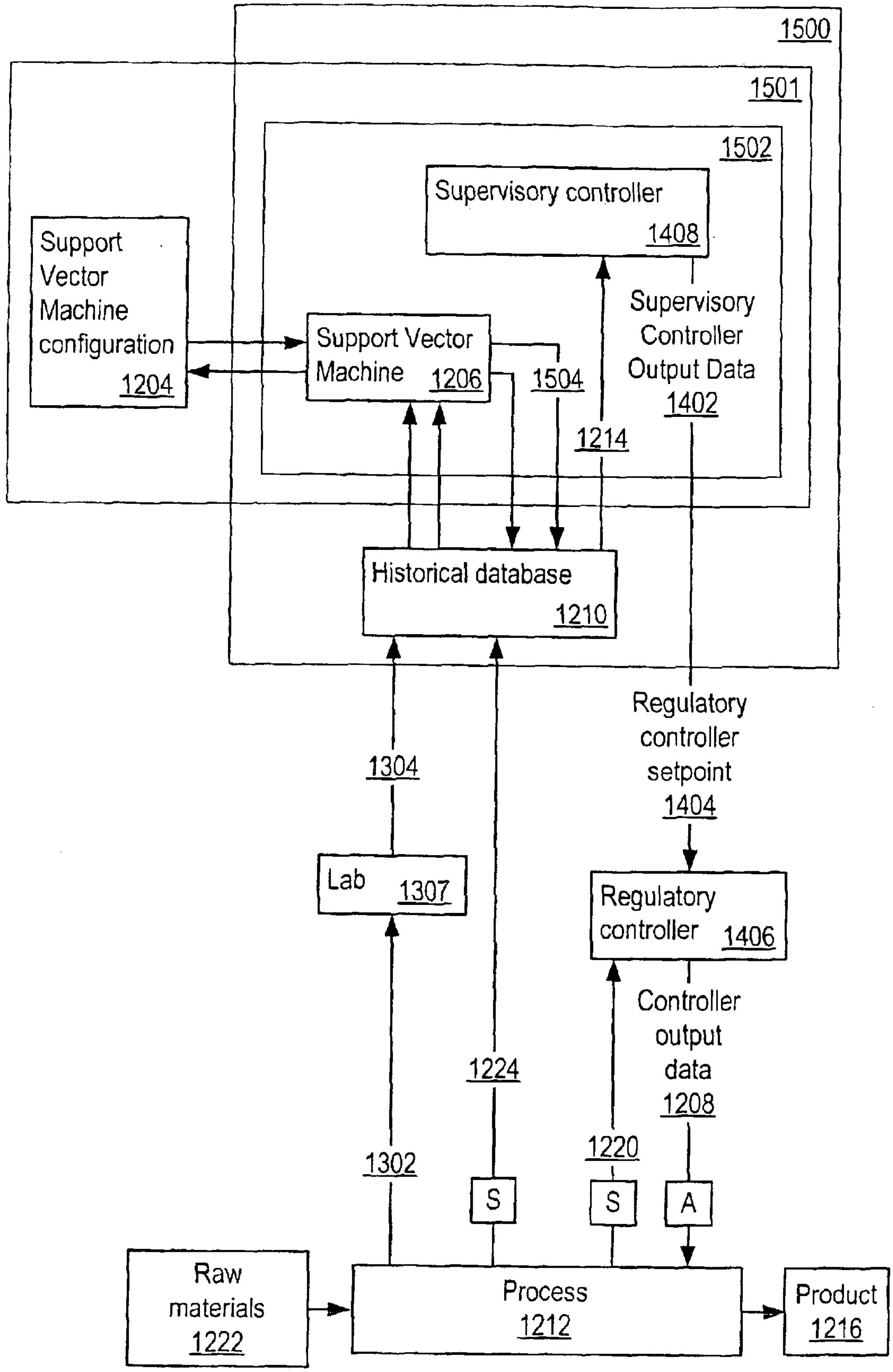
FIG. 18 illustrates various embodiments of controller 1202 of FIG. 17 used in the architecture of FIG. 4.

Referring now to FIG. 18, a more detailed embodiment of the present invention is shown. In this embodiment, the supervisory controller 1408 is separated from the regulatory controller 1406. The boxes labeled 1500, 1501, and 1502 shown in FIG. 18 suggest various ways in which the functions of the supervisory controller 1408, the support vector machine configuration module 1204, the support vector machine 1206 and the historical database 1210 may be implemented. For example, the box labeled 1502 shows how the supervisory controller 1408 and the support vector machine 1206 may be implemented together in a single software system. This software system may take the form of a modular system as described below in FIG. 19. Alternatively, the support vector machine configuration program 1204 may be included as part of the software system, as shown in the box labeled 1501. These various software system groupings may be indicative of various ways in which various embodiments of the present invention may be implemented. However, it should be understood that any combination of functions into various software systems may be used to implement various embodiments of the present invention.

Referring now to FIG. 19, a representative embodiment 1502 of the support vector machine 1206 combined with the supervisory controller 1408 is shown. This embodiment may be called a modular supervisory controller approach. The modular architecture that is shown illustrates that various embodiments of the present invention may contemplate the use of various types of modules which may be implemented by the user (developer) in configuring support vector machine(s) 1206 in combination with supervisory control functions so as to achieve superior process control operation.

Several modules that may be implemented by the user of one embodiment of the present invention may be shown in the embodiment of FIG. 19. Specifically, in addition to the support vector machine module 1206, the modular embodiment of FIG. 19 may also include a feedback control module 1602, a feedforward control module 1604, an expert system module 1606, a cusum (cumulative summation) module 1608, a Shewhart module 1610, a user program module 1612, and/or a batch event module 1614. Each of these modules may be selected by the user. The user may implement more than one of each of these modules in configuring various embodiments of the present invention. Moreover, additional types of modules may be utilized.

The intent of the embodiment shown in FIG. 19 is to illustrate three concepts. First, various embodiments of the present invention may utilize a modular approach which may ease user configuration. Second, the modular approach may allow for much more complicated systems to be configured since the modules may act as basic building blocks which may be manipulated and used independently of each other.

Third, the modular approach may show that various embodiments of the present invention may be integrated into other process control systems. In other words, various embodiments of the present invention may be implemented into the system and method of the United States patents and patent applications which are incorporated herein by reference as noted above, among others.

Specifically, this modular approach may allow the support vector machine capability of various embodiments of the present invention to be integrated with the expert system capability described in the above-noted patents and patent applications. As described above, this may enable the support vector machine capabilities of various embodiments of the present invention to be easily integrated with other standard control functions such as statistical tests, feedback control, and feedforward control. However, even greater function may be achieved by combining the support vector machine capabilities of various embodiments of the present invention, as implemented in this modular embodiment, with the expert system capabilities of the above-noted patent applications, also implemented in modular embodiments. This easy combination and use of standard control functions, support vector machine functions, and expert system functions may allow a very high level of capability to be achieved in solving process control problems.

The modular approach to building support vector machines may result in two principal benefits. First, the specification needed from the user may be greatly simplified so that only data is required to specify the configuration and function of the support vector machine. Secondly, the modular approach may allow for much easier integration of support vector machine function with other related control functions, such as feedback control, feedforward control, etc.

In contrast to a programming approach to building a support vector machine, a modular approach may provide a partial definition beforehand of the function to be provided by the support vector machine module. The predefined function for the module may determine the procedures that need to be followed to carry out the module function, and it may determine any procedures that need to be followed to verify the proper configuration of the module. The particular function may define the data requirements to complete the specification of the support vector machine module. The specifications for a modular support vector machine may be comprised of configuration information which may define the size and behavior of the support vector machine in general, and the data interactions of the support vector machine which may define the source and location of data that may be used and created by the system.

Two approaches may be used to simplify the user configuration of support vector machines. First, a limited set of procedures may be prepared and implemented in the modular support vector machine software. These predefined functions may define the specifications needed to make these procedures work as a support vector machine module. For example, the creation of a support vector machine module may require the specification of the number of inputs, a kernel function, and the number of outputs. The initial values of the coefficients may not be required. Thus, the user input required to specify such a module may be greatly simplified. This predefined procedure approach is one method of implementing the modular support vector machine.

A second approach to provide modular support vector machine function may allow a limited set of natural language expressions to be used to define the support vector machine. In such an implementation, the user or developer may be permitted to enter, through typing or other means, natural language definitions for the support vector machine. For example, the user may enter text which might read, for example, "I want a fully randomized support vector machine." These user inputs may be parsed in search of specific combinations of terms, or their equivalents, which would allow the specific configuration information to be extracted from the restricted natural language input.

By parsing the total user input provided in this method, the complete specification for a support vector machine module may be obtained. Once this information is known, two approaches may be used to generate a support vector machine module.

A first approach may be to search for a predefined procedure matching the configuration information provided by the restricted natural language input. This may be useful where users tend to specify the same basic support vector machine functions for many problems.

A second approach may provide for much more flexible creation of support vector machine modules. In this approach, the specifications obtained by parsing the natural language input may be used to generate a support vector machine procedure by actually generating software code. In this approach, the support vector machine functions may be defined in relatively small increments as opposed to the approach of providing a complete predefined support vector machine module. This approach may combine, for example, a small function which is able to obtain input data and populate a set of inputs. By combining a number of such small functional pieces and generating software code which reflects and incorporates the user specifications, a complete support vector machine procedure may be generated.

This approach may optionally include the ability to query the user for specifications which have been neglected or omitted in the restricted natural language input. Thus, for example, if the user neglected to specify the number of outputs in the network, the user may be prompted for this information and the system may generate an additional line of user specification reflecting the answer to the query.

The parsing and code generation in this approach may use pre-defined, small sub-functions of the overall support vector machine module. A given key word (term) may correspond to a certain sub-function of the overall support vector machine module. Each sub-function may have a corresponding set of key words (terms) and associated key words and numeric values. Taken together, each key word and associated key words and values may constitute a symbolic specification of the support vector machine sub-function. The collection of all the symbolic specifications may make up a symbolic specification of the entire support vector machine module.

The parsing step may process the substantially natural language input. The parsing step may remove unnecessary natural language words, and may group the remaining key words and numeric values into symbolic specifications of support vector machine sub-functions. One way to implement parsing may be to break the input into sentences and clauses bounded by periods and commas, and restrict the specification to a single sub-function per clause. Each clause may be searched for key words, numeric values, and associated key words. The remaining words may be discarded. A given key word (term) may correspond to a certain sub-function of the overall support vector machine module.

Alternatively, key words may have relational tag words (e.g., "in," "with," etc.) which may indicate the relation of one key word to another. Using such relational tag words, multiple sub-function specifications may be processed in the same clause.

Key words may be defined to have equivalents. For example, the user may be allowed, in an embodiment of this aspect of the invention, to specify the kernel function used in the support vector machine. Thus the key word may be "kernel" and an equivalent key word may be "kernel function." This key word may correspond to a set of pre-defined sub-functions which may implement various kinds of kernel functions in the support vector machine.

Another example may be key word "coefficients", which may have equivalent "weights". The associated data may be a real number which may indicate the value(s) of one or more coefficients. Thus, it may be seen that various levels of flexibility in the substantially natural language specification may be provided. Increasing levels of flexibility may require more detailed and extensive specification of key words and associated data with their associated key words.

The support vector machine itself may be constructed, using this method, by processing the specifications, as parsed from the substantially natural language input, in a pre-defined order, and generating the fully functional procedure code for the support vector machine from the procedural sub-function code fragments.

The other major advantage of a modular approach is the ease of integration with other functions in the application (problem) domain. For example, in the process control domain, it may be desirable or productive to combine the functions of a support vector machine with other more standard control functions such as statistical tests, feedback control, etc. The implementation of support vector machines as modular support vector machines in a larger control system may greatly simplify this kind of implementation.

The incorporation of modular support vector machines into a modular control system may be beneficial because it may make it easy to create and use support vector machine predictions in a control application. However, the application of modular support vector machines in a control system is different from the control functions typically found in a control system. For example, the control functions described in some of the United States patents and patent applications incorporated by reference above generally rely on the current information for their actions, and they do not generally define their function in terms of past (historical) data. In order to make a support vector machine function effectively in a modular control system, some means is needed to train and operate the support vector machine using the data which is not generally available by retrieving current data values. The systems and methods of various embodiments of the present invention, as described above, may provide this essential capability which may allow a modular support vector machine function to be implemented in a modular control system.

A modular support vector machine has several characteristics which may significantly ease its integration with other control functions. First, the execution of support vector machine functions, prediction and/or training may easily be coordinated in time with other control functions. The timing and sequencing capabilities of a modular implementation of a support vector machine may provide this capability. Also, when implemented as a modular function, support vector machines may make their results readily accessible to other control functions that may need them. This may be done, for example, without needing to store the support vector machine outputs in an external system, such as a historical database.

Modular support vector machines may run either synchronized or unsynchronized with other functions in the control system. Any number of support vector machines may be created within the same control application, or in different control applications, within the control system. This may significantly facilitate the use of support vector machines to make predictions of output data where several small support vector machines may be more easily or rapidly trained than a single large support vector machine. Modular support vector machines may also provide a consistent specification and user interface so that a user trained to use the modular support vector machine control system may address many control problems without learning new software.

An extension of the modular concept is the specification of data using pointers. Here again, the user (developer) is offered the easy specification of a number of data retrieval or data storage functions by simply selecting the function desired and specifying the data needed to implement the function. For example, the retrieval of a time-weighted average from the historical database is one such predefined function. By selecting a data type such as a time-weighted average, the user (developer) need only specify the specific measurement desired, the starting time boundary, and the ending time boundary. With these inputs, the predefined retrieval function may use the appropriate code or function to retrieve the data. This may significantly simplify the user's access to data which may reside in a number of different process data systems. By contrast, without the modular approach, the user may have to be skilled in the programming techniques needed to write the calls to retrieve the data from the various process data systems.

Figure 20:
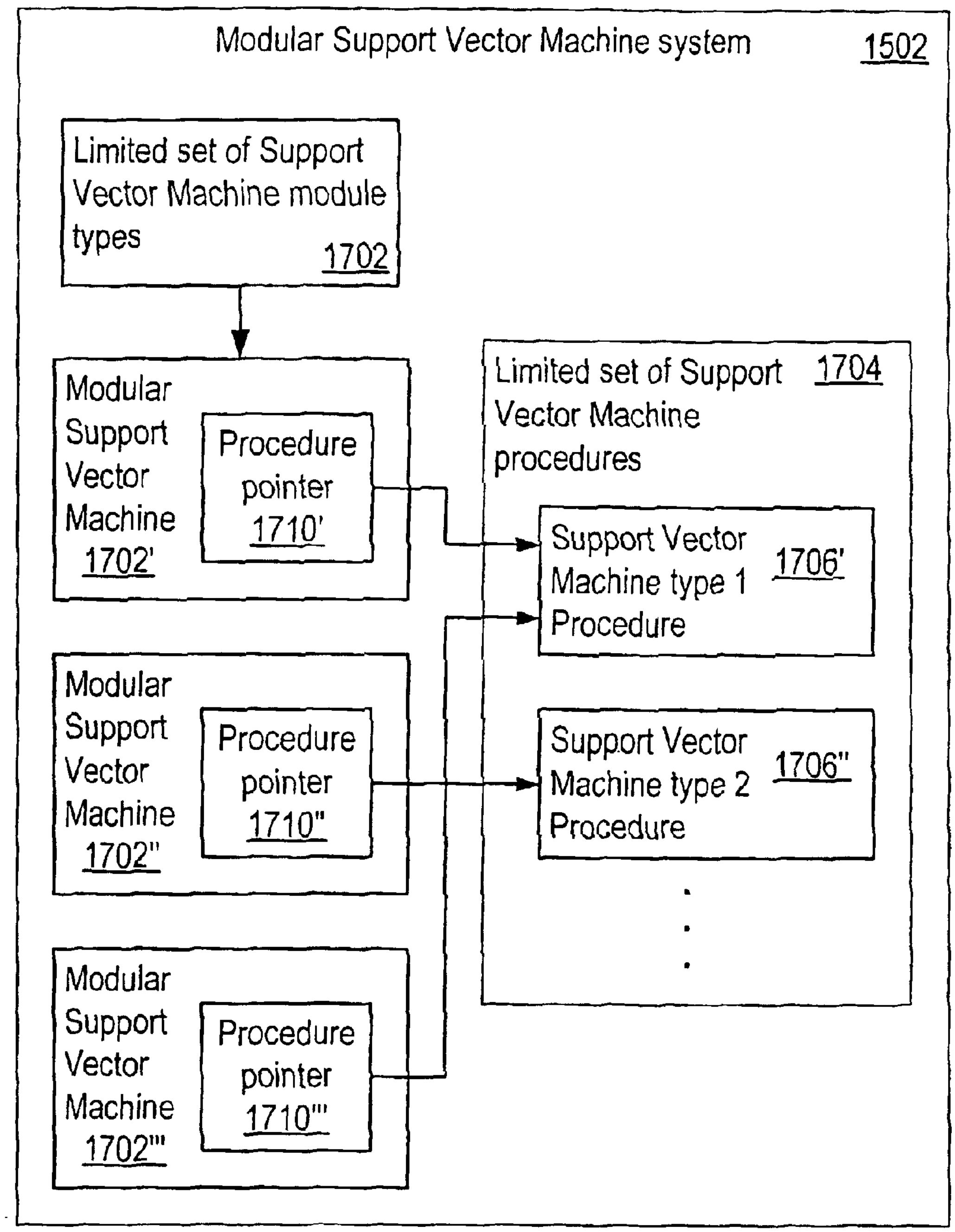
FIG. 20 illustrates an architecture for block 1502 having a plurality of modular support vector machines 1702–1702$^n$ with pointers 1710–1710$^n$ pointing to a limited set of support vector machine procedures 1704–1704$^n$, according to one embodiment.

A further development of the modular approach of an embodiment of the present invention is shown in FIG. 20. FIG. 20 shows the support vector machine 1206 in a modular form.

Referring now to FIG. 20, a specific software embodiment of the modular form of the present invention is shown. In this modular embodiment, a limited set of support vector machine module types 1702 is provided. Each support vector machine module type 1702 may allow the user to create and configure a support vector machine module implementing a specific type of support vector machine. Different types of support vector machines may have different kernel functions, different initial coefficient values, different training methods and so forth. For each support vector machine module type, the user may create and configure support vector machine modules. Three specific instances of support vector machine modules may be shown as 1702', 1702", and 1702'".

In this modular software embodiment, support vector machine modules may be implemented as data storage areas which contain a procedure pointer 1710', 1710", 1710'" to procedures which carry out the functions of the support vector machine type used for that module. The support vector machine procedures 1706' and 1706", for example, may be contained in a limited set of support vector machine procedures 1704. The procedures 1706', 1706" may correspond one to one with the support vector machine types contained in the limited set of support vector machine types 1702.

In this modular software embodiment, many support vector machine modules may be created which use the same support vector machine procedure. In this case, the multiple modules each contain a procedure pointer to the same support vector machine procedure 1706' or 1706". In this way, many modular support vector machines may be implemented without duplicating the procedure or code needed to execute or carry out the support vector machine functions.

Figure 21:
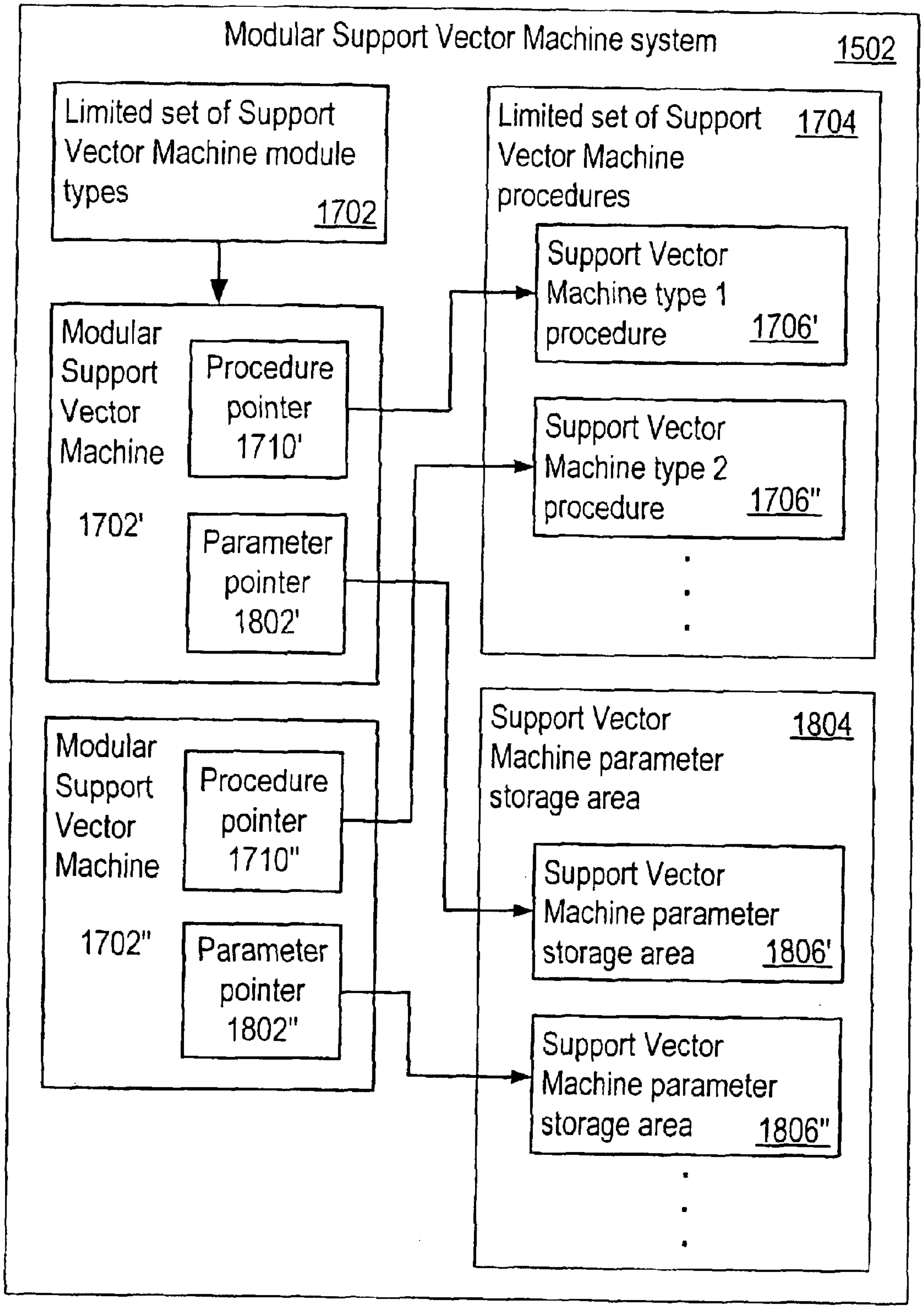
FIG. 21 illustrates an alternate architecture for block 1502 having a plurality of modular support vector machines 1702–1702$^n$ with pointers 1710–1710$^n$ to a limited set of support vector machine procedures 1704–1704$^n$, and with parameter pointers 1802–1802$^n$ to a limited set of system parameter storage areas 1806–1806$^n$, according to one embodiment.

Referring now to FIG. 21, a more specific software embodiment of the modular support vector machine is shown. This embodiment is of particular value when the support vector machine modules are implemented in the same modular software system as modules performing other functions such as statistical tests or feedback control.

Because support vector machines may use a large number of inputs and outputs with associated error values and training input data values, and also because support vector machines may require a large number of coefficient values which need to be stored, support vector machine modules may have significantly greater storage requirements than other module types in the control system. In this case, it is advantageous to store support vector machine parameters in a separate support vector machine parameter storage area 1804. This structure may allow modules implementing functions other than support vector machine functions to not reserve unused storage sufficient for support vector machines.

In this modular software embodiment, each instance of a modular support vector machine 1702' and 1702" may contain two pointers. The first pointers (1710' and 1710") may be the procedure pointer described above in reference to FIG. 20. Each support vector machine module may also contain a second pointer, (1802' and 1802"), referred to as parameter pointers, which may point to storage areas 1806' and 1806", respectively, for support vector machine parameters in a support vector machine parameter storage area 1804. In this embodiment, only support vector machine modules may need to contain the parameter pointers 1802' and 1802", which point to the support vector machine parameter storage area 1804. Other module types, such as control modules which do not require such extensive storage, need not have the storage allocated via the parameter pointers 1802' and 1802", which may be a considerable savings.

FIG. 24 shows representative aspects of the architecture of the support vector machine 1206. The representation in FIG. 24 is particularly relevant in connection with the modular support vector machine approach shown in FIGS. 19, 20 and 21 discussed above.

Referring now to FIG. 24, the components to make and use a representative embodiment of the support vector machine 1206 are shown in an exploded format.

The support vector machine 1206 may contain a support vector machine model. As stated above, one embodiment of the present invention may contemplate all presently available and future developed support vector machine models and architectures.

The support vector machine 1206 may have access to input data and training input data and access to locations in which it may store output data and error data. One embodiment of the present invention may use an on-line approach. In this on-line approach, the data may not be kept in the support vector machine 1206. Instead, data pointers may be kept in the support vector machine. The data pointers may point to data storage locations in a separate software system. These data pointers, also called data specifications, may take a number of forms and may be used to point to data used for a number of purposes.

For example, input data pointer 2204 and output data pointer 2206 may be specified. As shown in the exploded view, each pointer (i.e., input data pointer 2204 and output data pointer 2206) may point to or use a particular data source system 2224 for the data, a data type 2226, and a data item pointer 2228.

Support vector machine 1206 may also have a data retrieval function 2208 and a data storage function 2210. Examples of these data retrieval and data storage functions may be callable routines 2230, disk access 2232, and network access 2234. These are merely examples of the aspects of retrieval and storage functions.

Figure 26:
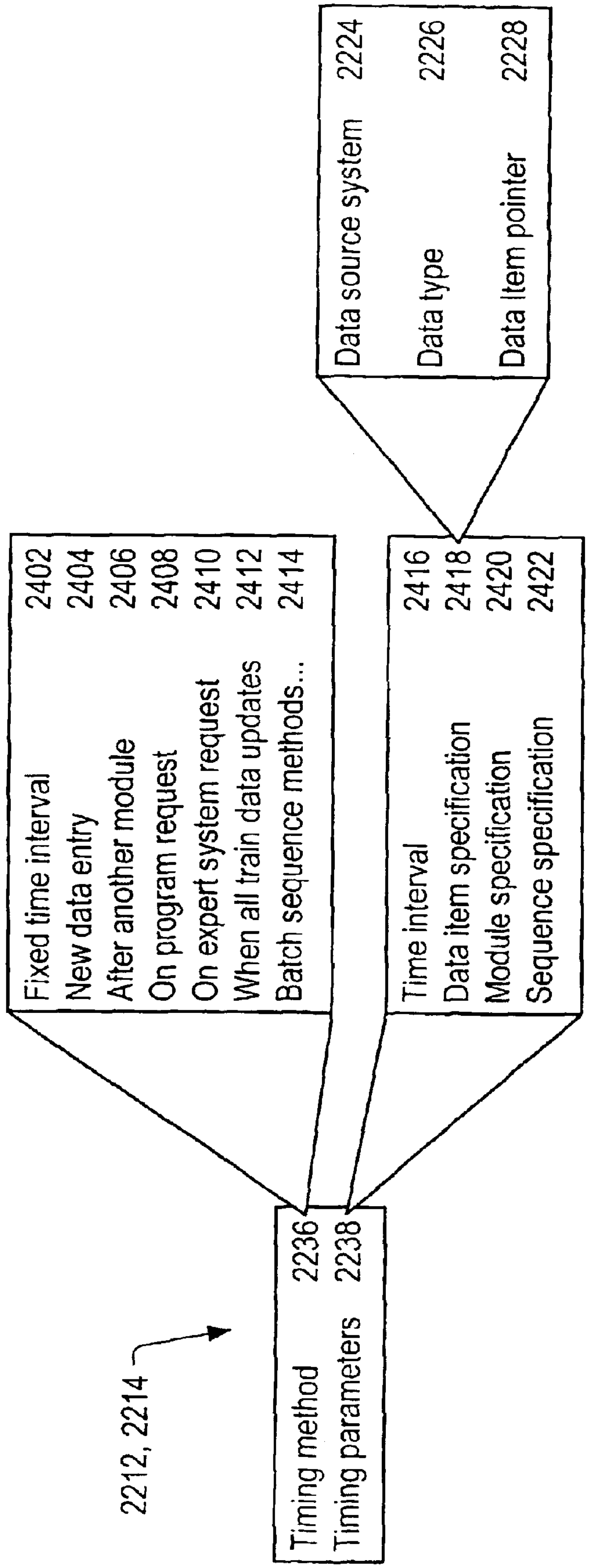
FIG. 26 is an exploded block diagram of the prediction timing control 2212 and the training timing control 2214 of the support vector machine 1206 of FIG. 24, according to one embodiment.

Support vector machine 1206 may also have prediction timing and training timing. These may be specified by prediction timing control 2212 and training timing control 2214. One way to implement this may be to use a timing method 2236 and its associated timing parameters 2238. Referring now to FIG. 26, examples of timing method 2236 may include a fixed time interval 2402, a new data entry 2404, an after another module 2406, an on program request 2408, an on expert system request 2410, a when all training data updates 2412, and/or a batch sequence methods 2414. These may be designed to allow the training and function of the support vector machine 1206 to be controlled by time, data, completion of modules, or other methods or procedures. The examples are merely illustrative in this regard.

FIG. 26 also shows examples of the timing parameters 2238. Such examples may include a time interval 2416, a data item specification 2418, a module specification 2420, and/or a sequence specification 2422. As is shown in FIG. 26, examples of the data item specification 2418 may include specifying a data source system 2224, a data type 2226, and/or a data item pointer 2228 which have been described above.

Referring again to FIG. 24, training data coordination, as discussed previously, may also be required in many applications. Examples of approaches that may be used for such coordination are shown. One method may be to use all current values as representative by reference numeral 2240. Another method may be to use current training input data values with the input data at the earliest training input data time, as indicated by reference numeral 2242. Yet another approach may be to use current training input data values with the input data at the latest training input data time, as indicated by reference numeral 2244. Again, these are merely examples, and should not be construed as limiting in terms of the type of coordination of training data that may be utilized by various embodiments of the present invention.

The support vector machine 1206 may also need to be trained, as discussed above. As stated previously, any presently available or future developed training method may be contemplated by various embodiments of the present invention. The training method also may be somewhat dictated by the architecture of the support vector machine model that is used.

Figure 25:
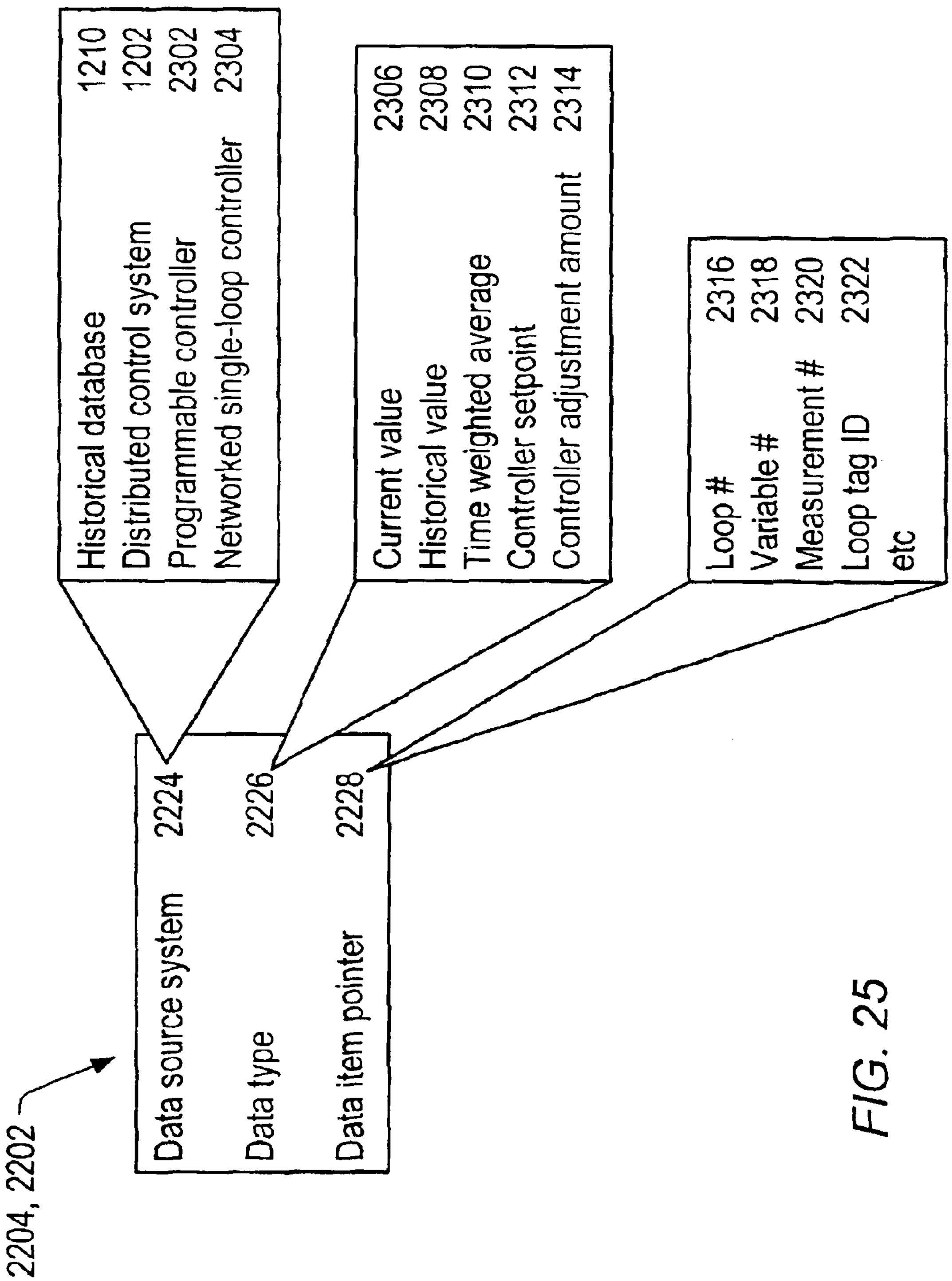
FIG. 25 is an exploded block diagram of the input data specification 2204 and the output data specification 2206 of the support vector machine 1206 of FIG. 24, according to one embodiment.

Referring now to FIG. 25, examples of the data source system 2224, the data type 2226, and the data item pointer 2228 are shown for purposes of illustration.

With respect to the data source system 2224, examples may be a historical database 1210, a distributed control system 1202, a programmable controller 2302, and a networked single loop controller 2304. These are merely illustrative.

Any data source system may be utilized by various embodiments of the present invention. It should also be understood that such a data source system may either be a storage device or an actual measuring or calculating device. In one embodiment, all that is required is that a source of data be specified to provide the support vector machine 1206 with the input data 1220 that is needed to produce the output data 1218. One embodiment of the present invention may contemplate more than one data source system used by the same support vector machine 1206.

The support vector machine 1206 needs to know the data type that is being specified. This is particularly important in a historical database 1210 since it may provide more than one type of data. Several examples may be shown in FIG. 25 as follows: a current value 2306, a historical value 2308, a time weighted average 2310, a controller setpoint 2312, and a controller adjustment amount 2314. Other types may be contemplated.

Finally, the data item pointer 2228 may be specified. The examples shown may include: a loop number 2316, a variable number 2318, a measurement number 2320, and/or a loop tag I.D. 2322, among others. Again, these are merely examples for illustration purposes, as various embodiments of the present invention may contemplate any type of data item pointer 2228.

It is thus seen that support vector machine 1206 may be constructed so as to obtain desired input data 1220 and to provide output data 1218 in any intended fashion. In one embodiment of the present invention, this may be done through menu selection by the user (developer) using a graphical user interface of a software based system on a computer platform.

Figure 27:
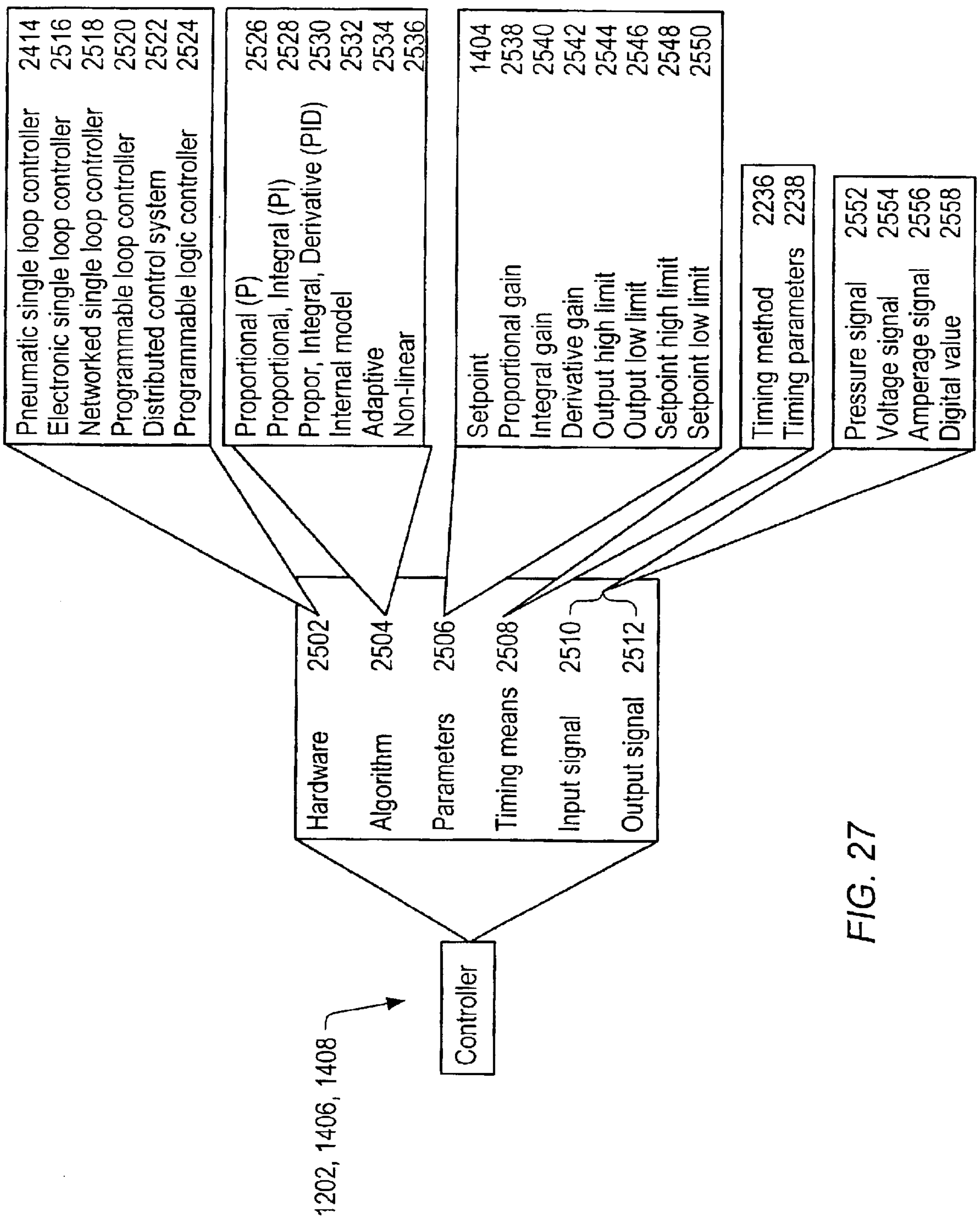
FIG. 27 is an exploded block diagram of various examples and aspects of controller 1202 of FIG. 4, according to one embodiment.

The construction of the controller 1202 is shown in FIG. 27 in an exploded format. Again, this is merely for purposes of illustration. First, the controller 1202 may be implemented on a hardware platform 2502. Examples of hardware platforms 2502 may include: a pneumatic single loop controller 2414, an electronic single loop controller 2516, a networked single looped controller 2518, a programmable loop controller 2520, a distributed control system 2522, and/or a programmable logic controller 2524. Again, these are merely examples for illustration. Any type of hardware platform 2502 may be contemplated by various embodiments of the present invention.

In addition to the hardware platform 2502, the controllers 1202, 1406, and/or 1408 each may need to implement or utilize an algorithm 2504. Any type of algorithm 2504 may be used. Examples shown may include: proportional (P) 2526; proportional, integral (PI) 2528; proportional, integral, derivative (PID) 2530; internal model 2532; adaptive 2534; and, non-linear 2536. These are merely illustrative of feedback algorithms. Various embodiments of the present invention may also contemplate feedforward algorithms and/or other algorithm approaches.

The controllers 1202, 1406, and/or 1408 may also include parameters 2506. These parameters 2506 may be utilized by the algorithm 2504. Examples shown may include setpoint 1404, proportional gain 2538, integral gain 2540, derivative gain 2542, output high limit 2544, output low limit 2546, setpoint high limit 2548, and/or setpoint low limit 2550.

The controllers 1202, 1406, and/or 1408 may also need some means for timing operations. One way to do this is to use a timing means 2508. Timing means 2508, for example, may use a timing method 2236 with associated timing parameters 2238, as previously described. Again, these are merely illustrative.

The controllers 1202, 1406, and/or 1408 may also need to utilize one or more input signals 2510, and to provide one or more output signals 2512. These signals may take the form of pressure signals 2552, voltage signals 2554, amperage (current) signals 2556, or digital values 2558. In other words, input and output signals may be in either analog or digital format.

VI. User Interface

In one embodiment of the present invention, a template and menu driven user interface is utilized (e.g., FIGS. 28 and 29) which may allow the user to configure, reconfigure and operate the embodiment of the present invention. This approach may make the embodiment of the present invention very user friendly. This approach may also eliminate the need for the user to perform any computer programming, since the configuration, reconfiguration and operation of the embodiment of the present invention is carried out in a template and menu format not requiring any actual computer programming expertise or knowledge.

The system and method of one embodiment of the present invention may utilize templates. These templates may define certain specified fields that may be addressed by the user in order to configure, reconfigure, and/or operate the embodiment of the present invention. The templates may guide the user in using the embodiment of the present invention.

Representative examples of templates for the menu driven system of various embodiments of the present invention are shown in FIGS. 28-31. These are merely for purposes of illustration.

Figure 28:
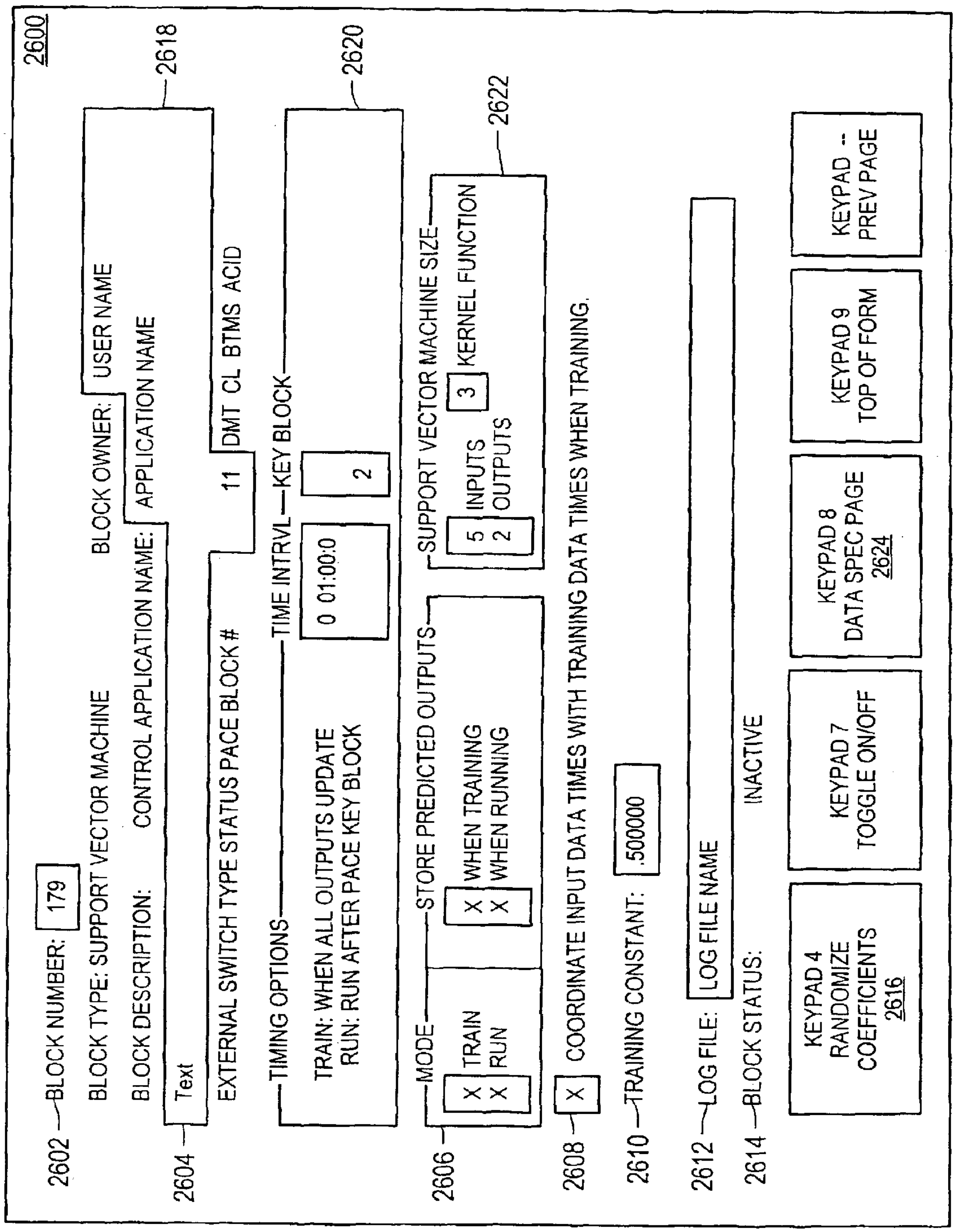
FIG. 28 is a representative computer display of one embodiment of the present invention illustrating part of the configuration specification of the support vector machine block 1206, according to one embodiment.

One embodiment of the present invention may use a two-template specification (i.e., a first template 2600 as shown in FIG. 28, and a second template 2700 as shown in FIG. 29) for a support vector machine module. Referring now to FIG. 28, the first template 2600 in this set of two templates is shown. First template 2600 may specify general characteristics of how the support vector machine 1206 may operate. The portion of the screen within a box labeled 2620, for example, may show how timing options may be specified for the support vector machine module 1206. As previously described, more than one timing option may be provided. A training timing option may be provided, as shown under the label "train" in box 2620. Similarly, a prediction timing control specification may also be provided, as shown under the label "run" in box 2620. The timing methods may be chosen from a pop-up menu of various timing methods that may be implemented in one embodiment. The parameters needed for the user-selected timing method may be entered by a user in the blocks labeled "Time Interval" and "Key Block". These parameters may only be required for certain timing methods. Not all timing methods may require parameters, and not all timing methods that require parameters may require all the parameters shown.

In a box labeled 2606 bearing the headings "Mode" and "Store Predicted Outputs", the prediction and training functions of the support vector machine module may be controlled. By putting a check or an "X" in the box next to either the train or the run designation under "Mode", the training and/or prediction functions of the support vector machine module 1206 may be enabled. By putting a check or an "X" in the box next to either the "when training" or the "when running" labels, the storage of predicted output data 1218 may be enabled when the support vector machine 1206 is training or when the support vector machine 1206 is predicting (i.e., running), respectively.

The size of the support vector machine 1206 may be specified in a box labeled 2622 bearing the heading "support vector machine size". In this embodiment of a support vector machine module 1206, there may be inputs, outputs, and/or kernel function(s). In one embodiment, the number of inputs and the number of outputs may be limited to some predefined value.

The coordination of input data with training data may be controlled using a checkbox labeled 2608. By checking this box, the user may specify that input data 1220 is to be retrieved such that the timestamps on the input data 1220 correspond with the timestamps on the training input data 1306. The training or learning constant may be entered in field 2610. This training or learning constant may determine how aggressively the coefficients in the support vector machine 1206 are adjusted when there is an error 1504 between the output data 1218 and the training input data 1306.

The user may, by pressing a keypad softkey labeled "dataspec page" 2624, call up the second template 2700 in the support vector machine module specification. This second template 2700 is shown in FIG. 29. This second template 2700 may allow the user to specify (1) the data inputs 1220, 1306, and (2) the outputs 1218, 1504 that may be used by the support vector machine module. Data specification boxes 2702, 2704, 2706, and 2708 may be provided for each of the inputs 1220, training inputs 1306, the outputs 1218, and the summed error output, respectively. These may correspond to the input data, the training input data, the output data, and the error data, respectively. These four boxes may use the same data specification methods.

Within each data specification box, the data pointers and parameters may be specified. In one embodiment, the data specification may comprise a three-part data pointer as described above. In addition, various time boundaries and constraint limits may be specified depending on the data type specified.

In FIG. 30, an example of a pop-up menu is shown. In this figure, the specification for the data system for the network input number 1 is being specified as shown by the highlighted field reading "DMT PACE". The box in the center of the screen is a pop-up menu 2802 containing choices which may be selected to complete the data system specification. The templates in one embodiment of the present invention may utilize such pop-up menus 2802 wherever applicable.

Figure 31:
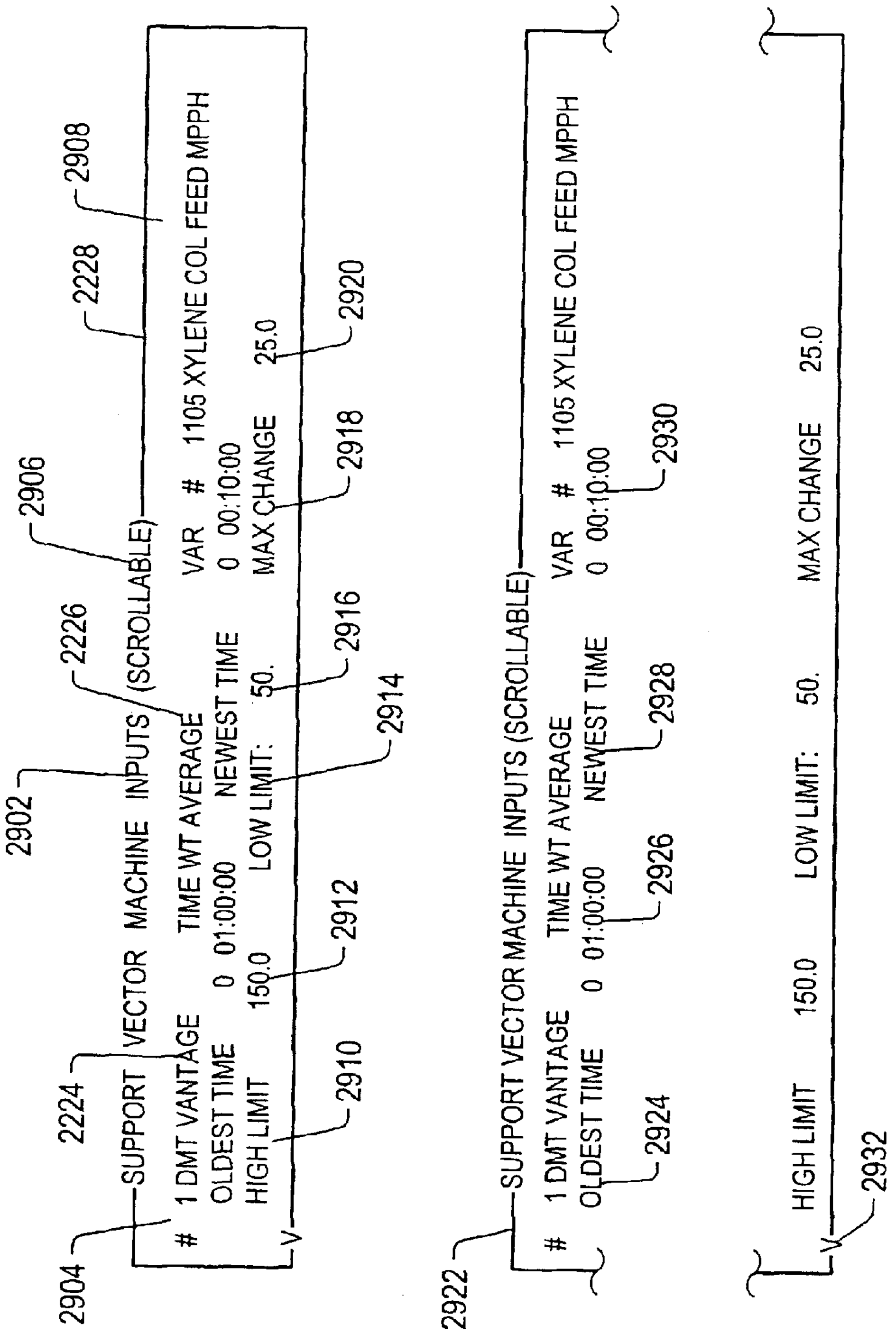
FIG. 31 illustrates a computer screen with detailed individual items of the data specification display of FIG. 29, according to one embodiment.

FIG. 31 shows the various elements included in the data specification block. These elements may include a data title 2902, an indication as to whether the block is scrollable 2906, and/or an indication of the number of the specification in a scrollable region 2904. The box may also contain arrow pointers indicating that additional data specifications may exist in the list either above or below the displayed specification. These pointers 2922 and 2932 may be displayed as a small arrow when other data is present. Otherwise, they may be blank.

The items making up the actual data specification may include: a data system 2224, a data type 2226, a data item pointer or number 2228, a name and units label for the data specification 2908, a label 2924, a time boundary 2926 for the oldest time interval boundary, a label 2928, a time specification 2930 for the newest time interval boundary, a label 2910, a high limit 2912 for the data value, a label 2914, a low limit value 2916 for the low limit on the data value, a label 2918, and a value 2920 for the maximum allowed change in the data value.

The data specification shown in FIG. 31 is representative of one mode of implementing one embodiment of the present invention. However, it should be understood that various other modifications of the data specification may be used to give more or less flexibility depending on the complexity needed to address the various data sources which may be present. Various embodiments of the present invention may contemplate any variation on this data specification method.

Although the foregoing refers to particular embodiments, it will be understood that the present invention is not so limited. It will occur to those of ordinary skill in the art that various modifications may be made to the disclosed embodiments, and that such modifications are intended to be within the scope of the present invention. Additionally, as noted above, although the above description of one embodiment of the invention relates to a process control application, this is not intended to limit the application of various embodiments of the present invention, but rather, it is contemplated that various embodiments of the present invention may be used in any number of processes or systems, including business, medicine, financial systems, e-commerce, data-mining and analysis, stock and/or bond analysis and management, or any other type of system or process which may utilize predictive or classification models.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A computer implemented method for training a support vector machine, the method comprising:

(1) constructing a list containing at least two training sets;

(2) training the support vector machine using said at least two training sets in said list;

(3) constructing a new training set and replacing an oldest training set in said list with said new training set; and (4) repeating (2) and (3) at least once;

wherein at least one of (1) and (3) comprises:

(a) retrieving training input data from a historical database, wherein said training input data has one or more timestamps;

(b) selecting a training input data time period based on said one or more timestamps; and (c) retrieving an input data indicated by said training input data time period.

2. The method of claim 1, wherein (3) comprises:

(a) monitoring substantially in real-time for new training input data; and (b) retrieving input data indicated by said new training input data to construct said new training set.

3. The method of claim 1, wherein (2) uses said at least two training sets once.

4. The method of claim 1, wherein (2) uses said at least two training sets at least twice.

5. A computer implemented method for constructing training sets for a support vector machine, the method comprising:

(1) developing a first training set for a support vector machine by:

(a) retrieving first training input data from a historical database, wherein said first training input data has a first one or more timestamps;

(b) selecting a first training input data time period based on said first one or more timestamps; and (c) retrieving first input data indicated by said first training input data time period; and (2) developing a second training set for said support vector machine by:

(a) retrieving second training input data from said historical database, wherein said second training input data has a second one or more timestamps;

(b) selecting a second training input data time period based on said second one or more timestamps; and (c) retrieving second input data indicated by said second training input data time period.

6. The method of claim 5, further comprising:

(3) searching said historical database in either a forward time direction or a backward time direction so that said second training input data is the next training input data in time to said first training input data in said forward time direction or said backward time direction, whichever is used.

7. The method of claim 5, further comprising:

(3) training said support vector machine using said first training set and/or said second training set.

8. A computer support vector machine process control method adapted for predicting output data provided to a controller used to control a process for producing a product having at least one product property, the computer support vector machine process control method comprising:

a processor;

a memory medium coupled to the processor, wherein the memory medium stores a support vector machine software program, wherein the support vector machine software program comprises:

(1) monitoring for the availability of new training input data by monitoring for a change in an associated timestamp of said training input data;

(2) constructing a training set by retrieving first input data corresponding to said training input data;

(3) training the support vector machine using said training set; and (4) predicting the output data from second input data using the support vector machine.

9. The computer support vector machine process control method of claim 8, wherein (2) further comprises using data pointers to indicate said training input data and said first input data.

10. The computer support vector machine process control method of claim 8, wherein (1) is preceded by:

(i) presenting to a user a template for a partially specified support vector machine; and (ii) entering data into said template to create a complete support vector machine specification; and wherein (3) further comprises using a support vector machine representative of said complete support vector machine specification.

11. The computer support vector machine process control method of claim 18, wherein (1) is preceded by:

(i) presenting to a user an interface for accepting a limited set of substantially natural language format specifications; and (ii) entering into said interface sufficient specifications in said substantially natural language format to completely define a support vector machine; and wherein (3) further comprises using a support vector machine representative of said completely defined support vector machine.

12. The computer support vector machine process control method of claim 8, wherein (1), (2), and (3) operate substantially in real-time.

13. A computer support vector machine process control method adapted for predicting output data provided to a controller used to control a process for producing a product having at least one product property, the computer support vector machine process control method comprising:

(1) monitoring for the availability of new training input data;

(2) constructing a training set by retrieving first input data corresponding to said training input data comprising:

(a) selecting a training input data time using a one or more timestamps associated with said training input data; and (b) retrieving input data representing measurement(s) at said training input data time, said input data comprising said first input data;

(3) training the support vector machine using said training set; and (4) predicting the output data from second input data using the support vector machine.

14. The computer support vector machine process control method of claim 13, wherein (1) comprises monitoring for a change between two successive training input data values.

15. The computer support vector machine process control method of claim 13, wherein (1) comprises computing a difference between a most recent training input data value and a next most recent training input value; and wherein (3) further comprises using said difference with said first input data for said training.

16. The computer support vector machine process control method of claim 13, wherein (2) further comprises using data pointers to indicate said training input data and said first input data.

17. The computer support vector machine process control method of claim 13, wherein (1), (2), and (3) operate substantially in real-time.

18. A computer implemented method for training a support vector machine used to control a process, the method comprising:

building a first training set using training data, wherein said training data includes one or more timestamps indicating a chronology of said training data and one or more process parameter values corresponding to each timestamp, and wherein said first training set comprises process parameter values corresponding to a first time period in said chronology;

training a support vector machine using said first training set.

19. The method of claim 18, wherein said building a first training set comprises:

retrieving said training data from a historical database;

selecting a training data time period based on said one or more timestamps; and retrieving said process parameter values from said training data indicated by said training data time period, wherein said first training set comprises said retrieved process parameter values in chronological order over said selected training data time period.

20. The method of claim 19, further comprising:

generating a second training set by:

removing at least a subset of the parameter values of said first training set, wherein said at least a subset of the parameter values comprises oldest parameter values of said training set; and adding new parameter values from said training data based on said timestamps to generate a second training set;

wherein said second training set corresponds to a second time period in said chronology; and training a support vector machine using said second training set.

21. A computer redable carrier medium which stores program instructions for training a support vector machine, wherein the program instructions are executable to perform:

(1) constructing a list containing at least two training sets;

(2) training the support vector machine using said at least two training sets in said list;

(3) constructing a new training set and replacing an oldest training set in said list with said new training set; and (4) repeating (2) and (3) at least once;

wherein at least one of (1) and (3) comprises:

(a) retrieving training input data from a historical database, wherein said training input data has one or more timestamps;

(b) selecting a training input data time period based on said one or more timestamps; and (c) retrieving an input data indicated by said training input data time period.

22. The carrier medium of claim 21, wherein (3) comprises:

(a) monitoring substantially in real-time for new training input data; and (b) retrieving input data indicated by said new training input data to construct said new training set.

23. The carrier medium of claim 21, wherein (2) uses said at least two training sets once.

24. The carrier medium of claim 21, wherein (2) uses said at least two training sets at least twice.

25. A computer redable carrier medium which stores program instructions for constructing training sets for a support vector machine, wherein the program instructions are executable to perform:

(1) developing a first training set for a support vector machine by:

(a) retrieving first training input data from a historical database, wherein said first training input data has a first one or more timestamps;

(b) selecting a first training input data time period based on said first one or more timestamps; and (c) retrieving first input data indicated by said first training input data time period; and (2) developing a second training set for said support vector machine by:

(a) retrieving second training input data from said historical database, wherein said second training input data has a second one or more timestamps;

(b) selecting a second training input data time period based on said second one or more timestamps; and (c) retrieving second input data indicated by said second training input data time period.

26. The carrier medium of claim 25, wherein the program instructions are further executable to perform:

(3) searching said historical database in either a forward time direction or a backward time direction so that said second training input data is the next training input data in time to said first training input data in said forward time direction or said backward time direction, whichever is used.

27. The carrier medium of claim 25, wherein the program instructions are further executable to perform:

(3) training said support vector machine using said first training set and/or said second training set.

28. A computer redable carrier medium which stores program instructions for predicting out put data provided to a controller used to control a process for producing a product having at least one product property, wherein the program instructions are executable to perform:

(1) monitoring for the availability of new training input data;

(2) constructing a training set by retrieving first input data corresponding to said training input data comprising:

(a) selecting a training input data time using a one or more timestamps associated with said training input data; and (b) retrieving input data representing measurement(s) at said training input data time, said input data comprising said first input data;

(3) training the support vector machine using said training set; and (4) predicting the output data from second input data using the support vector machine.

29. The carrier medium of claim 28, wherein (1) comprises monitoring for a change between two successive training input data values.

30. The carrier medium of claim 28, wherein (1) comprises computing a difference between a most recent training input data value and a next most recent training input value; and wherein (3) further comprises using said difference with said first input data for said training.

31. The carrier medium of claim 28, wherein (2) further comprises using data pointers to indicate said training input data and said first input data.

32. The carrier medium of claim 28 wherein (1), (2), and (3) operate substantially in real-time.

33. A computer readable carrier medium which stores program instructions for training a support vector machine used to control a process, wherein the program instructions are executable to perform:

building a first training set using training data, wherein said training data includes one or more timestamps indicating a chronology of said training data and one or more process parameter values corresponding to each timestamp, and wherein said first training set comprises process parameter values corresponding to a first time period in said chronology;

training a support vector machine using said first training set.

34. The carrier medium of claim 33, wherein said building a first training set comprises:

retrieving said training data from a historical database;

selecting a training data time period based on said one or more timestamps; and retrieving said process parameter values from said training data indicated by said training data time period, wherein said first training set comprises said retrieved process parameter values in chronological order over said selected training data time period.

35. The carrier medium of claim 34, wherein the program instructions are further executable to perform:

generating a second training set by:

removing at least a subset of the parameter values of said first training set, wherein said at least a subset of the parameter values comprises oldest parameter values of said first training set; and adding new parameter values from said training data based on said timestamps to generate said second training set, wherein said second training set corresponds to a second time period in said chronology; and training a support vector machine using said second training set.

* * * * *

UNITED STATES PATENT AND TRADEMARK OFFICE

CERTIFICATE OF CORRECTION

PATENT NO. : 6,944,616 B2 Page 1 of 1
DATED : September 13, 2005
INVENTOR(S) : Ferguson et al.

It is certified that error appears in the above-identified patent and that said Letters Patent is hereby corrected as shown below:

Column 53,
Line 50, delete “redable” and substitute -- readable --.

Column 54,
Lines 11 and 46, delete “redable” and substitute -- readable --.

Signed and Sealed this

Twenty-seventh Day of December, 2005

JON W. DUDAS
*Director of the United States Patent and Trademark Office*